(12) United States Patent
Louch

(10) Patent No.: US 10,394,441 B2
(45) Date of Patent: Aug. 27, 2019

(54) DEVICE, METHOD, AND GRAPHICAL USER INTERFACE FOR CONTROLLING DISPLAY OF APPLICATION WINDOWS

(75) Inventor: John O. Louch, San Luis Obispo, CA (US)

(73) Assignee: Apple Inc., Cupertino, CA (US)

( * ) Notice: Subject to any disclaimer, the term of this patent is extended or adjusted under 35 U.S.C. 154(b) by 1510 days.

(21) Appl. No.: 13/340,605

(22) Filed: Dec. 29, 2011

(65) Prior Publication Data

US 2013/0097556 A1 Apr. 18, 2013

Related U.S. Application Data

(60) Provisional application No. 61/547,696, filed on Oct. 15, 2011.

(51) Int. Cl.
*G06F 3/048* (2013.01)
*G06F 3/0488* (2013.01)
*G06F 9/451* (2018.01)

(52) U.S. Cl.
CPC ............ *G06F 3/0488* (2013.01); *G06F 9/451* (2018.02); *G06F 2203/04808* (2013.01)

(58) Field of Classification Search
CPC .. G06G 5/14; G09G 2340/125; G06F 3/0481; G06F 9/4443; G06F 2203/04804; G06F 3/0488; G06F 9/451; G06F 2203/04808

USPC ......................... 715/769, 773, 790, 794–797
See application file for complete search history.

(56) References Cited

U.S. PATENT DOCUMENTS

| 6,957,395 B1 * | 10/2005 | Jobs et al. ..................... 715/765 |
| 2006/0161861 A1 * | 7/2006 | Holecek et al. .............. 715/782 |
| 2007/0106955 A1 * | 5/2007 | Conrad et al. ................ 715/781 |
| 2007/0226647 A1 * | 9/2007 | Louch .......................... 715/788 |
| 2008/0168401 A1 * | 7/2008 | Boule et al. .................. 715/863 |
| 2009/0183107 A1 * | 7/2009 | Matthews et al. ............ 715/781 |
| 2009/0293007 A1 * | 11/2009 | Duarte et al. ................. 715/767 |
| 2011/0078624 A1 * | 3/2011 | Missig et al. ................. 715/802 |
| 2011/0163970 A1 * | 7/2011 | Lemay .......................... 345/173 |
| 2011/0179386 A1 * | 7/2011 | Shaffer et al. ................ 715/835 |

* cited by examiner

*Primary Examiner* — Tadesse Hailu
(74) *Attorney, Agent, or Firm* — Dentons US LLP

(57) ABSTRACT

An electronic device with a display and a touch-sensitive surface displays a plurality of windows on the display. The plurality of windows includes a first window for a first application displayed in a frontmost position on the display and a second window displayed in a lower position than the frontmost position. The device detects a first gesture moving in a first direction on the touch sensitive surface, the first direction on the touch sensitive surface corresponding to a first direction on the display; and, in response to detecting the first gesture moving in the first direction on the touch sensitive surface: moves the first window across the display in the first direction on the display until the first window is moved partially or fully off the display; and displays the second window in the frontmost position on the display.

23 Claims, 44 Drawing Sheets

600

```
┌─────────────────────────────────────────────────────────────────┐
│ Display a plurality of windows on a display, the plurality of   │
│ windows including a first window for a first application       │
│ displayed in a frontmost position on the display and a second  │──602
│ window displayed in a lower position than the frontmost         │
│ position                                                        │
│ ┌─────────────────────────────────────────────────────────────┐ │
│ │ The second window is for a second application, distinct     │ │──604
│ │ from the first application                                  │ │
│ └─────────────────────────────────────────────────────────────┘ │
└─────────────────────────────────────────────────────────────────┘
                                  │
                                  ▼
┌─────────────────────────────────────────────────────────────────┐
│ Detect a first gesture moving in a first direction on the touch │
│ sensitive surface, the first direction on the touch sensitive   │──606
│ surface corresponding to a first direction on the display       │
│ ┌─────────────────────────────────────────────────────────────┐ │
│ │ The first gesture is a multifinger swipe gesture            │ │──608
│ └─────────────────────────────────────────────────────────────┘ │
│ ┌─────────────────────────────────────────────────────────────┐ │
│ │ The first direction on the touch sensitive surface          │ │──610
│ │ corresponds to a horizontal direction on the display        │ │
│ └─────────────────────────────────────────────────────────────┘ │
│ ┌─────────────────────────────────────────────────────────────┐ │
│ │ The first direction on the touch sensitive surface          │ │──612
│ │ corresponds to a vertical direction on the display          │ │
│ └─────────────────────────────────────────────────────────────┘ │
│ ┌─────────────────────────────────────────────────────────────┐ │
│ │ The first direction on the touch sensitive surface          │ │──614
│ │ corresponds to a diagonal direction on the display          │ │
│ └─────────────────────────────────────────────────────────────┘ │
└─────────────────────────────────────────────────────────────────┘
                                  │
                                  ▼
                                 (A)
```

```
┌─────────────────────────────────────────────────────────────────┐
│ Display a plurality of windows on the display, the plurality of │
│ windows including: a first window for a first application       │─702
│ displayed in a frontmost position on the display; a second      │
│ window for a second application, distinct from the first        │
│ application, displayed in a second position lower than the      │
│ frontmost position; and a third window for a third application, │
│ distinct from the first application and the second application, │
│ displayed in a third position lower than the second position    │
└─────────────────────────────────────────────────────────────────┘
                                  │
                                  ▼
┌─────────────────────────────────────────────────────────────────┐
│ Detect a first gesture moving in a first direction on the touch │─704
│ sensitive surface, the first direction on the touch sensitive   │
│ surface corresponding to a first direction on the display       │
│ ┌─────────────────────────────────────────────────────────────┐ │
│ │  The first direction on the touch sensitive surface         │ │─706
│ │  corresponds to a horizontal direction on the display       │ │
│ └─────────────────────────────────────────────────────────────┘ │
│ ┌─────────────────────────────────────────────────────────────┐ │
│ │  The first direction on the touch sensitive surface         │ │─708
│ │  corresponds to a vertical direction on the display         │ │
│ └─────────────────────────────────────────────────────────────┘ │
│ ┌─────────────────────────────────────────────────────────────┐ │
│ │  The first direction on the touch sensitive surface         │ │─710
│ │  corresponds to a diagonal direction on the display         │ │
│ └─────────────────────────────────────────────────────────────┘ │
└─────────────────────────────────────────────────────────────────┘
                                  │
                                  ▼
                                 (C)
```

Figure 7A

DEVICE, METHOD, AND GRAPHICAL USER INTERFACE FOR CONTROLLING DISPLAY OF APPLICATION WINDOWS

RELATED APPLICATIONS

This application claims the benefit of U.S. Provisional Application No. 61/547,696, titled "Device, Method, and Graphical User Interface for Controlling Display of Application Windows," filed Oct. 15, 2011, which is incorporated by reference herein in its entirety.

TECHNICAL FIELD

This relates generally to electronic devices with touch-sensitive surfaces, including but not limited to electronic devices with touch-sensitive surfaces that display multiple application windows in a graphical user interface.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include controlling display of application windows that overlap each other when displayed, in order to bring the desired application window to the foreground. A user may need to perform such manipulations in any user interface where application windows from any number of applications are displayed.

But existing methods for controlling display of application windows are tedious and creates a significant cognitive burden on a user. In addition, existing methods take longer than necessary, thereby wasting energy. This latter consideration is particularly important in battery-operated devices.

SUMMARY

Accordingly, there is a need for electronic devices with faster, more efficient methods and interfaces for controlling display of application windows. Such methods and interfaces may complement or replace conventional methods for controlling display of application windows. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes: displaying a plurality of windows on the display, the plurality of windows including a first window for a first application displayed in a frontmost position on the display and a second window displayed in a lower position than the frontmost position; detecting a first gesture moving in a first direction on the touch sensitive surface, the first direction on the touch sensitive surface corresponding to a first direction on the display; and, in response to detecting the first gesture moving in the first direction on the touch sensitive surface: moving the first window across the display in the first direction on the display until the first window is moved partially or fully off the display; and displaying the second window in the frontmost position on the display.

In accordance with some embodiments, a method is performed at an electronic device with a display and a touch-sensitive surface. The method includes: displaying a plurality of windows on the display, the plurality of windows including: a first window for a first application displayed in a frontmost position on the display; a second window for a second application, distinct from the first application, displayed in a second position lower than the frontmost position; and a third window for a third application, distinct from the first application and the second application, displayed in a third position lower than the second position; detecting a first gesture moving in a first direction on the touch sensitive surface, the first direction on the touch sensitive surface corresponding to a first direction on the display; in response to detecting the first gesture moving in the first direction on the touch sensitive surface: moving the first window across the display in the first direction on the display until the first window is moved partially or fully off the display; and displaying the second window in the frontmost position on the display; after responding to the first gesture, while displaying the second window in the frontmost position on the display, detecting a second gesture moving in the first direction on the touch sensitive surface; in response to detecting the second gesture moving in the first direction on the touch sensitive surface: moving the second window across the display in the first direction on the display until the second window is moved partially or fully off the display; and displaying the third window in the frontmost position on the display; after responding to the second gesture, while displaying the third window in the frontmost position on the display, detecting a third gesture moving in a direction opposite the first direction on the touch sensitive surface; in response to detecting the third gesture moving in the direction opposite the first direction on the touch sensitive surface: moving the second window across the display in a direction opposite the first direction on the display; and redisplaying the second window in the frontmost position on the display; after responding to the third gesture, while displaying the second window in the frontmost position on the display, detecting a fourth gesture moving in the direction opposite the first direction on the touch sensitive surface; and, in response to detecting the fourth gesture moving in the direction opposite the first direction on the touch sensitive surface: moving the first window across the display in a direction opposite the first direction on the display; and redisplaying the first window in the frontmost position on the display.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a touch-sensitive surface, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by an electronic device with a display, a touch-sensitive surface, cause the device to perform the operations of any of the methods described above. In accordance with some embodiments, an electronic device includes: a display, a touch-sensitive surface; and means for performing the operations of any of the methods described above. In accordance with some embodiments, an information processing apparatus, for use in an electronic device with a display and a touch-sensitive surface, includes means for performing the operations of any of the methods described above.

In accordance with some embodiments, an electronic device includes a display unit configured to display a plurality of windows on the display unit, the plurality of windows including a first window for a first application displayed in a frontmost position on the display unit and a second window displayed in a lower position than the frontmost position; a touch-sensitive surface unit configured to receive gestures; and a processing unit coupled to the display unit and the touch-sensitive surface unit. The processing unit is configured to: detect a first gesture moving in a first direction on the touch sensitive surface unit, the first direction on the touch sensitive surface unit corresponding to a first direction on the display unit; and, in response to detecting the first gesture moving in the first direction on the touch sensitive surface unit: move the first window across the display unit in the first direction on the display unit until the first window is moved partially or fully off the display unit; and enable display of the second window in the frontmost position on the display unit.

In accordance with some embodiments, an electronic device includes a display unit configured to display a plurality of windows on the display unit, the plurality of windows including: a first window for a first application displayed in a frontmost position on the display unit; a second window for a second application, distinct from the first application, displayed in a second position lower than the frontmost position; and a third window for a third application, distinct from the first application and the second application, displayed in a third position lower than the second position; a touch-sensitive surface unit configured to receive gestures; and a processing unit coupled to the display unit and the touch-sensitive surface unit. The processing unit is configured to: detect a first gesture moving in a first direction on the touch sensitive surface unit, the first direction on the touch sensitive surface unit corresponding to a first direction on the display unit; in response to detecting the first gesture moving in the first direction on the touch sensitive surface unit: move the first window across the display unit in the first direction on the display unit until the first window is moved partially or fully off the display unit; and enable display of the second window in the frontmost position on the display unit; after responding to the first gesture, while displaying the second window in the frontmost position on the display unit, detect a second gesture moving in the first direction on the touch sensitive surface unit; in response to detecting the second gesture moving in the first direction on the touch sensitive surface unit: move the second window across the display unit in the first direction on the display unit until the second window is moved partially or fully off the display unit; and enable display of the third window in the frontmost position on the display unit; after responding to the second gesture, while displaying the third window in the frontmost position on the display unit, detect a third gesture moving in a direction opposite the first direction on the touch sensitive surface unit; in response to detecting the third gesture moving in the direction opposite the first direction on the touch sensitive surface unit: move the second window across the display unit in a direction opposite the first direction on the display unit; and reenable display of the second window in the frontmost position on the display unit; after responding to the third gesture, while displaying the second window in the frontmost position on the display unit, detect a fourth gesture moving in the direction opposite the first direction on the touch sensitive surface unit; and, in response to detecting the fourth gesture moving in the direction opposite the first direction on the touch sensitive surface unit: move the first window across the display unit in a direction opposite the first direction on the display unit; and reenable display of the first window in the frontmost position on the display unit.

Thus, electronic devices with displays and touch-sensitive surfaces are provided with faster, more efficient methods and interfaces for controlling display of application windows, thereby increasing the effectiveness, efficiency, and user satisfaction with such devices. Such methods and interfaces may complement or replace conventional methods for controlling display of application windows.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6C are flow diagrams illustrating a method of controlling display of application windows in accordance with some embodiments.

FIGS. 7A-7E are flow diagrams illustrating a method of controlling display of application windows in accordance with some embodiments.

DESCRIPTION OF EMBODIMENTS

Figure 1A:
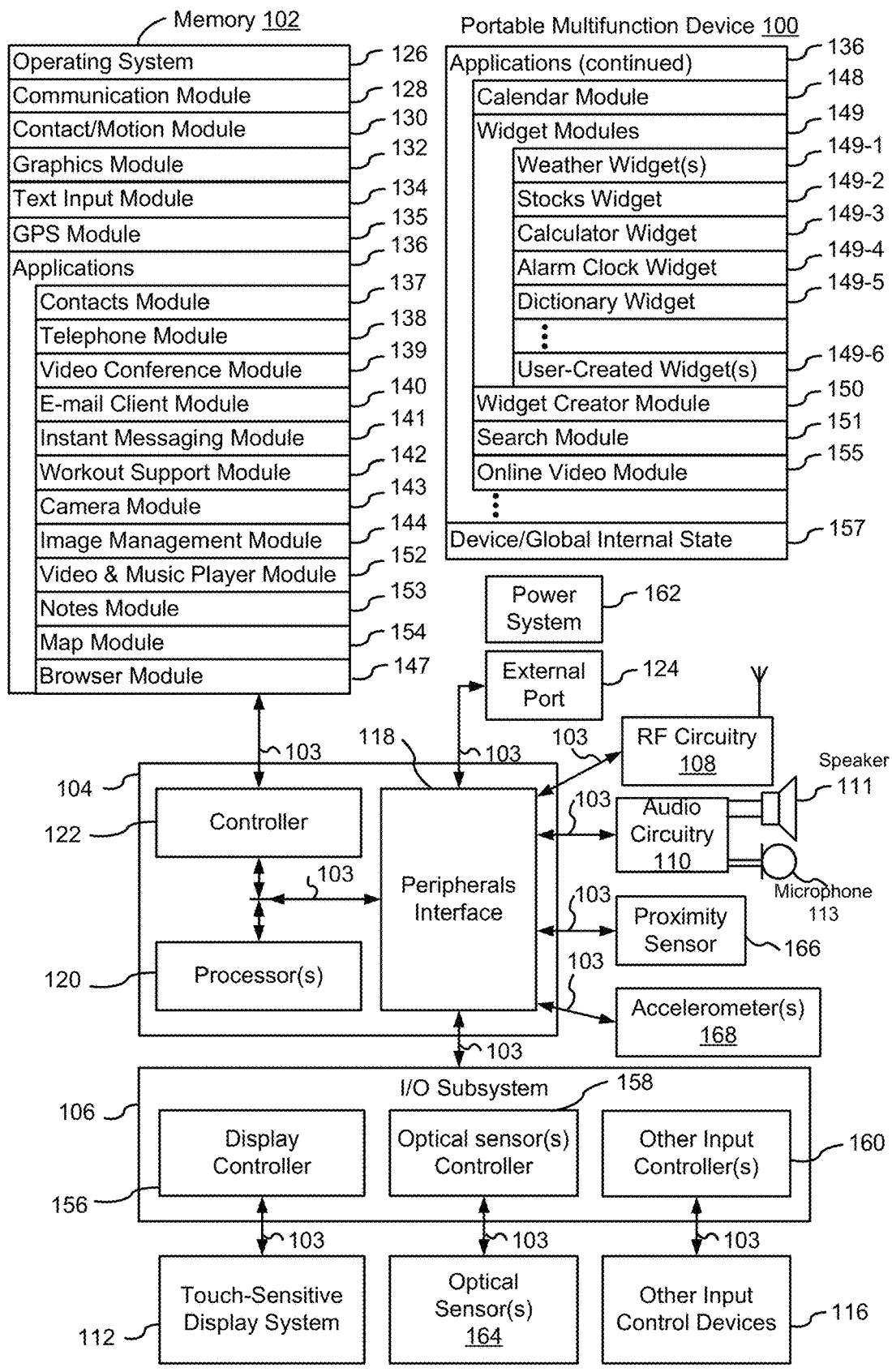
FIG. 1A is a block diagram illustrating a portable multifunction device with a touch-sensitive display in accordance with some embodiments.

In a graphical user interface with multiple application windows, users often want to adjust how the various windows are displayed. For example, for application windows that overlap each other, a user may want to quickly go through the stack of overlapping windows to find and bring to the foreground a particular window. In some cases, the user may want to move some of the windows partially or fully off the display to unclutter the display. But existing methods for moving, hiding, and unhiding application windows typically require precise mouse/cursor manipulations of application windows or the use of memorized keyboard shortcuts. Such methods are tedious for the user. The embodiments below describe faster, simpler methods of hiding, unhiding, and otherwise controlling the display of application windows via simple, imprecise gestures (e.g., multifinger swipe gestures). In response to user gestures in one direction, windows are hidden in the order in which they are displayed. In response to user gestures in the opposite direction, windows are un-hidden in a last-hidden, first-unhidden order. If there are multiple windows corresponding to the same application, these windows may be hidden or unhidden one at a time or together all at once.

Below, FIGS. 1A-1B, 2, 3, and 8 provide a description of exemplary devices. FIGS. 4A-4B and 5A-5CC illustrate exemplary user interfaces for controlling display of application windows. FIGS. 6A-6C and 7A-7E are flow diagrams illustrating methods of controlling display of application windows. The user interfaces in FIGS. 5A-5CC are used to illustrate the processes in FIGS. 6A-6C and 7A-7E.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
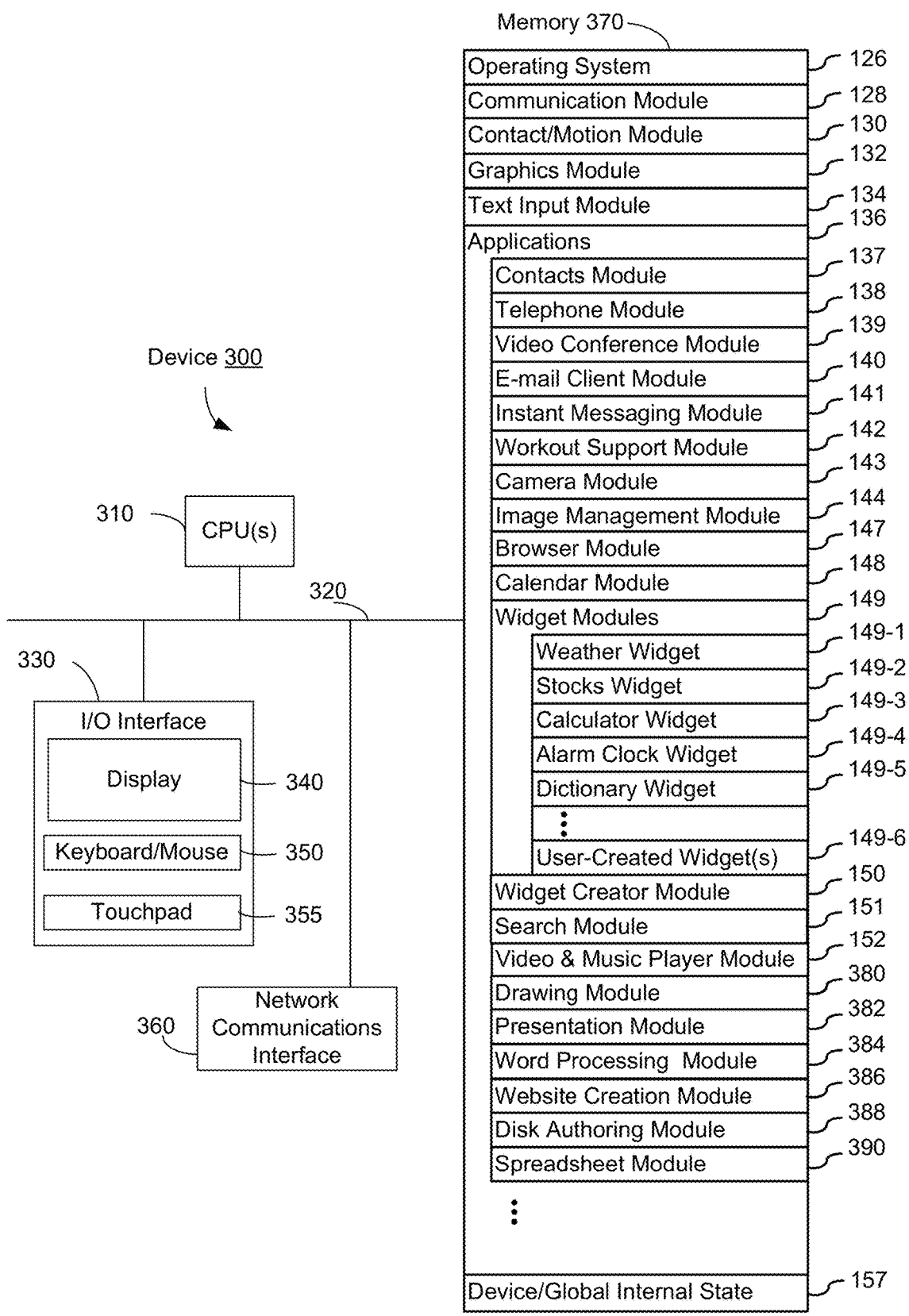
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video player module and a music player module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
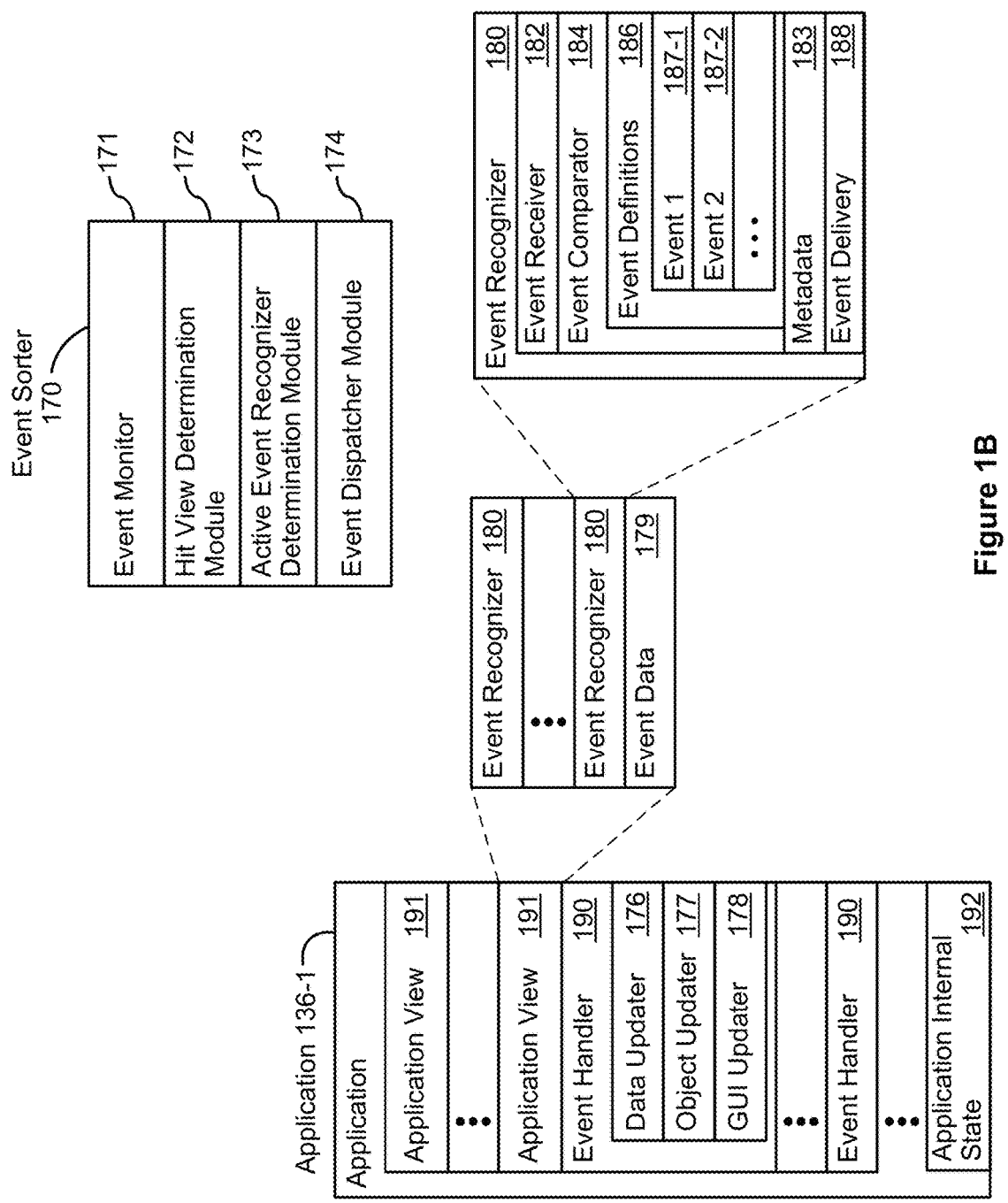
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
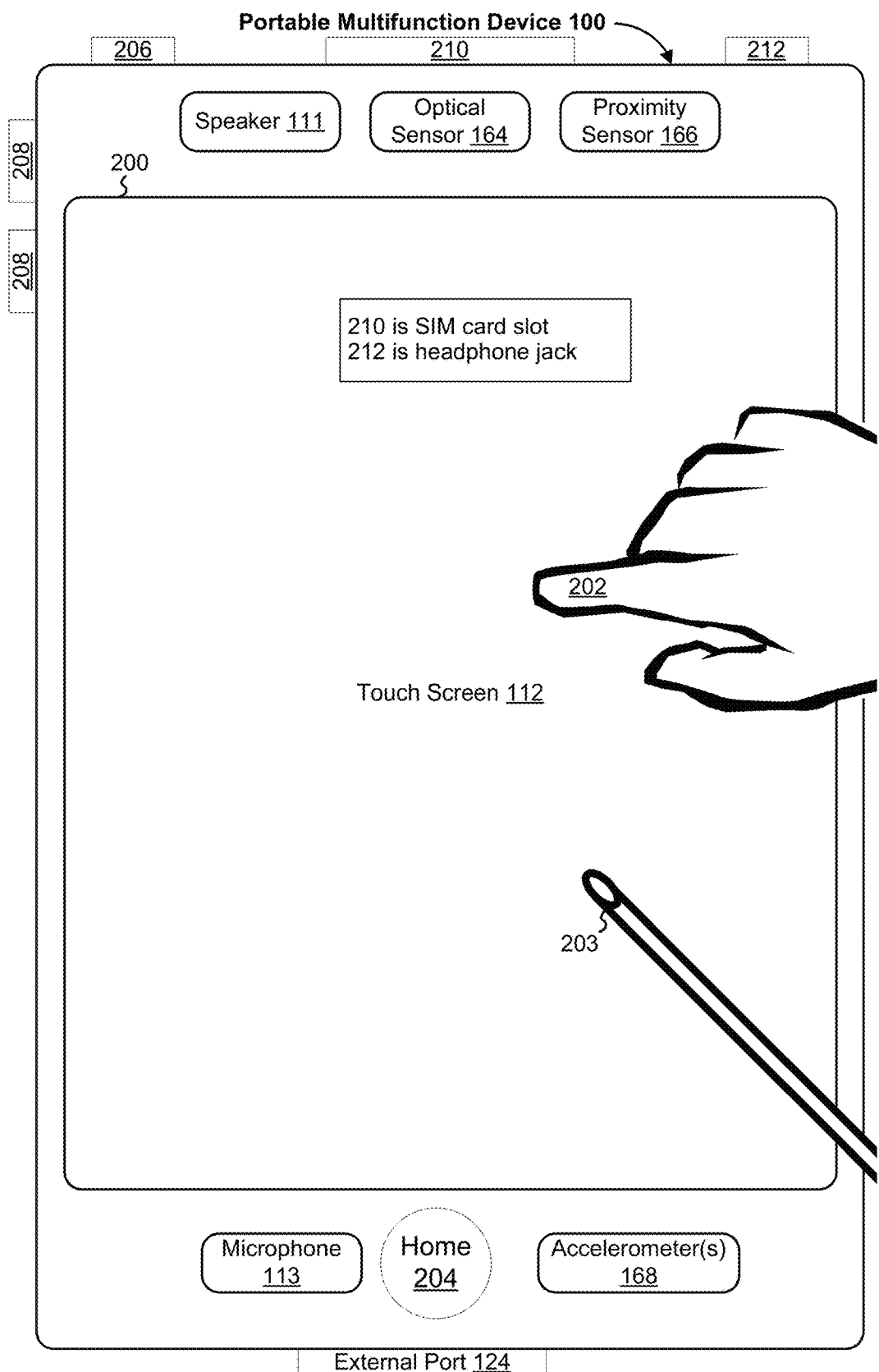
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
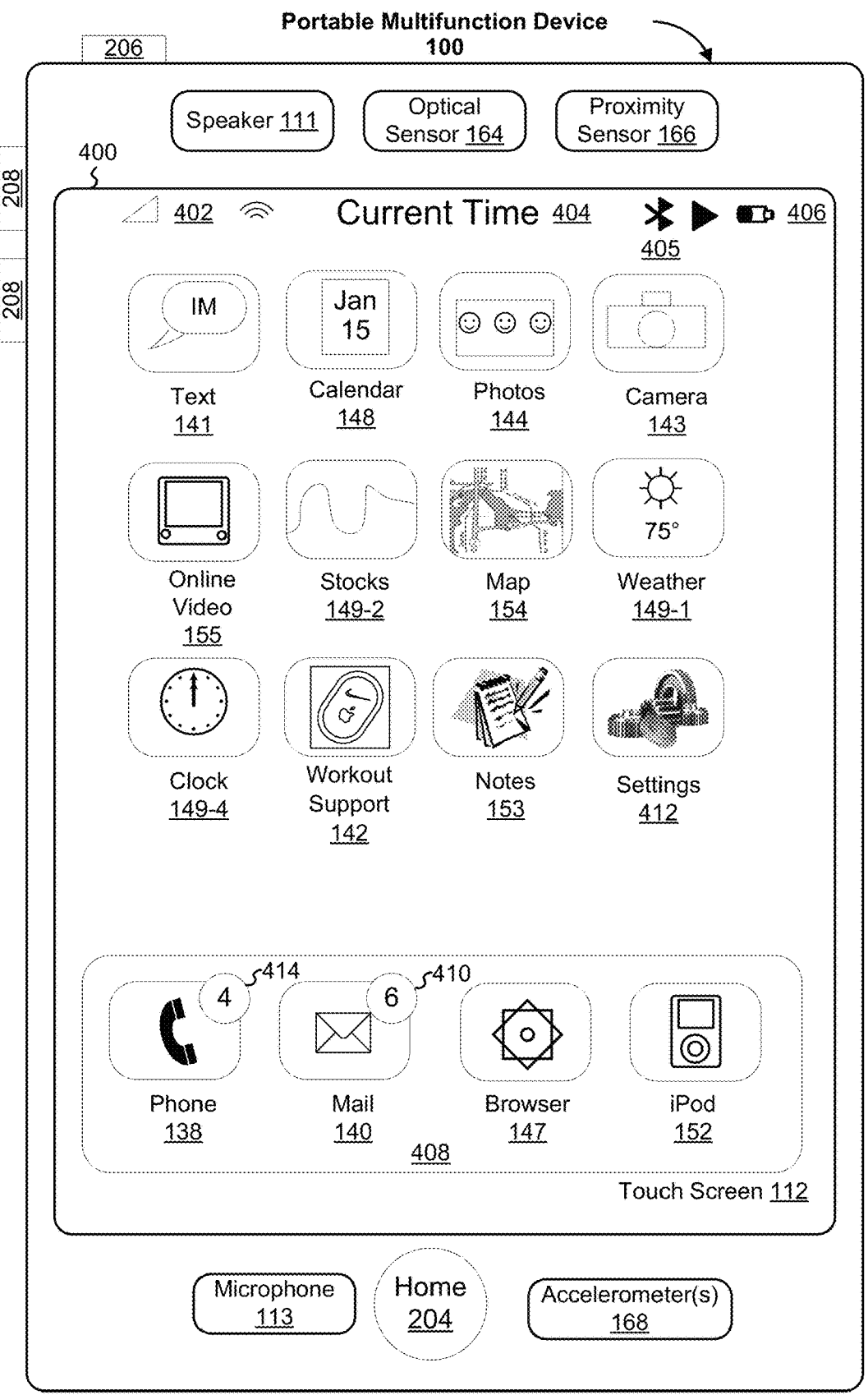
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;

Workout support 142;
Calendar 148;
Alarm clock 149-4;
Map 154;
Notes 153;
Settings 412, which provides access to settings for device 100 and its various applications 136; and
Online video module 155, also referred to as YouTube (trademark of Google Inc.) module 155.

Figure 4B:
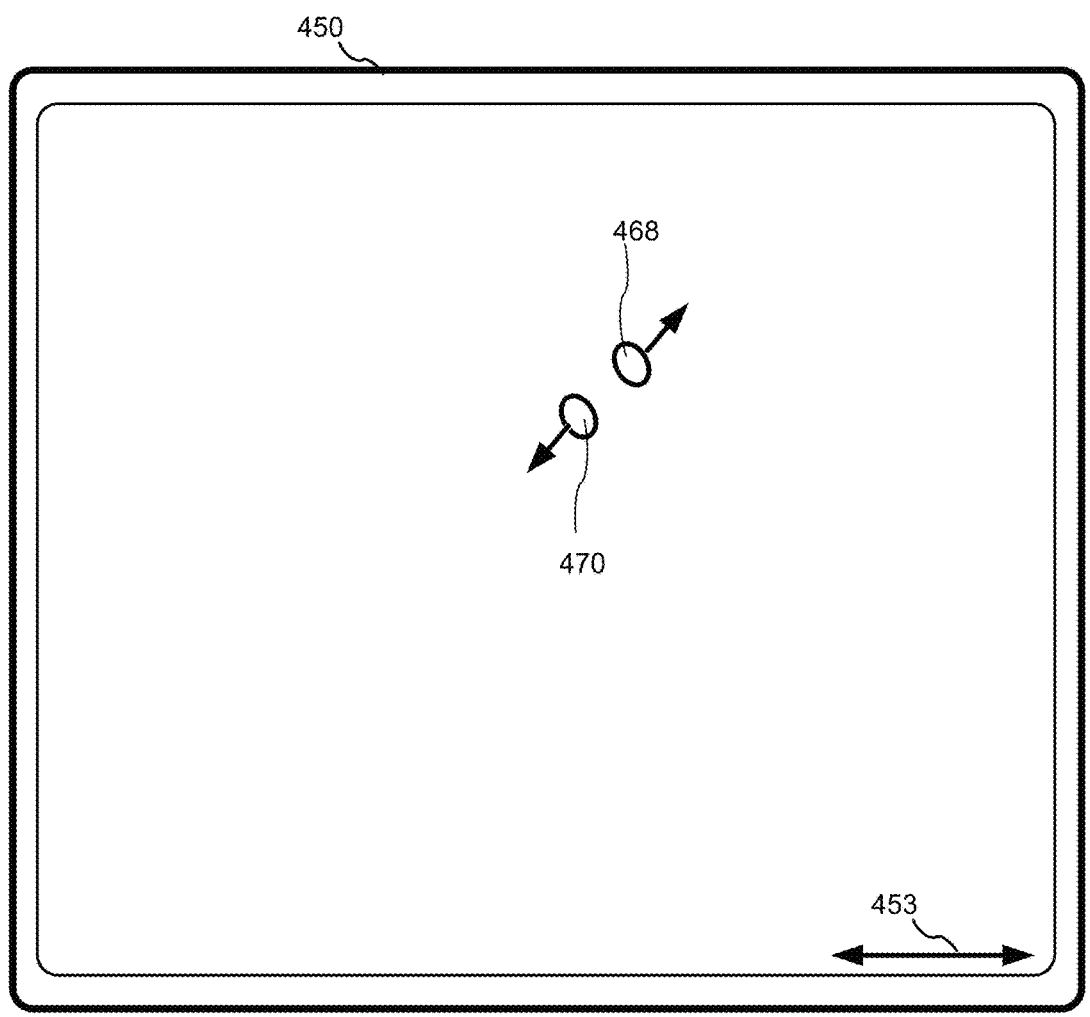
FIG. 4B illustrates an exemplary user interface for a multifunction device with a touch-sensitive surface that is separate from the display in accordance with some embodiments.
Figure 4B:
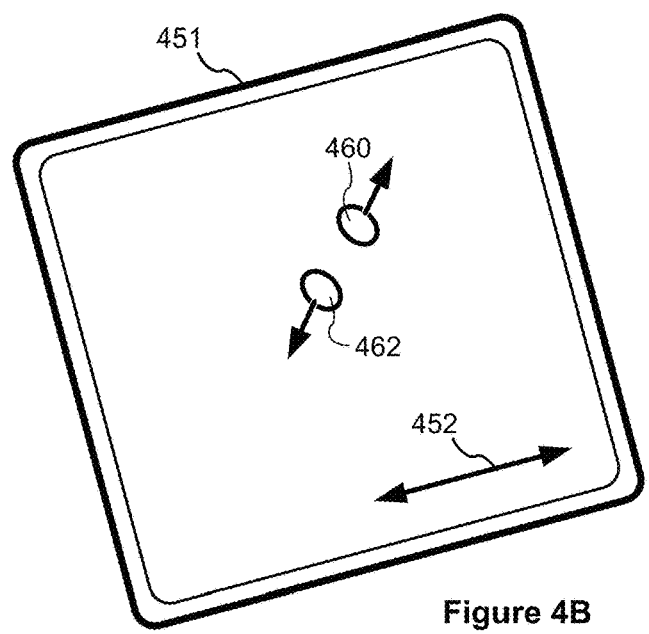

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112; display 340, FIG. 3). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

Figure 5A:
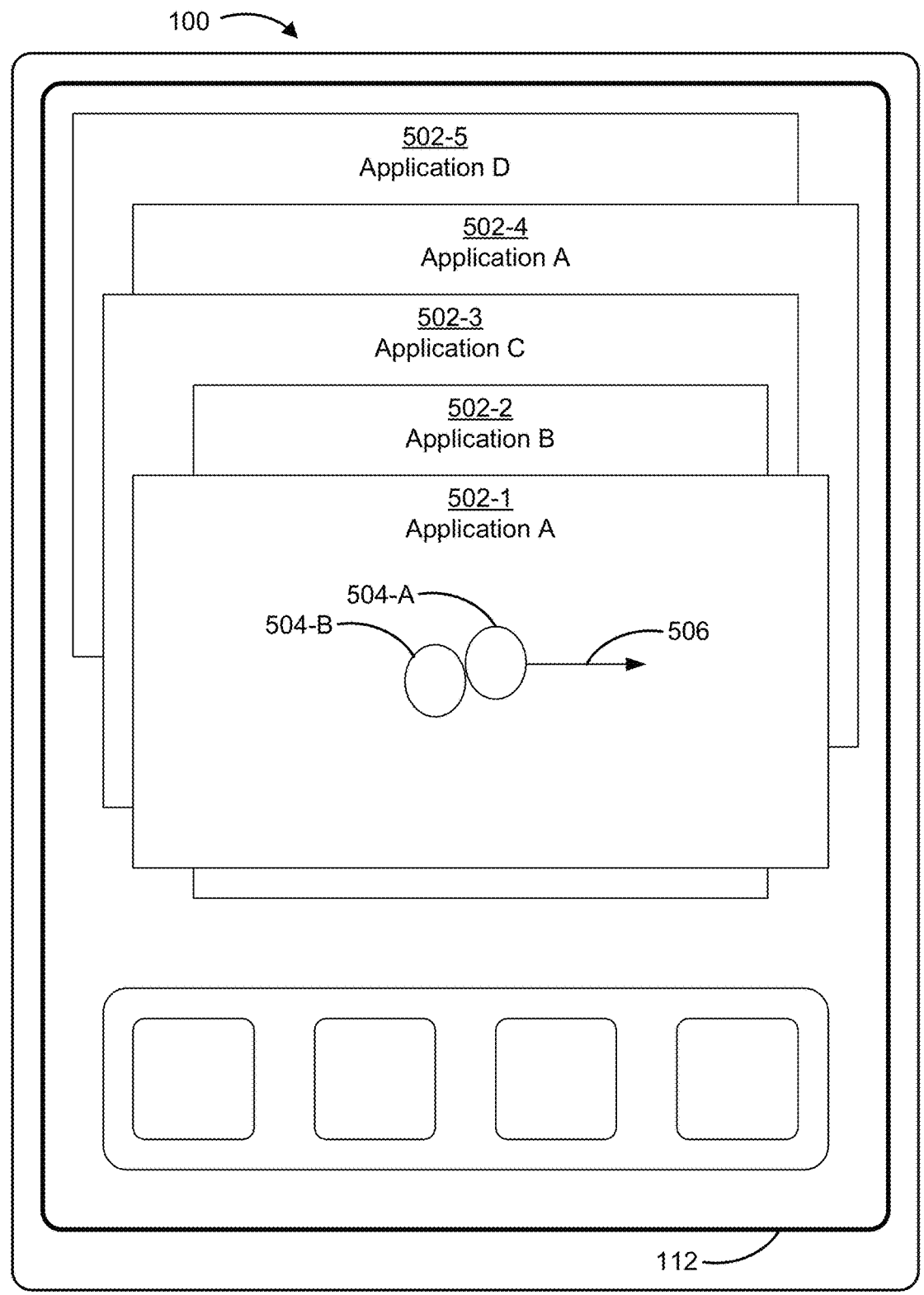
FIGS. 5A-5CC illustrate exemplary user interfaces for controlling display of application windows in accordance with some embodiments.
Figure 5B:
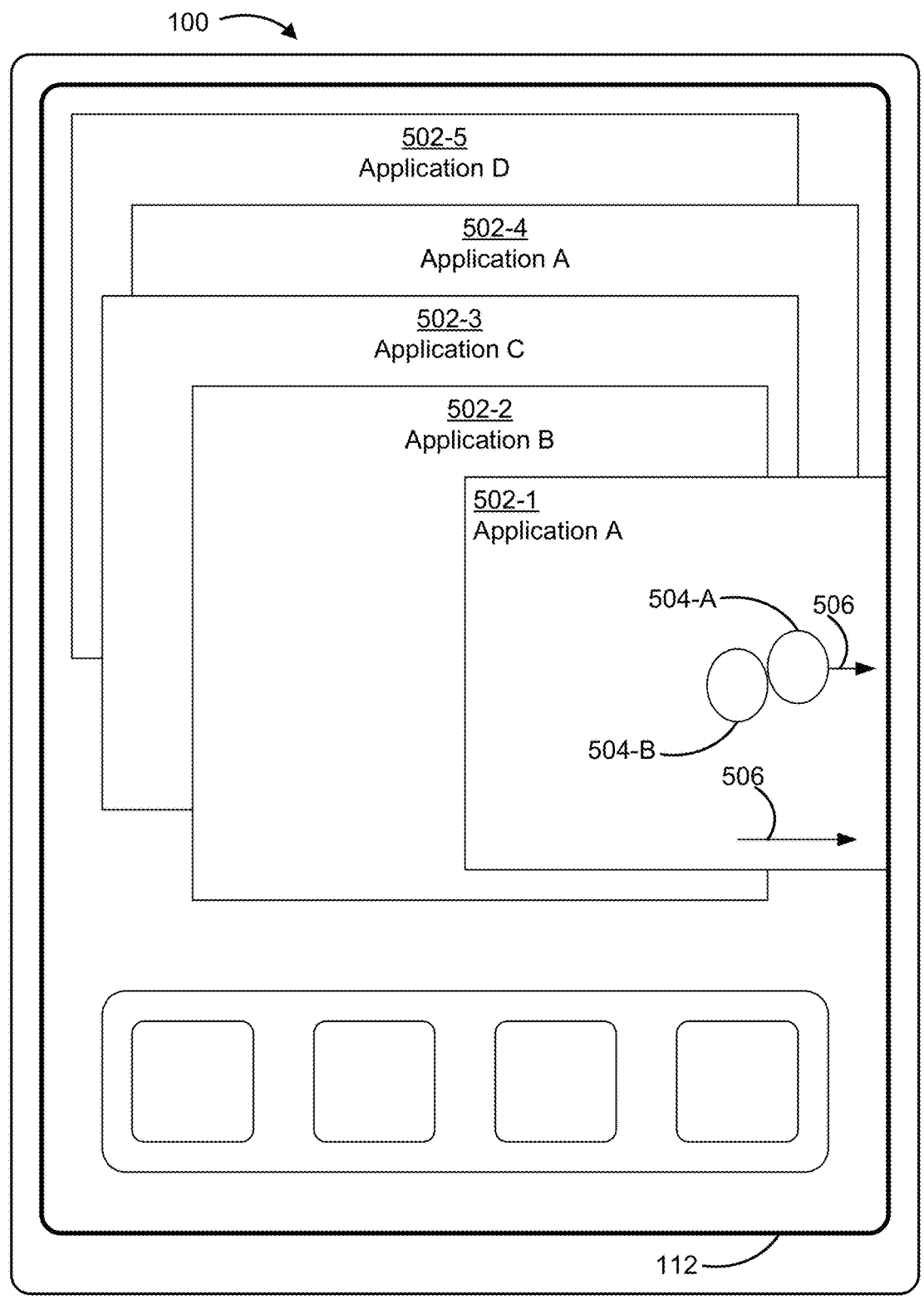
Figure 5C:
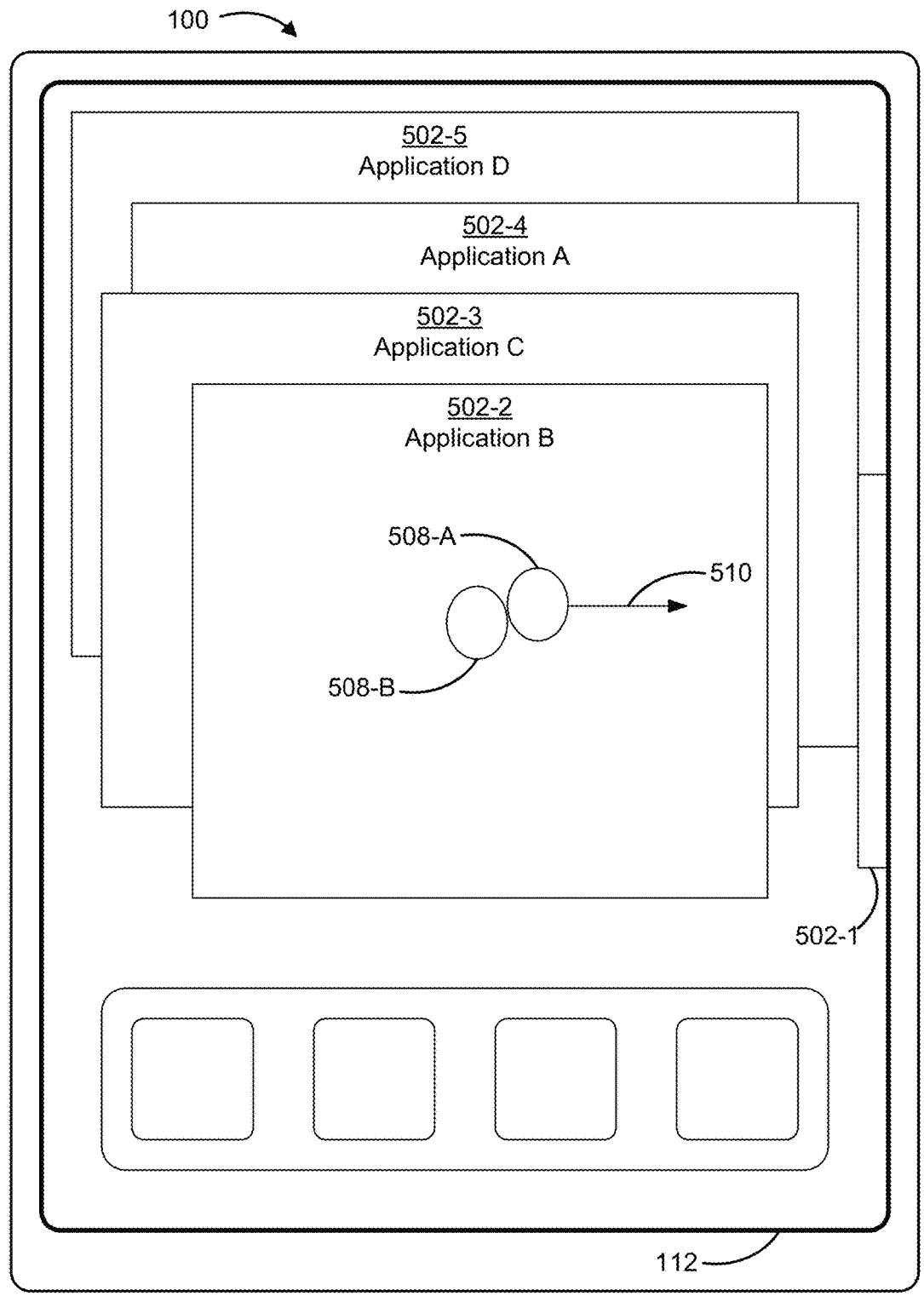

FIGS. 5A-5CC illustrate exemplary user interfaces for controlling display of application windows in accordance with some embodiments. The user interfaces in these figures are used to illustrate the processes described below, including the processes in FIGS. 6A-6C and 7A-7E.

FIG. 5A illustrates multiple windows 502 displayed on touch-sensitive display 112 of device 100. In some embodiments, each of windows 502 corresponds to a respective application (e.g., an application, an operating system feature that may be presented in a window, a computer program). For example, windows 502-1 and 502-4 correspond to a first application ("Application A"), window 502-2 corresponds to a second application ("Application B"), window 502-3 corresponds to a third application ("Application C"), and window 502-5 corresponds to a fourth application ("Application D").

Windows 502 are displayed in a layer order (e.g., a front-to-back order, a z-order). For example, in FIG. 5A, window 502-1 is in the frontmost position in the order, above the other windows 502-2 thru 502-5; window 502-1 is in the foreground. Window 502-2 is in the next position below in the order, followed by window 502-3 and 502-4. Window 502-5 is in the lowest position in the order; window 502-5 is furthest to the back.

Gesture 504 is detected on touch-sensitive display 112. Gesture 504 includes contacts 504-A and 504-B moving in direction 506. Direction 506 corresponds to a horizontal rightward direction on touch-sensitive display 112. In some embodiments, gesture 504 is a swipe, flick, or drag gesture.

In response to the detection of gesture 504, window 502-1 moves in accordance with direction 506; window 502-1 moves in direction 506. As window 502-1 moves in direction 506, window 502-1 is moving off of display 112, as shown in FIG. 5B. Window 502-1 continues moving in direction 506 until window 502-1 has moved fully off or partially off (e.g., almost fully off, such as having a pre-defined pixel width or percentage of the window still displayed proximate to an edge of display 112) of display 112, as shown in FIG. 5C. In FIG. 5C, with window 502-1 partially off of display 112 (or fully off of display 112, not shown), window 502-2 becomes the frontmost window among the remaining windows 502-2 thru 502-5.

While window 502-1 is still partially off of display 112 and window 502-2 is frontmost, gesture 508 is detected on touch-sensitive display 112. Gesture 508 includes contacts 508-A and 508-B moving in direction 510. Direction 510 corresponds to a horizontal rightward direction on touch-sensitive display 112. In some embodiments, gesture 508 is a swipe, flick, or drag gesture.

Figure 5D:
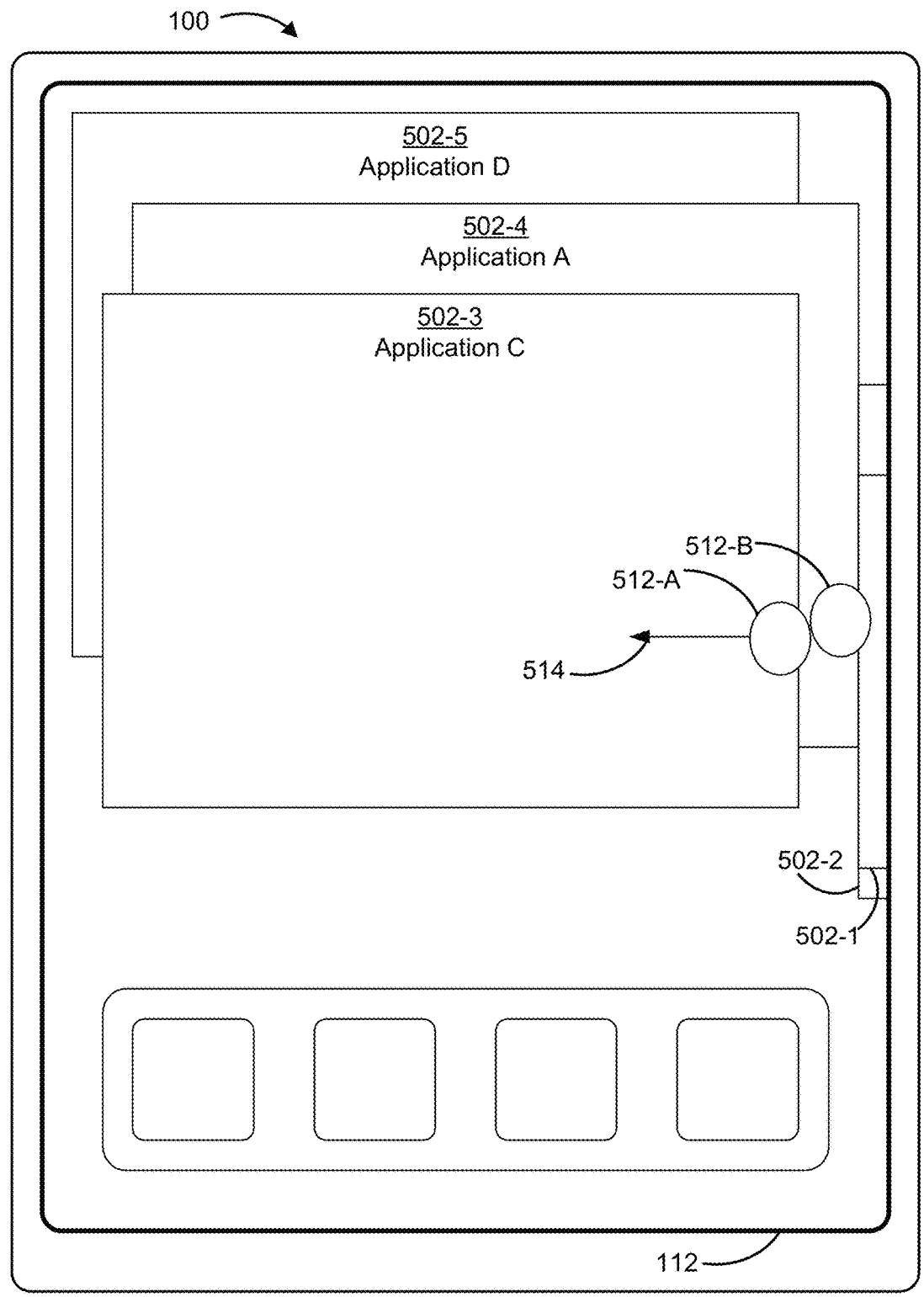

In response to the detection of gesture 508, window 502-2 moves in accordance with direction 510; window 502-2 moves in direction 510, in a similar manner as window 502-1 moves in direction 506. As window 502-2 moves in direction 510, window 502-2 is moving off of display 112. Window 502-2 continues moving in direction 510 until window 502-2 has moved fully or partially off of display 112, as shown in FIG. 5D. In FIG. 5D, with windows 502-1 and 502-2 partially off of display 112 (or fully off of display 112, not shown), window 502-3 becomes the frontmost window among the remaining windows 502-3 thru 502-5.

While windows 502-1 and 502-2 are still partially off of display 112 and window 502-3 is frontmost, gesture 512 is detected on touch-sensitive display 112. Gesture 512 includes contacts 512-A and 512-B moving in direction 514. Direction 514 corresponds to a horizontal leftward direction on touch-sensitive display 112; direction 514 is opposite of direction 510 (FIG. 5C). In some embodiments, gesture 512 is a swipe, flick, or drag gesture.

Figure 5E:
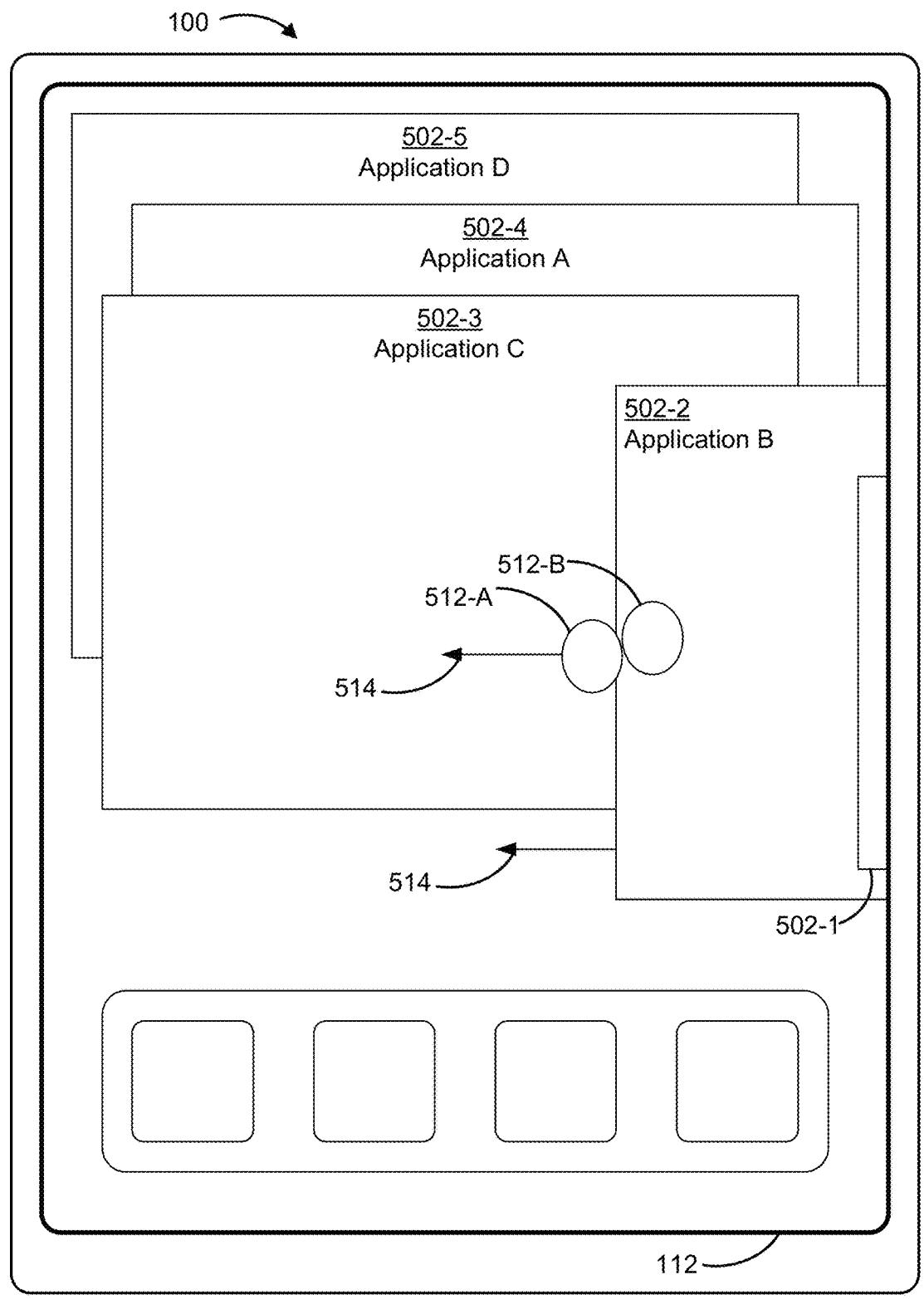
Figure 5F:
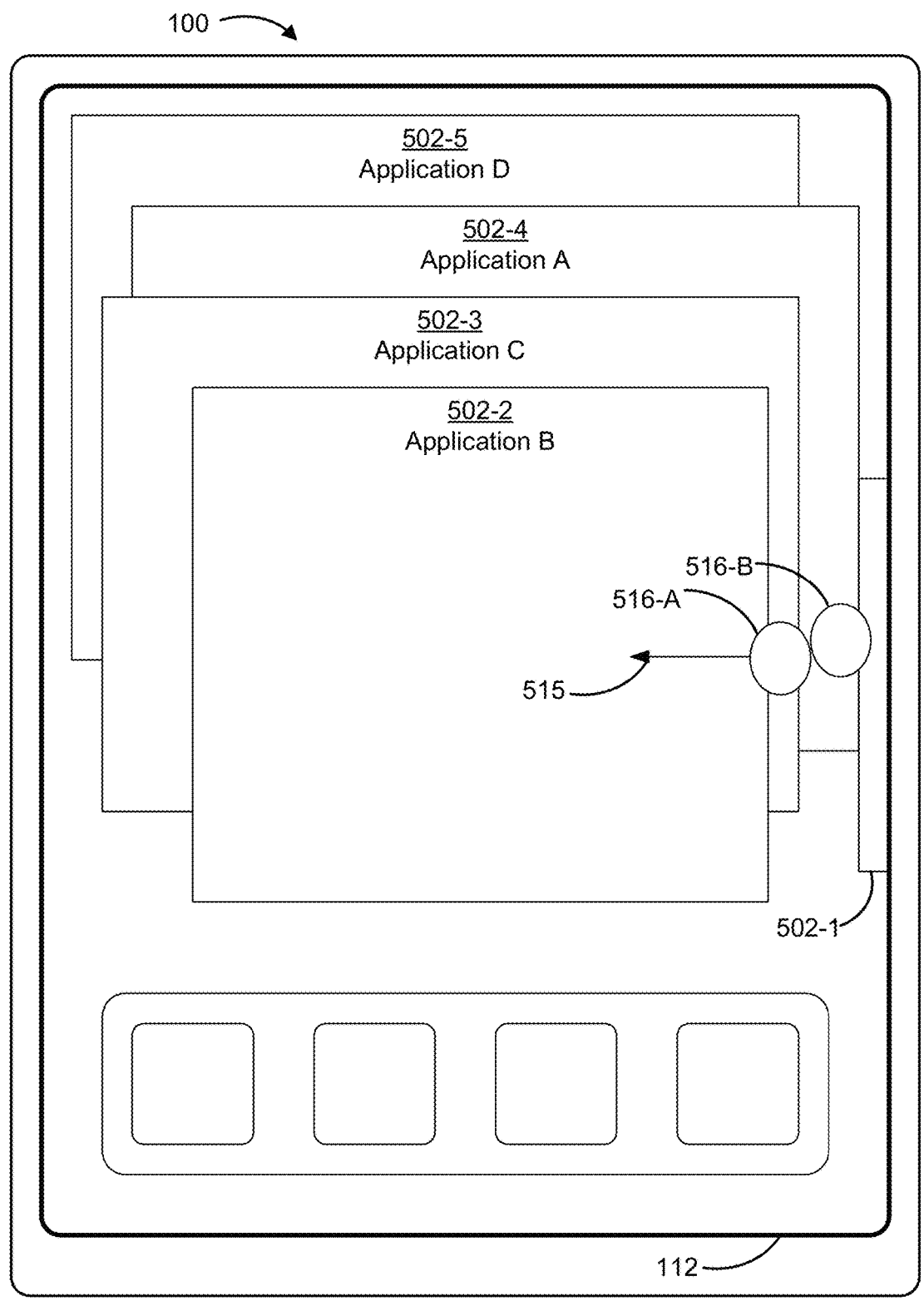

In response to the detection of gesture 512, window 502-2 moves in accordance with direction 514; window 502-2 moves in direction 514. As window 502-2 moves in direction 514, window 502-2 is moving back onto display 112, as shown in FIG. 5E. Window 502-2 continues moving in direction 514 until window 502-2 moves back into, and is redisplayed at, the position it had just prior to the detection of gesture 508, as shown in FIG. 5F. In FIG. 5F, window 502-2 is the frontmost window among the remaining windows 502-2 thru 502-5.

While window 502-1 is still partially off of display 112 and window 502-2 is frontmost, gesture 516 is detected on touch-sensitive display 112. Gesture 516 includes contacts 516-A and 516-B moving in direction 515. Direction 515 corresponds to a horizontal leftward direction on touch-sensitive display 112; direction 515 is opposite of direction 506 (FIG. 5A). In some embodiments, gesture 516 is a swipe, flick, or drag gesture.

Figure 5G:
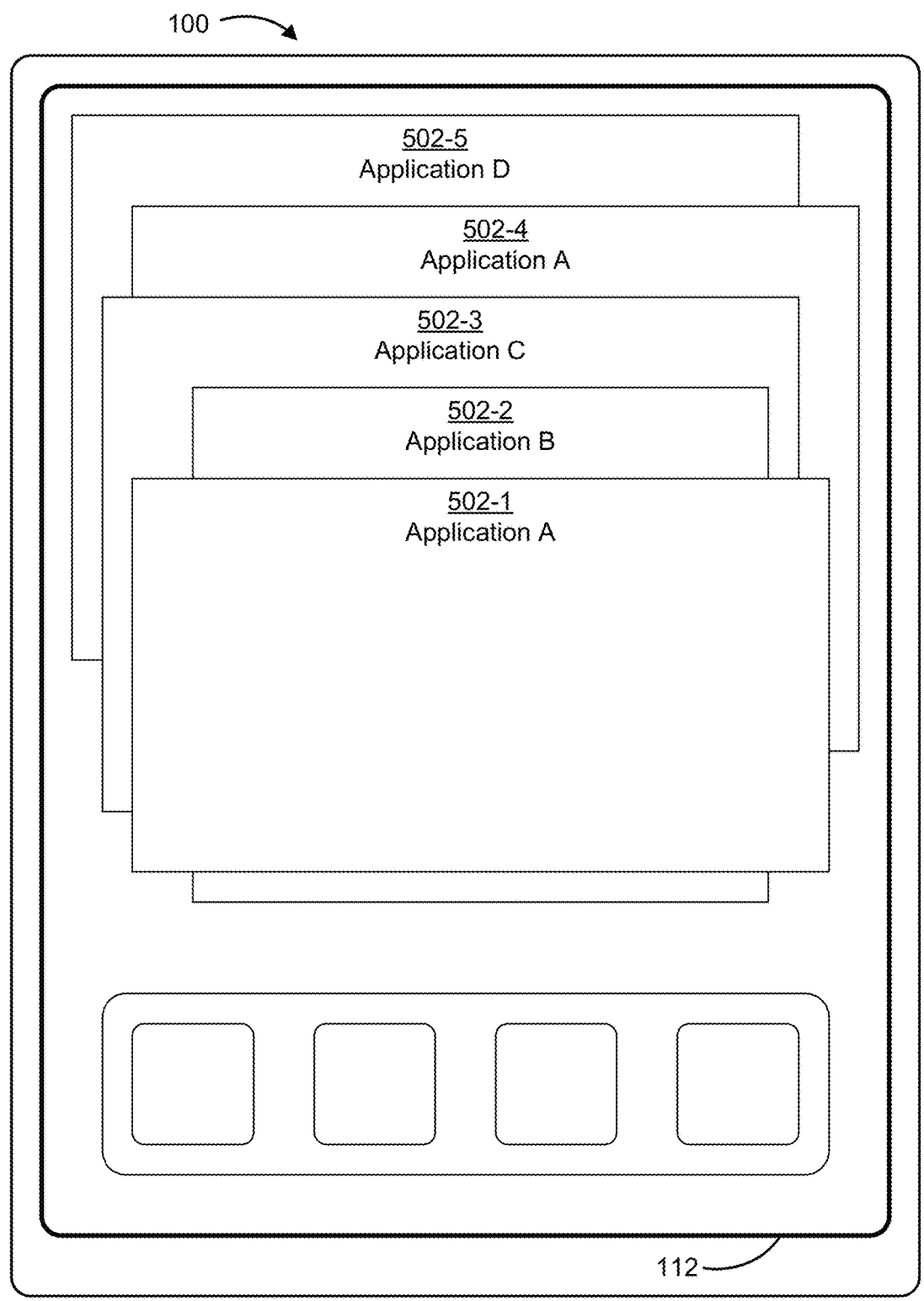

In response to the detection of gesture 516, window 502-1 moves in accordance with direction 515; window 502-1 moves in direction 515. As window 502-1 moves in direction 515, window 502-1 is moving back onto display 112. Window 502-1 continues moving in direction 515 until window 502-1 moves back into, and is redisplayed at, the position it had just prior to the detection of gesture 504, as shown in FIG. 5G. In FIG. 5G, window 502-1 is the frontmost window among windows 502 that are displayed on display 112; windows 502-1 thru 502-5 are displayed in the original layer order as depicted in FIG. 5A.

In some embodiments, when a window 502 moves, an animation showing the movement may be displayed. For example, FIG. 5B depicts an instant in the animation of the movement of window 502-1 partially off of display 112. FIG. 5E depicts an instant in the animation of the movement of window 502-2 back onto display 112. For sake of brevity, respective instants in the movement of window 502-2 partially off of display 112 and the movement of window 502-1 back onto display 112 are not shown in the figures.

FIGS. 5A-5G depict an example of embodiments where windows 502 move off of (fully or partially) and back onto display 112 one window at a time. In these embodiments, even if there are multiple windows corresponding to the same application, the multiple windows corresponding to the same application still move one at a time, one window moving per gesture. For example, in response to the detection of gesture 504, just window 502-1 moved off of display 112 even though window 502-4 corresponds to the same Application A as window 502-1. To move window 502-4 off of display 112, the user would, after performing gesture 508 to move window 502-2 off of display 112, perform a third gesture similar to gesture 508 to move window 502-3 off of display 112, and then perform a fourth gesture similar to gesture 508 to move window 502-4 off of the display.

Figure 5H:
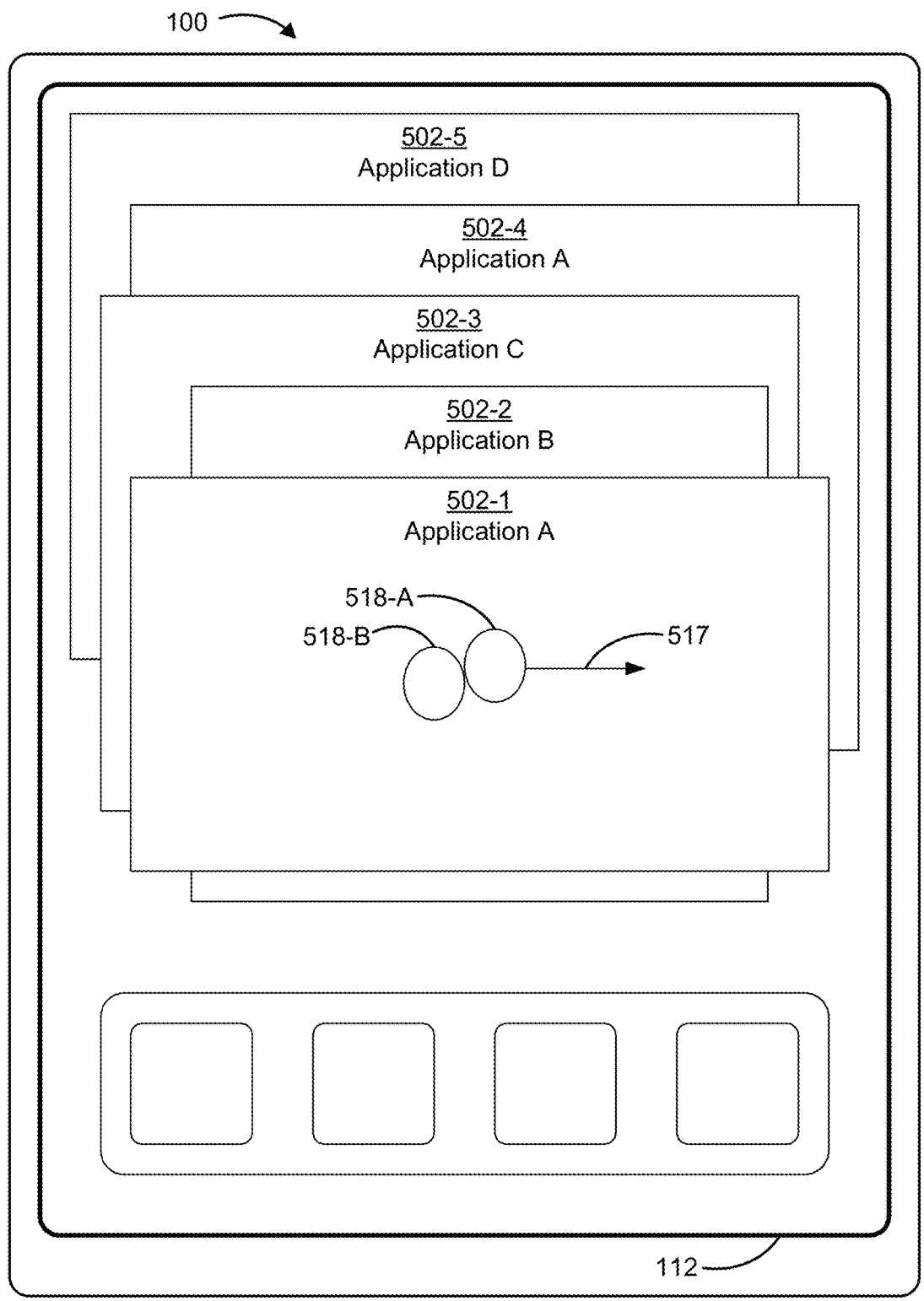

In some other embodiments, multiple windows corresponding to the same application move off of or back onto display 112 together, as opposed to one at a time. FIG. 5H illustrates windows 502-1 thru 502-5, with the same layer order as depicted in FIG. 5A. FIG. 5H shows gesture 518 being detected on touch-sensitive display 112. Gesture 518 includes contacts 518-A and 518-B moving in direction 517. Direction 517 corresponds to a horizontal rightward direction on touch-sensitive display 112. In some embodiments, gesture 518 is a swipe, flick, or drag gesture.

Figure 5I:
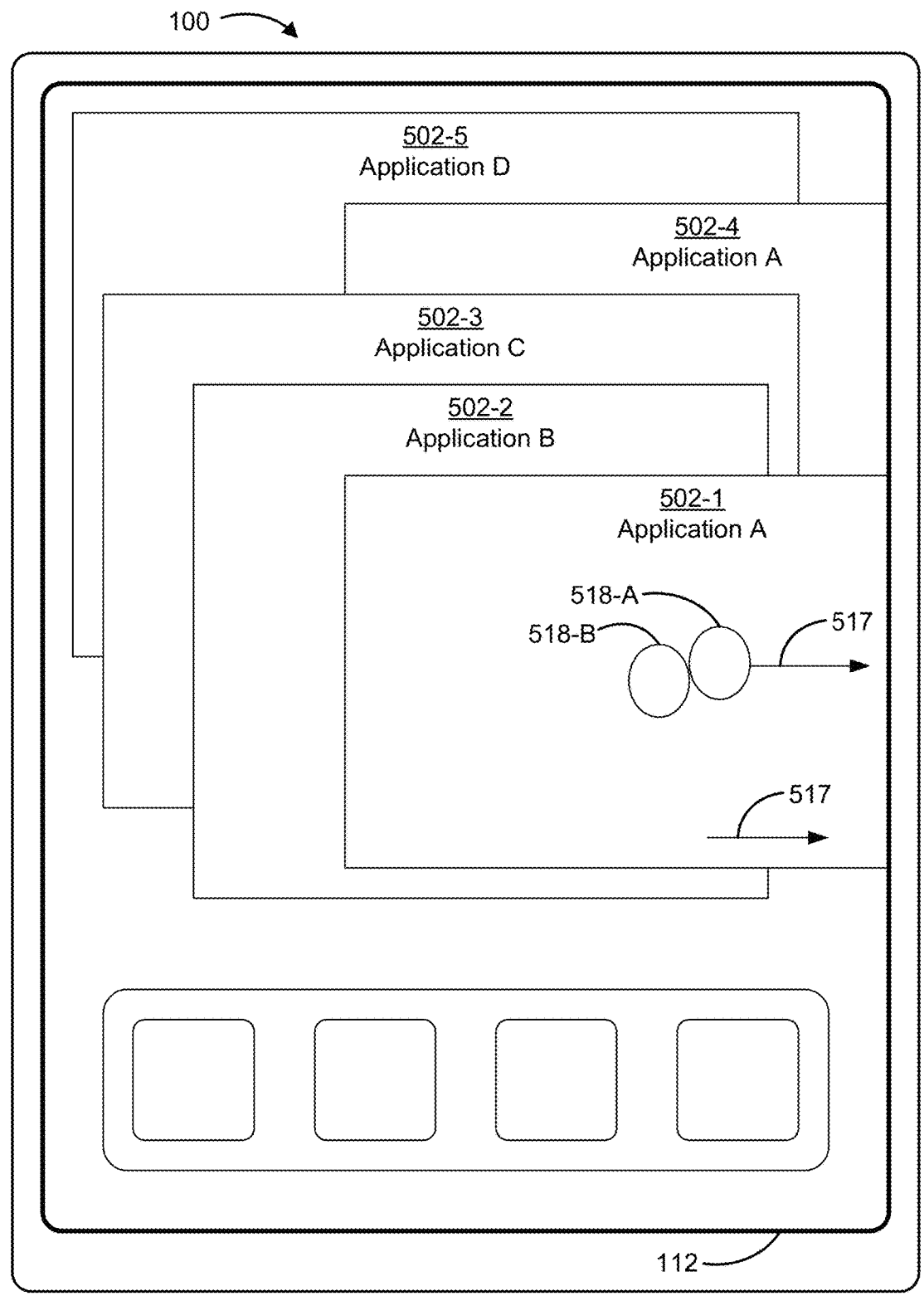
Figure 5J:
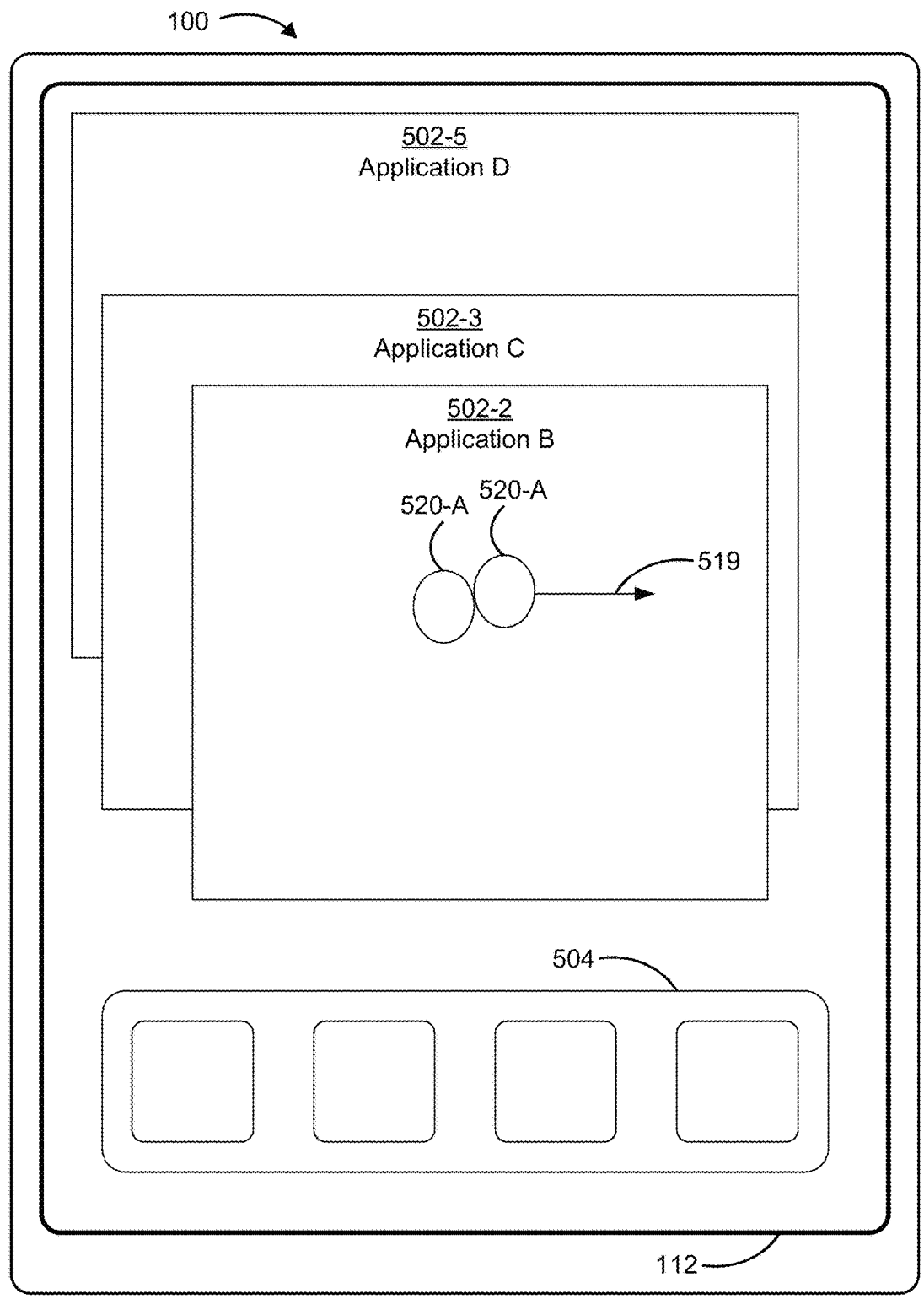

In response to the detection of gesture 518, windows 502-1 and 502-4 move together in accordance with direction 517; windows 502-1 and 502-4 move in direction 517. As windows 502-1 and 502-4 move in direction 517, windows 502-1 and 502-4 are moving off of display 112, as shown in FIG. 5I. Windows 502-1 and 502-4 continue moving in direction 517 until windows 502-1 and 502-4 have moved fully off (or partially off, not shown) of display 112, as shown in FIG. 5J. In FIG. 5J, with windows 502-1 and 502-4 fully off of display 112, window 502-2 becomes the frontmost window among the remaining windows 502-2, 502-3, and 502-5. Window 502-5, with window 502-4 off of display 112, becomes the next window below window 502-3.

While windows 502-1 and 502-4 are still off of display 112 and window 502-2 is frontmost, gesture 520 is detected on touch-sensitive display 112 (FIG. 5J). Gesture 520 includes contacts 520-A and 520-B moving in direction 519. Direction 519 corresponds to a horizontal rightward direction on touch-sensitive display 112. In some embodiments, gesture 520 is a swipe, flick, or drag gesture.

Figure 5K:
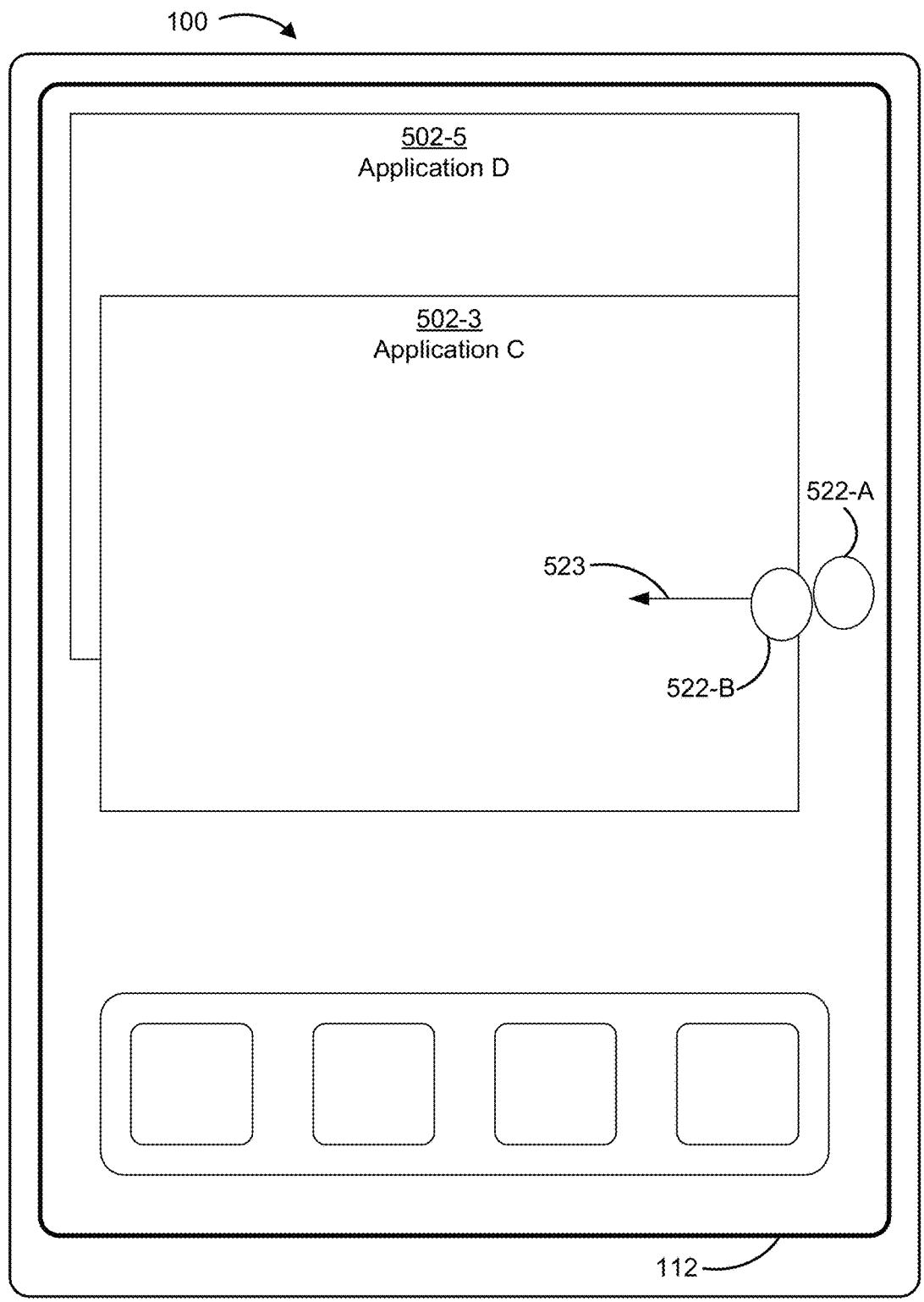

In response to the detection of gesture 520, window 502-2 moves in accordance with direction 519; window 502-2 moves in direction 519, in a similar manner as windows 502-1 and 502-4 move in direction 517. As window 502-2 moves in direction 519, window 502-2 is moving off of display 112. Window 502-2 continues moving in direction 517 until window 502-2 has moved fully off (or partially off, not shown) of display 112, as shown in FIG. 5K. In FIG. 5K, with windows 502-1, 502-2, and 502-4 fully off of display 112, window 502-3 becomes the frontmost window among the remaining windows 502-3 and 502-5.

While windows 502-1, 502-2, and 502-4 are still off of display 112 and window 502-3 is frontmost, gesture 522 is detected on touch-sensitive display 112 (FIG. 5K). Gesture 522 includes contacts 522-A and 522-B moving in direction 523. Direction 523 corresponds to a horizontal leftward direction on touch-sensitive display 112; direction 523 is opposite of direction 519 (FIG. 5J). In some embodiments, gesture 522 is a swipe, flick, or drag gesture.

Figure 5L:
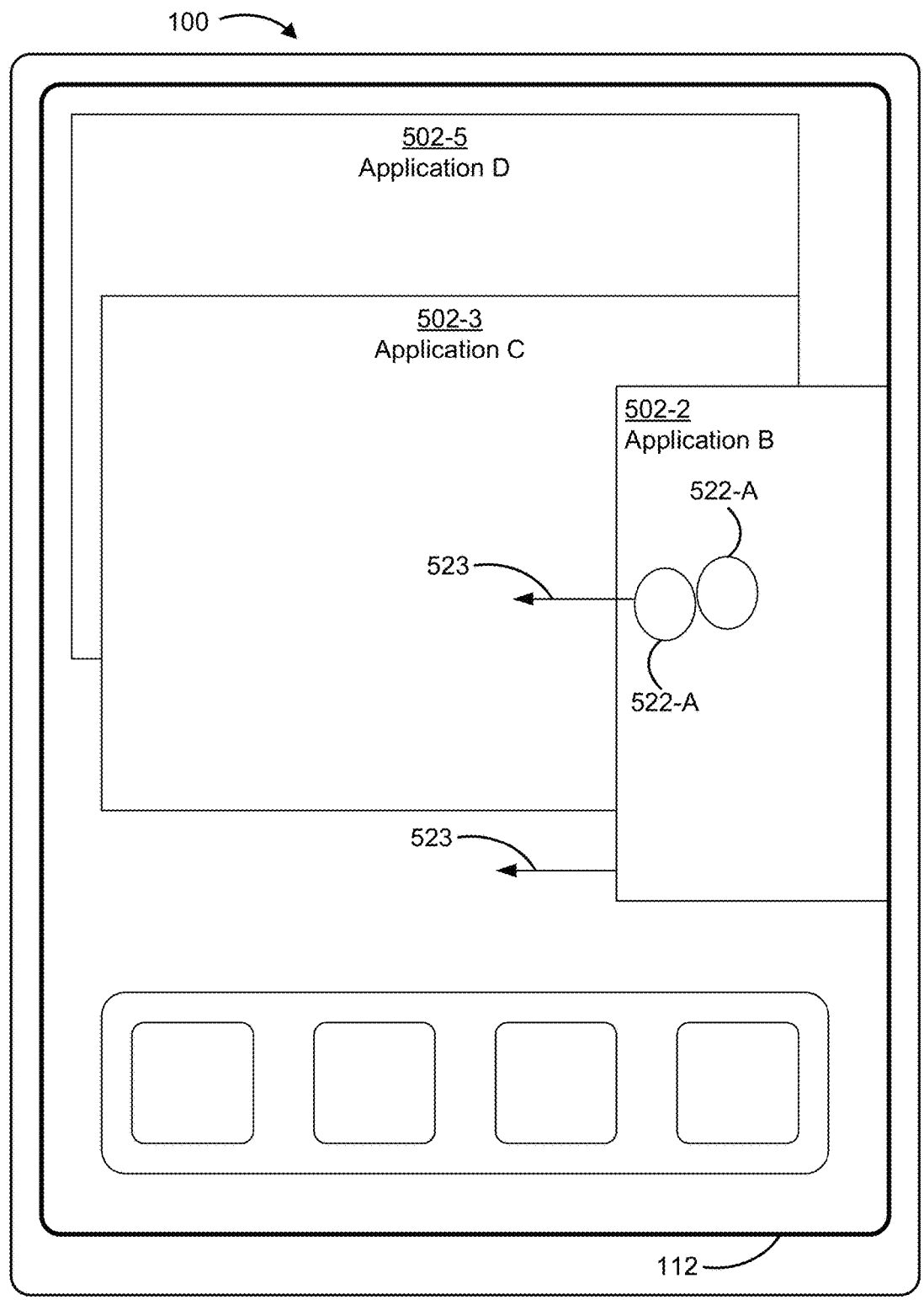
Figure 5M:
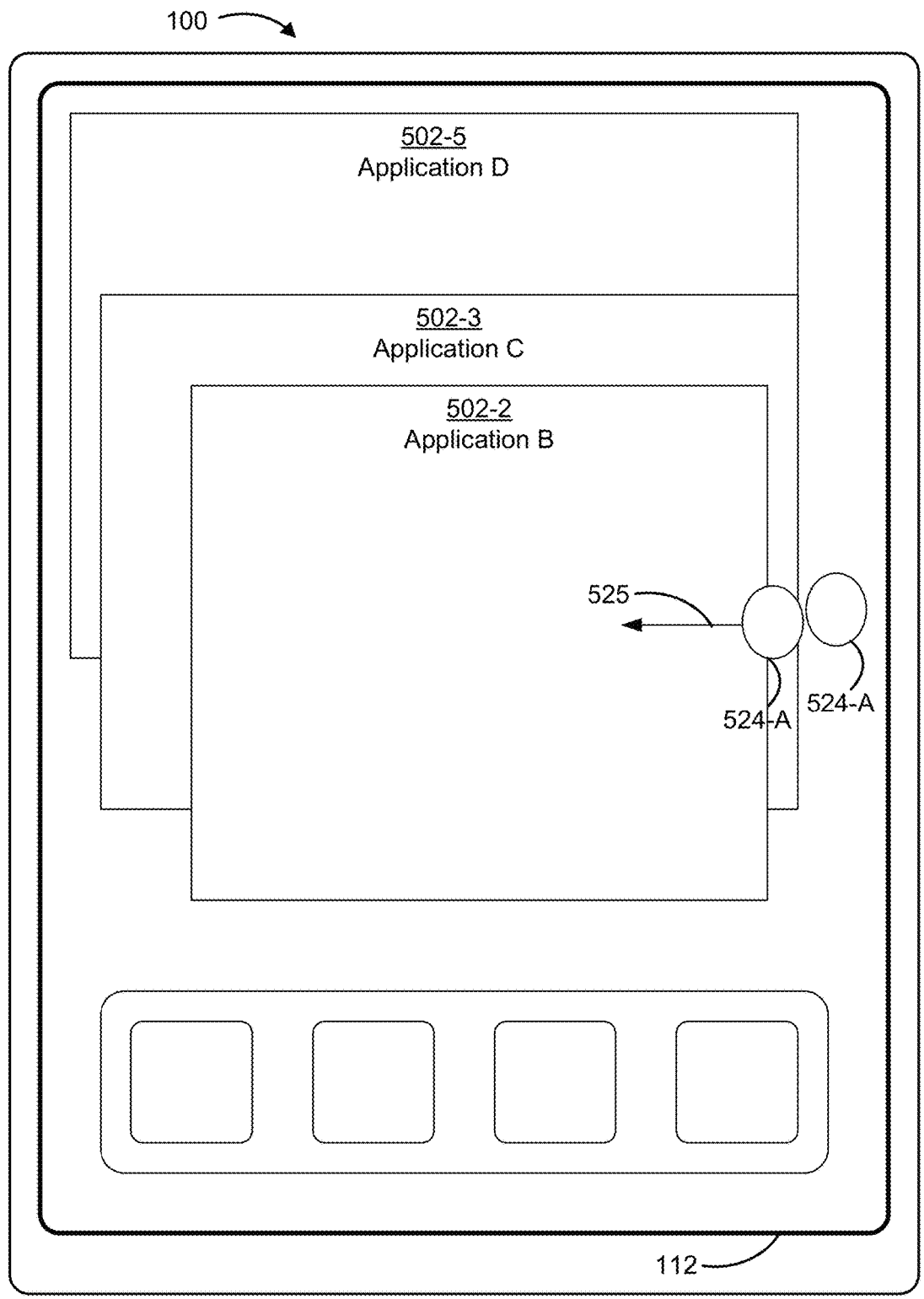

In response to the detection of gesture 522, window 502-2 moves in accordance with direction 523; window 502-2 moves in direction 523. As window 502-2 moves in direction 523, window 502-2 is moving back onto display 112, as shown in FIG. 5L. Window 502-2 continues moving in direction 523 until window 502-2 moves back into and is redisplayed at the position it had just prior to the detection of gesture 520, as shown in FIG. 5M. In FIG. 5M, window 502-2 is the frontmost window among the remaining windows 502-2, 502-3, and 502-5.

While windows 502-1 and 502-4 are still off of display 112 and window 502-2 is frontmost, gesture 524 is detected on touch-sensitive display 112 (FIG. 5M). Gesture 524 includes contacts 524-A and 524-B moving in direction 525. Direction 525 corresponds to a horizontal leftward direction on touch-sensitive display 112; direction 525 is opposite of direction 517 (FIG. 5H). In some embodiments, gesture 524 is a swipe, flick, or drag gesture.

Figure 5N:
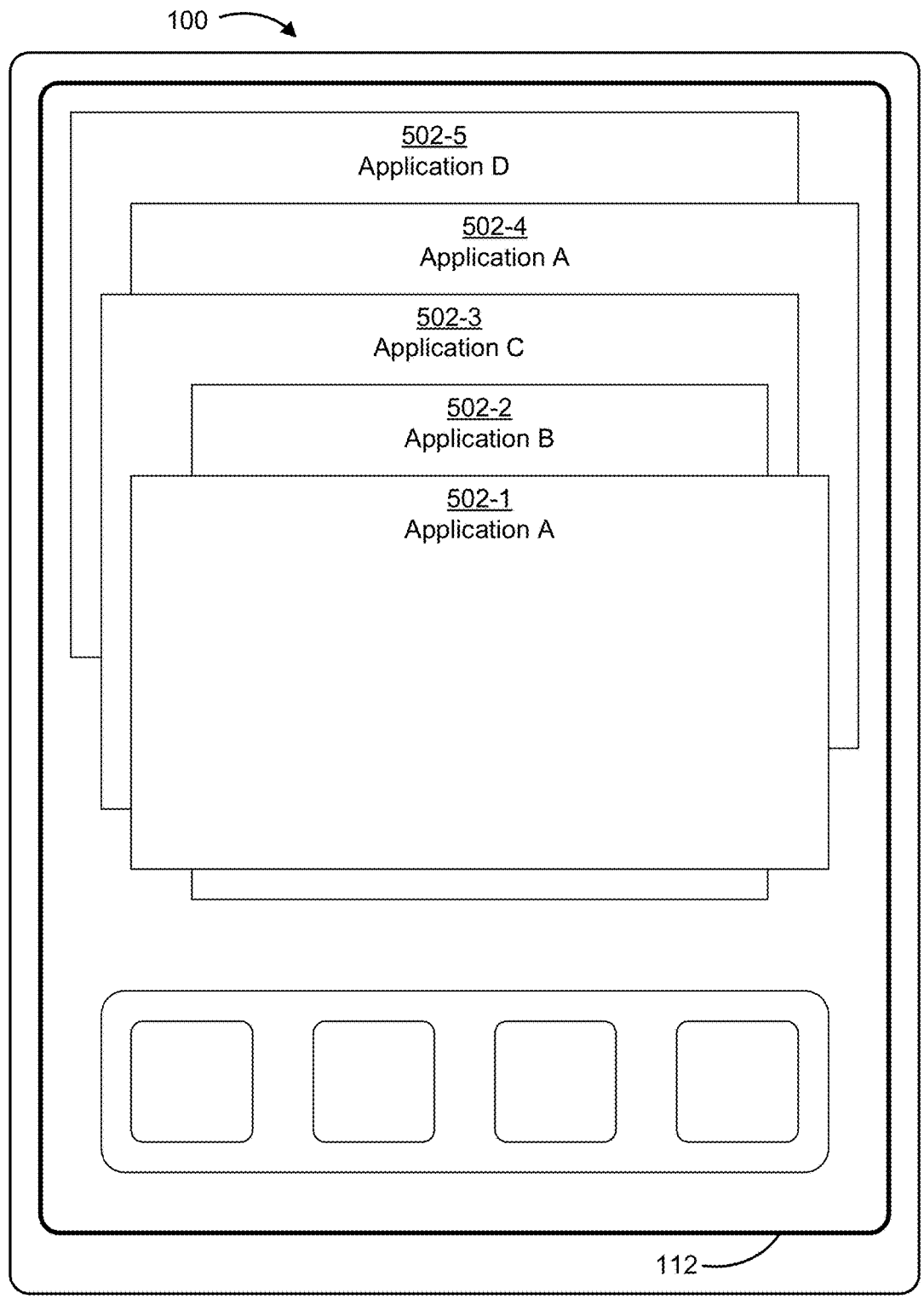

In response to the detection of gesture 524, windows 502-1 and 502-4 move together in accordance with direction 525; windows 502-1 and 502-4 move in direction 525. As windows 502-1 and 502-4 move in direction 525, windows 502-1 and 502-4 are moving back onto display 112. Windows 502-1 and 502-4 continue moving in direction 525 until windows 502-1 and 502-4 have moved back into and are redisplayed at the positions they had just prior to the detection of gesture 518, as shown in FIG. 5N. In FIG. 5N, window 502-1 is the frontmost window among windows 502 that are displayed on display 112 and window 502-4 is displayed between windows 502-3 and 502-5 in the layer order; windows 502-1 thru 502-5 are displayed in the original layer order as depicted in FIG. 5H.

In some embodiments, when a window 502 moves, an animation showing the movement may be displayed. For example, FIG. 5I depicts an instant in the animation of the movement of windows 502-1 and 502-4 off of display 112. FIG. 5L depicts an instant in the animation of the movement of window 502-2 back onto display 112. For sake of brevity, respective instants in the movement of window 502-2 off of display 112 and the movement of windows 502-1 and 502-4 back onto display 112 are not shown in the figures.

Figure 5O:
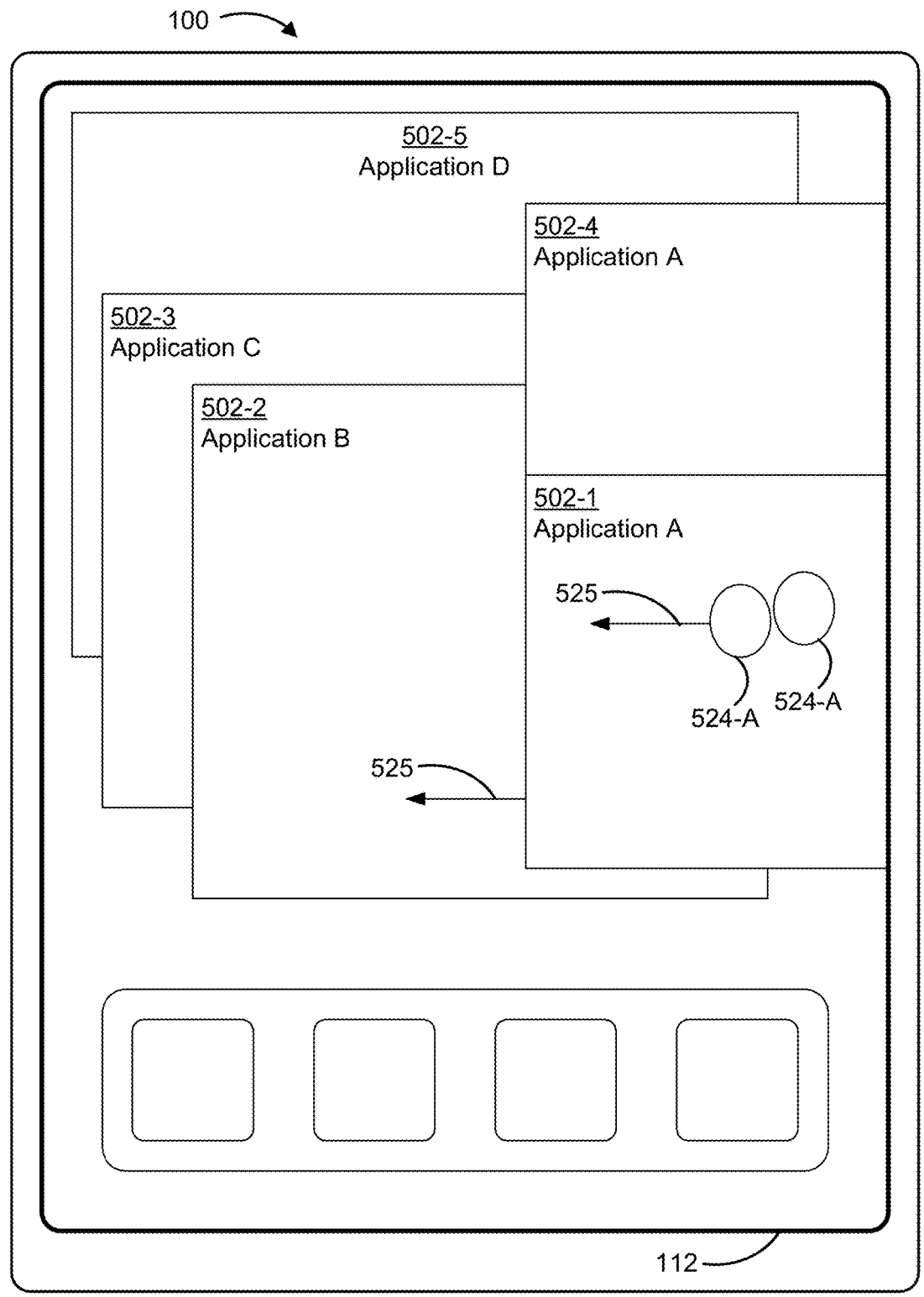
Figure 5P:
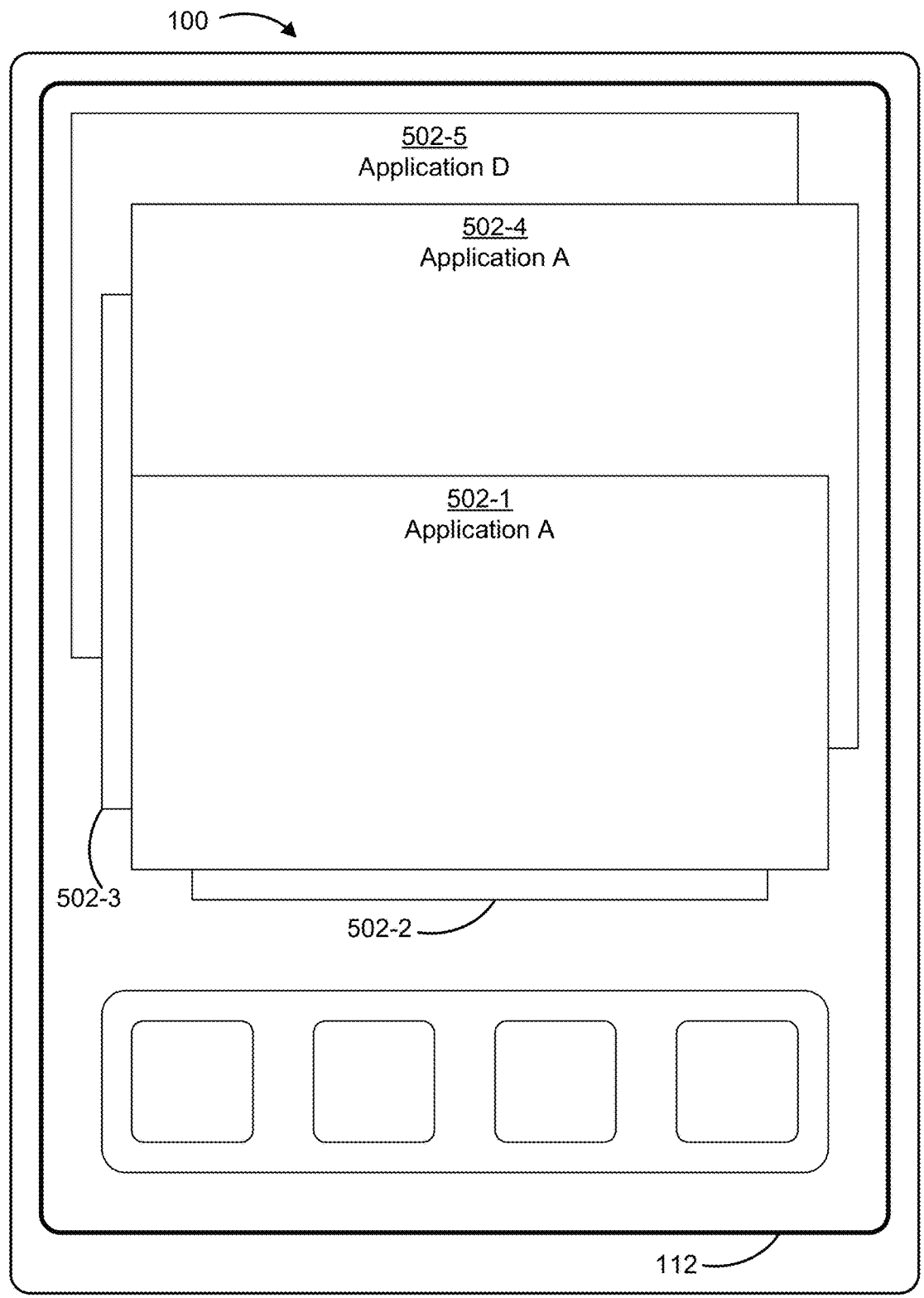

In FIG. 5N, when windows 502-1 and 502-4 move back onto display 112, they resumed their respective positions in the original layer order as depicted in FIG. 5H. Alternatively, in some embodiments, when multiple windows corresponding to the same application move back onto display 112, the windows among these multiple windows that are further back in the layer order may "jump" ahead in the layer order, so that windows corresponding to the same redisplayed application have consecutive positions in the layer order at the front of the layer order. For example, FIGS. 5O-5P depicts an alternative response to the detection of gesture 524. FIG. 5O depicts an instant in the movement of windows of 502-1 and 502-4, in the alternative response, back onto display 112. In FIG. 5O, window 502-1 is displayed as moving into its original frontmost position in the layer order, while window 502-4 is displayed as moving into a position above windows 502-2 and 502-3, and just below window 502-1, in the layer order. In FIG. 5P, which shows windows 502-1 and 502-4 redisplayed on display 112, window 502-1 is redisplayed in the frontmost position in the layer order, and window 502-4 is displayed in the next position below. Windows 502-2 and 502-3 are partially obscured by window 502-4, which "jumped" ahead in the layer order.

Figure 5Q:
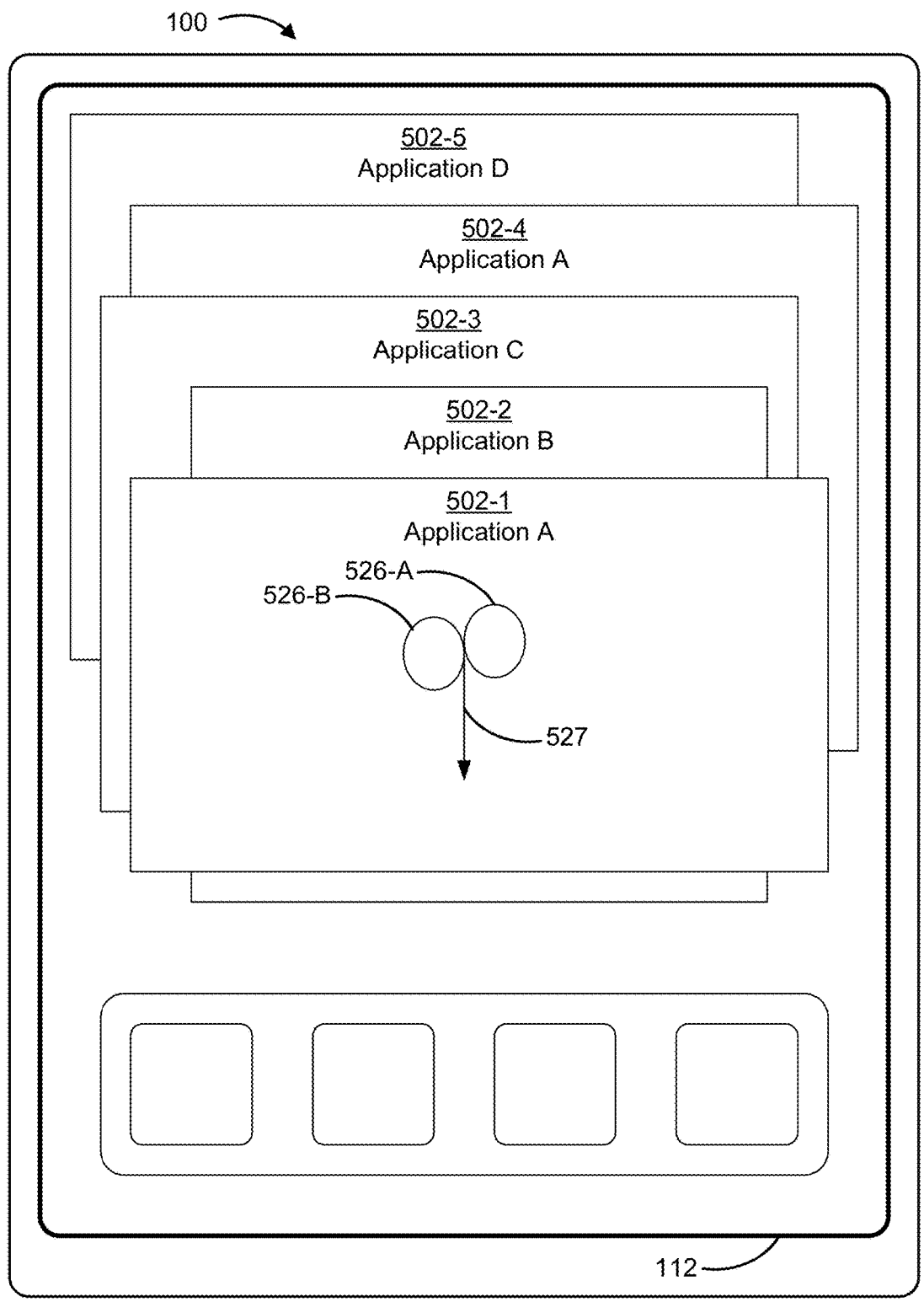

Although FIGS. 5A-5P depict gestures that move in horizontal directions (rightward or leftward), in some other embodiments, the gestures may move in vertical or diagonal directions, and the windows move in vertical or diagonal directions in response. FIG. 5Q depicts windows 502-1 thru 502-5 in the same layer order as depicted in FIG. 5A. Gesture 526 is detected on touch-sensitive display 112. Gesture 526 includes contacts 526-A and 526-B moving in direction 527. Direction 527 corresponds to a vertical downward direction on touch-sensitive display 112. In some embodiments, gesture 526 is a swipe, flick, or drag gesture.

Figure 5R:
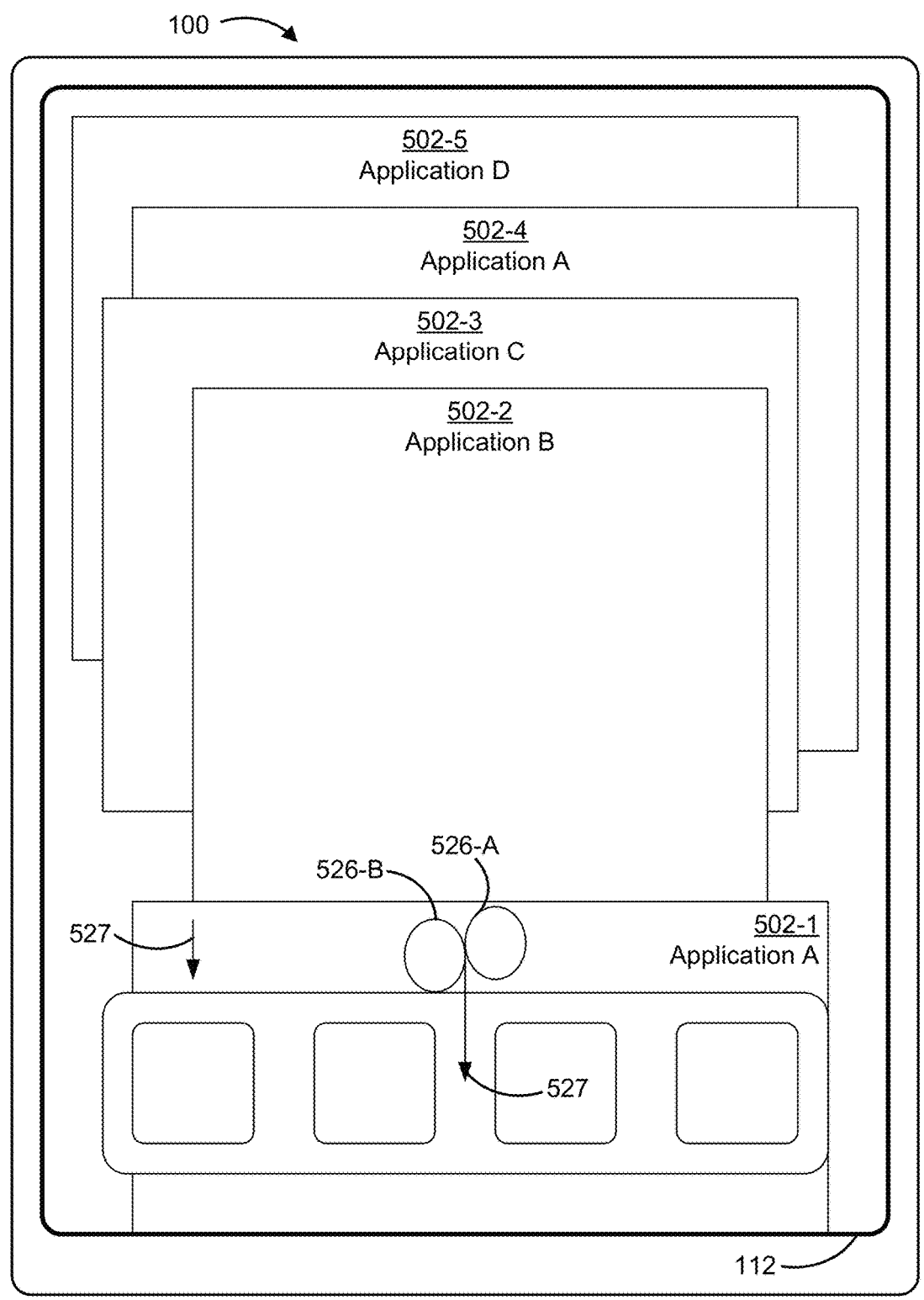
Figure 5S:
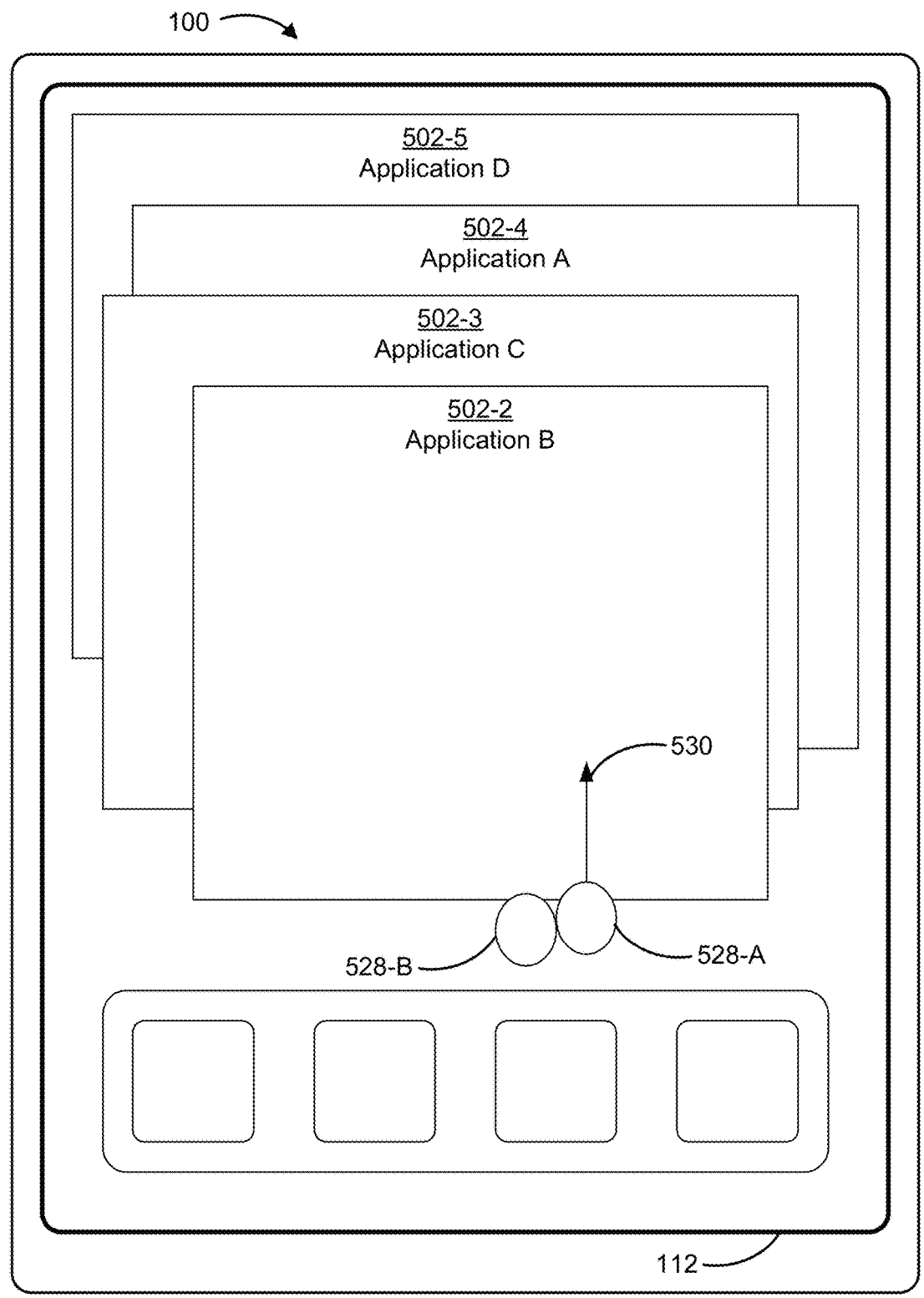

In response to the detection of gesture 526, window 502-1 moves in accordance with direction 527. As window 502-1 moves in direction 527, window 502-1 is moving off of display 112, as shown in FIG. 5R. Window 502-1 continues moving in direction 527 until window 502-1 has moved fully off (or partially off, not shown) of display 112, as shown in FIG. 5S. In FIG. 5S, with window 502-1 off of display 112, window 502-2 becomes the frontmost window among the remaining windows 502-2 thru 502-5.

While window 502-1 is still off of display 112 and window 502-2 is frontmost, gesture 528 is detected on touch-sensitive display 112 (FIG. 5S). Gesture 528 includes contacts 528-A and 528-B moving in direction 530. Direction 530 corresponds to a vertical upward direction on touch-sensitive display 112; direction 530 is opposite of direction 527. In some embodiments, gesture 528 is a swipe, flick, or drag gesture.

Figure 5T:
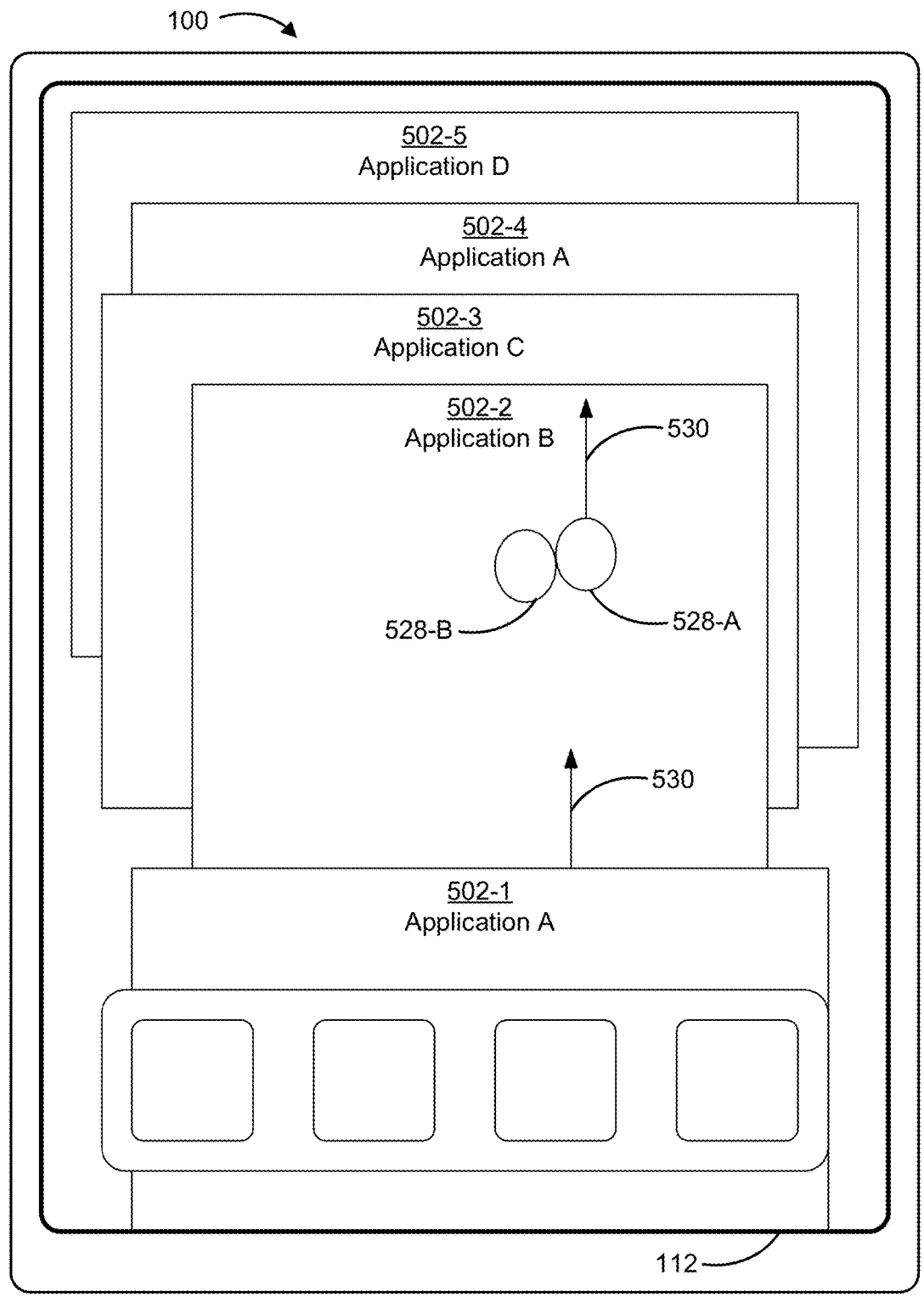
Figure 5U:
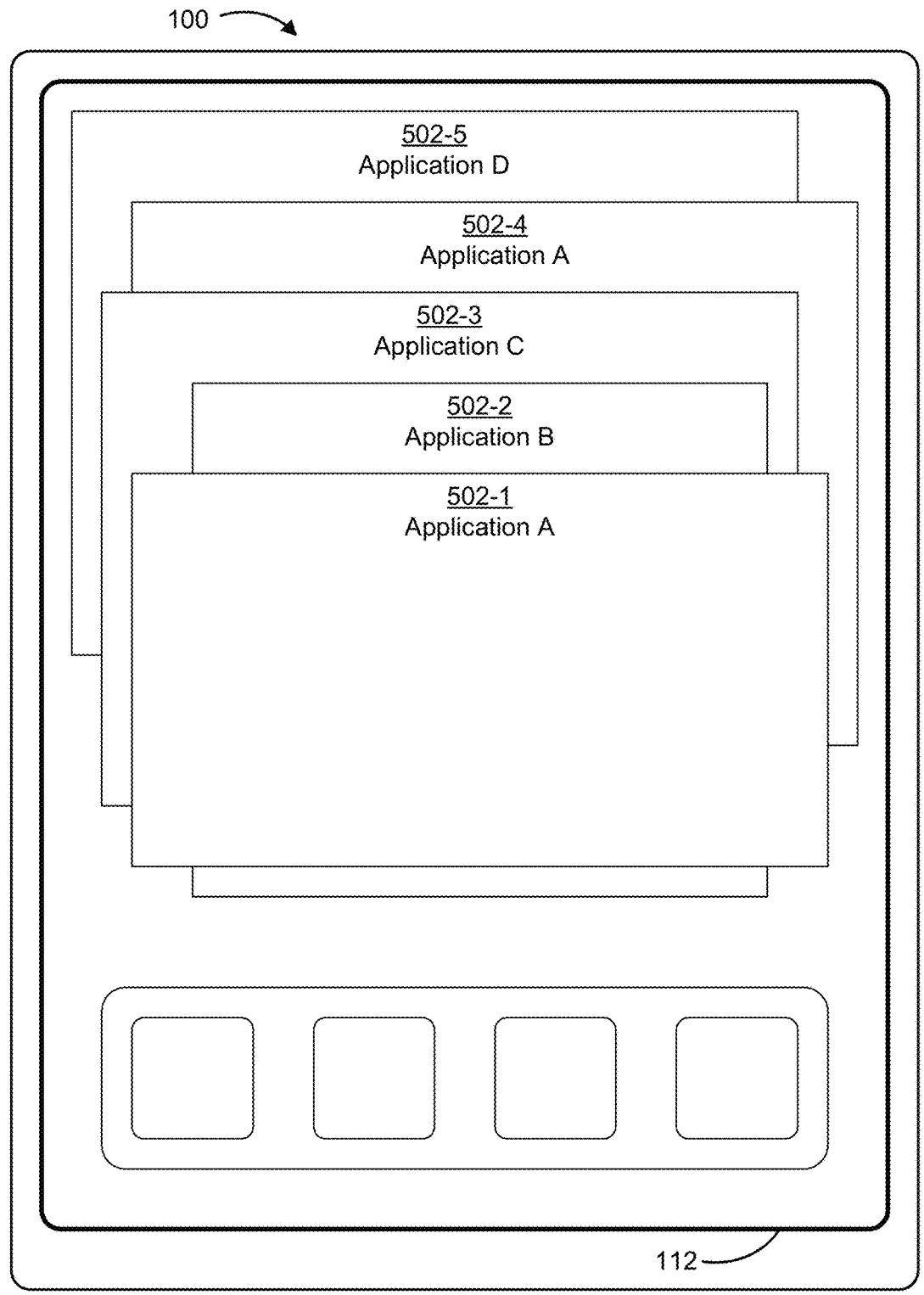

In response to the detection of gesture 528, window 502-1 moves in accordance with direction 530. As window 502-1 moves in direction 530, window 502-1 is moving back onto display 112, as shown in FIG. 5T. Window 502-1 continues moving in direction 530 until window 502-1 moves back into, and is redisplayed at, the position it had just prior to the detection of gesture 526, as shown in FIG. 5U. In FIG. 5U, window 502-1 is the frontmost window among windows 502 that are displayed on display 112; windows 502-1 thru 502-5 are displayed in the original layer order as depicted in FIG. 5A.

Figure 5V:
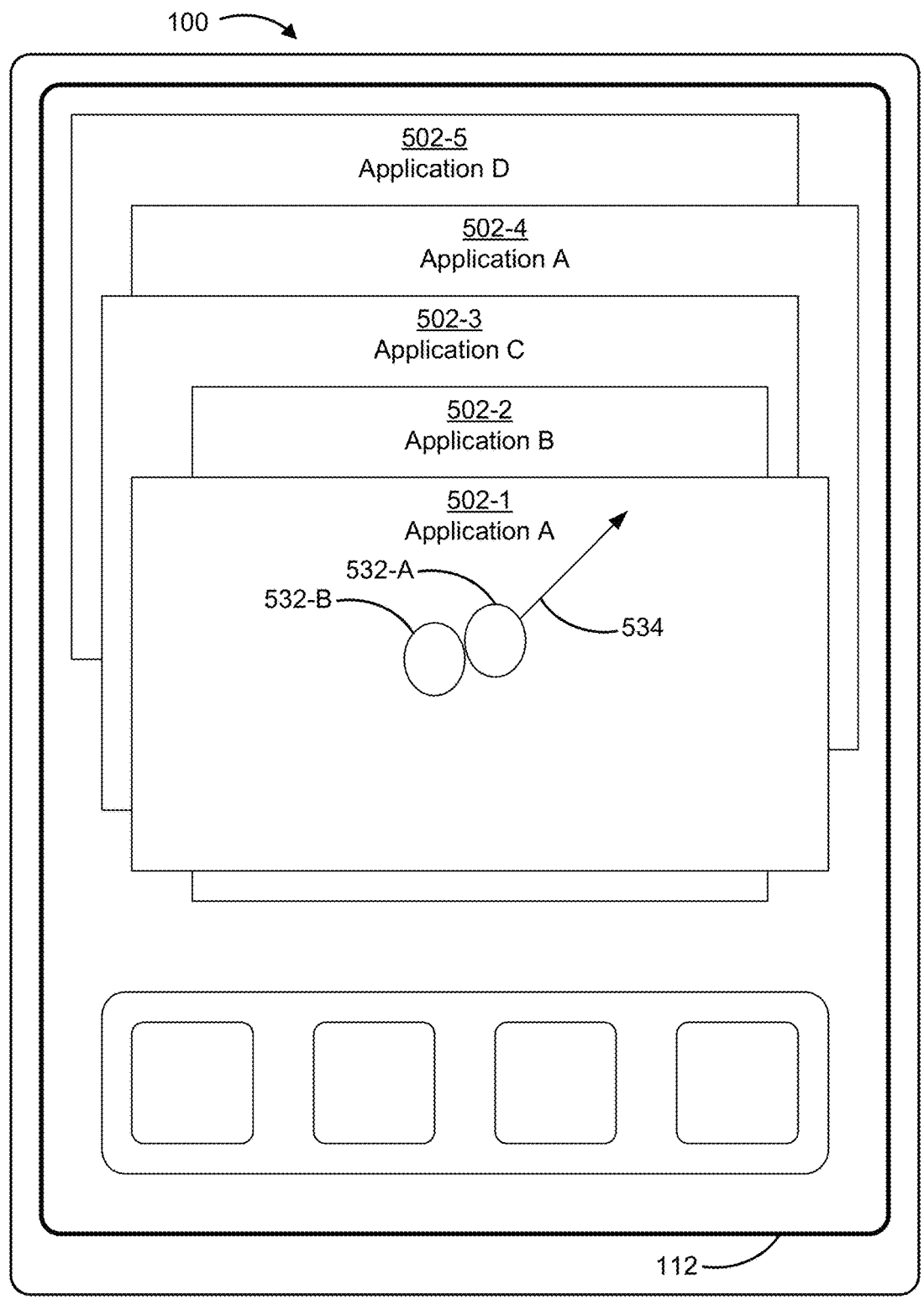

FIG. 5V depicts windows 502-1 thru 502-5 in the same layer order as depicted in FIG. 5A. Gesture 532 is detected on touch-sensitive display 112. Gesture 532 includes contacts 532-A and 532-B moving in direction 534. Direction 534 corresponds to a upward and rightward diagonal direction on touch-sensitive display 112. In some embodiments, gesture 532 is a swipe, flick, or drag gesture.

Figure 5W:
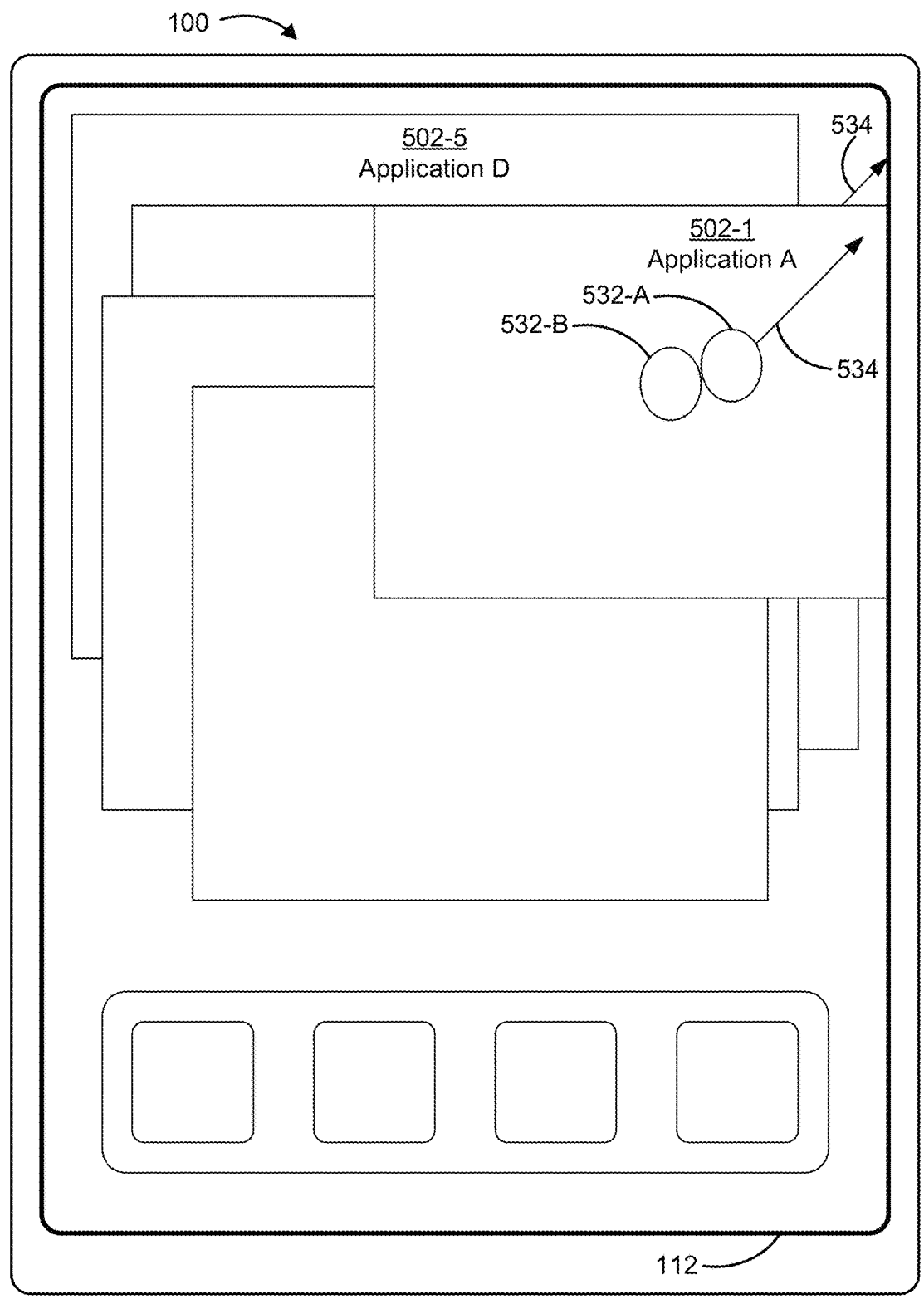
Figure 5X:
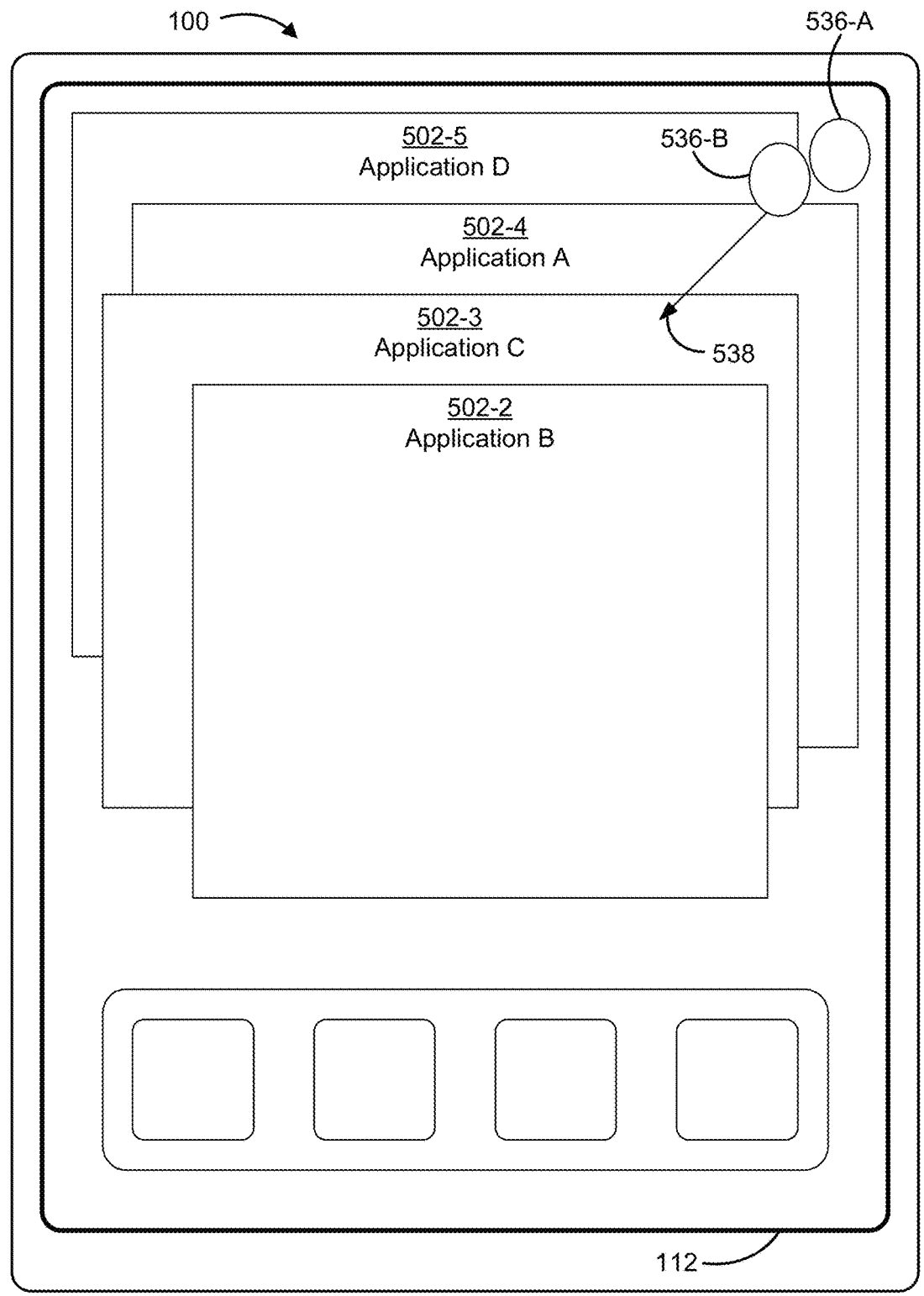

In response to the detection of gesture 532, window 502-1 moves in accordance with direction 534. As window 502-1 moves in direction 534, window 502-1 is moving off of display 112, as shown in FIG. 5W. Window 502-1 continues moving in direction 534 until window 502-1 has moved fully off (or partially off, not shown) of display 112, as shown in FIG. 5X. In FIG. 5X, with window 502-1 off of display 112, window 502-2 becomes the frontmost window among the remaining windows 502-2 thru 502-5.

While window 502-1 is still off of display 112 and window 502-2 is frontmost, gesture 536 is detected on touch-sensitive display 112. Gesture 536 includes contacts 536-A and 536-B moving in direction 538. Direction 538 corresponds to a downward and leftward diagonal direction on touch-sensitive display 112; direction 538 is opposite of direction 534. In some embodiments, gesture 536 is a swipe, flick, or drag gesture.

Figure 5Y:
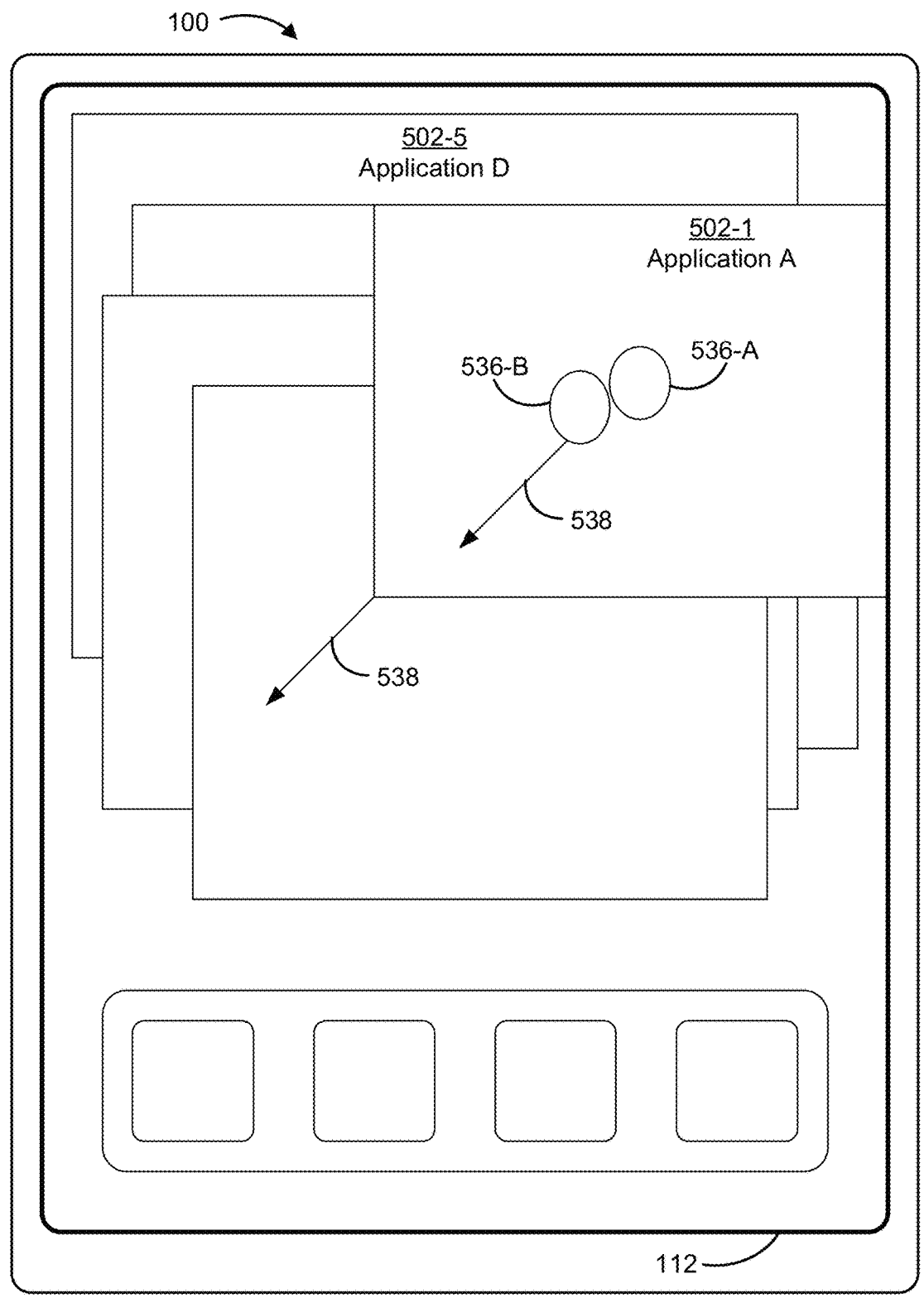
Figure 5Z:
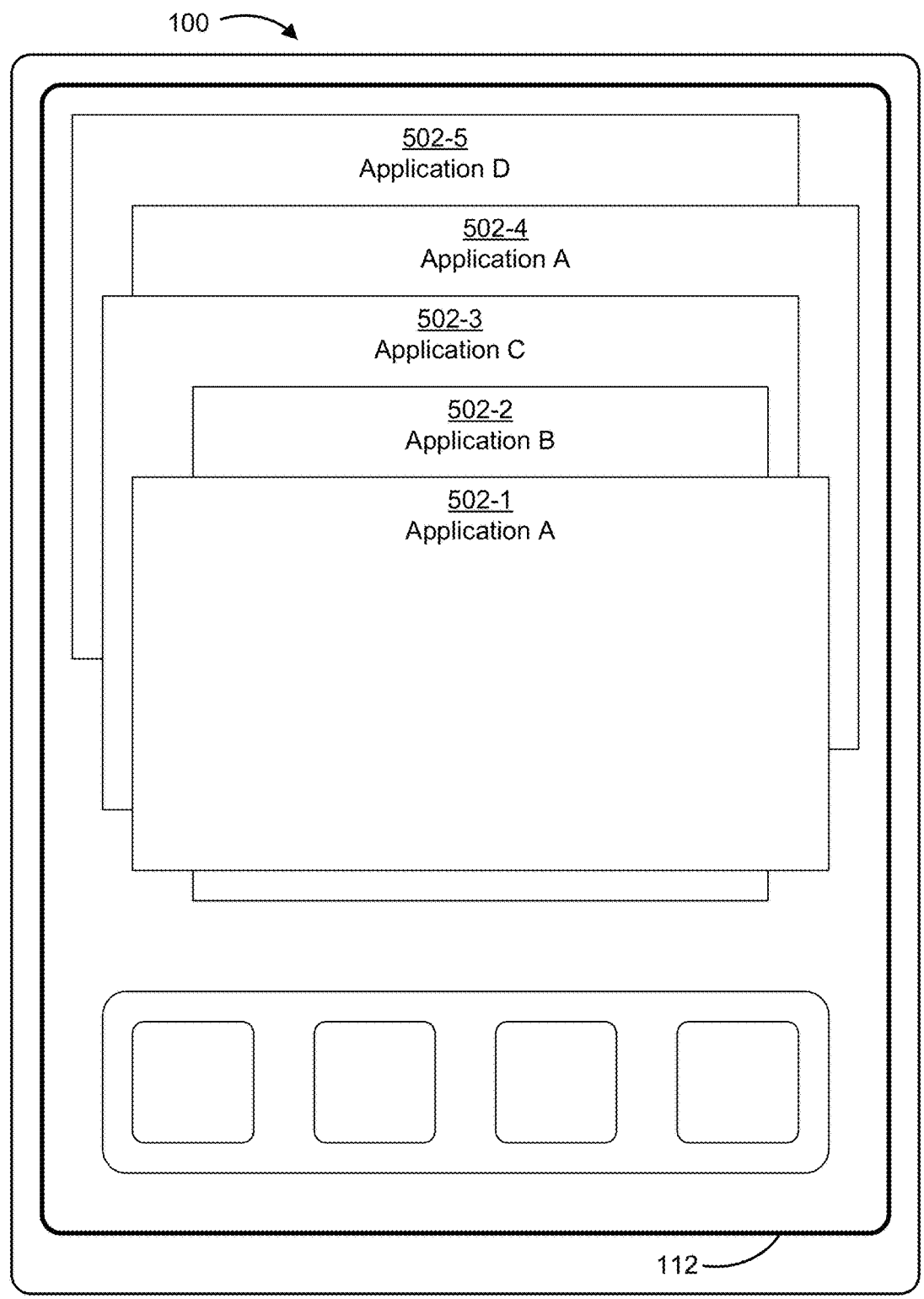
Figure 5A:
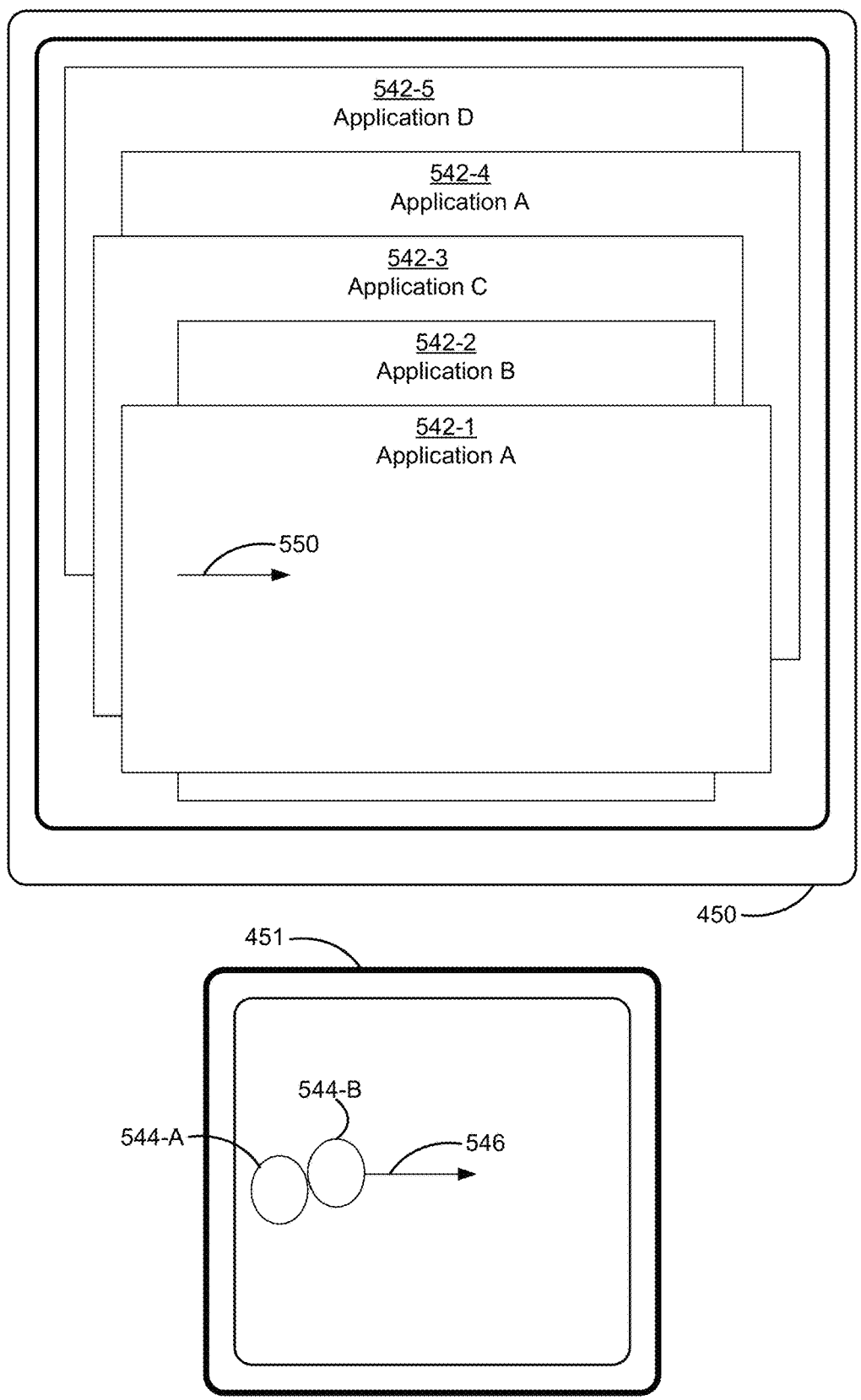
Figure 5B:
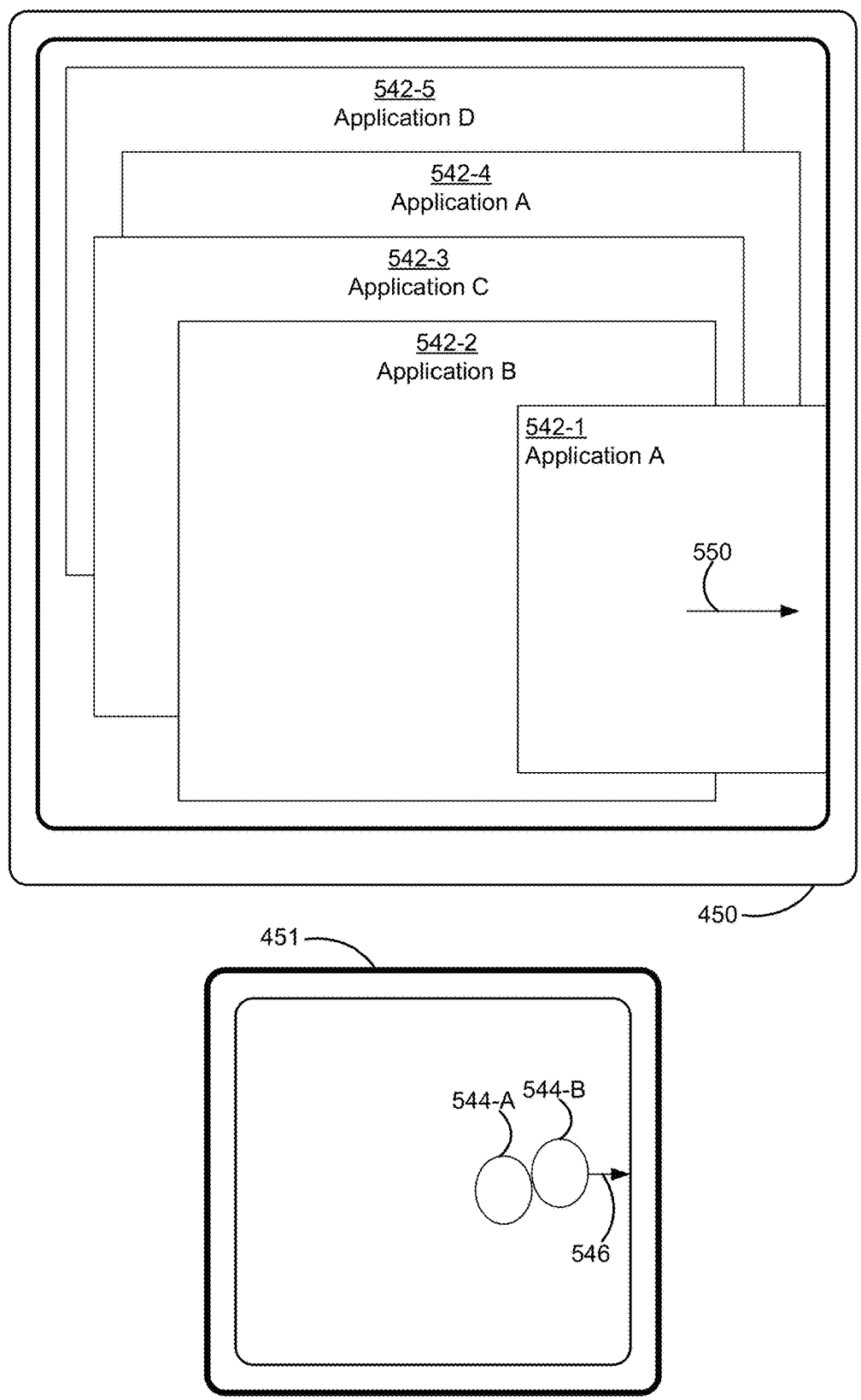
Figure 5C:
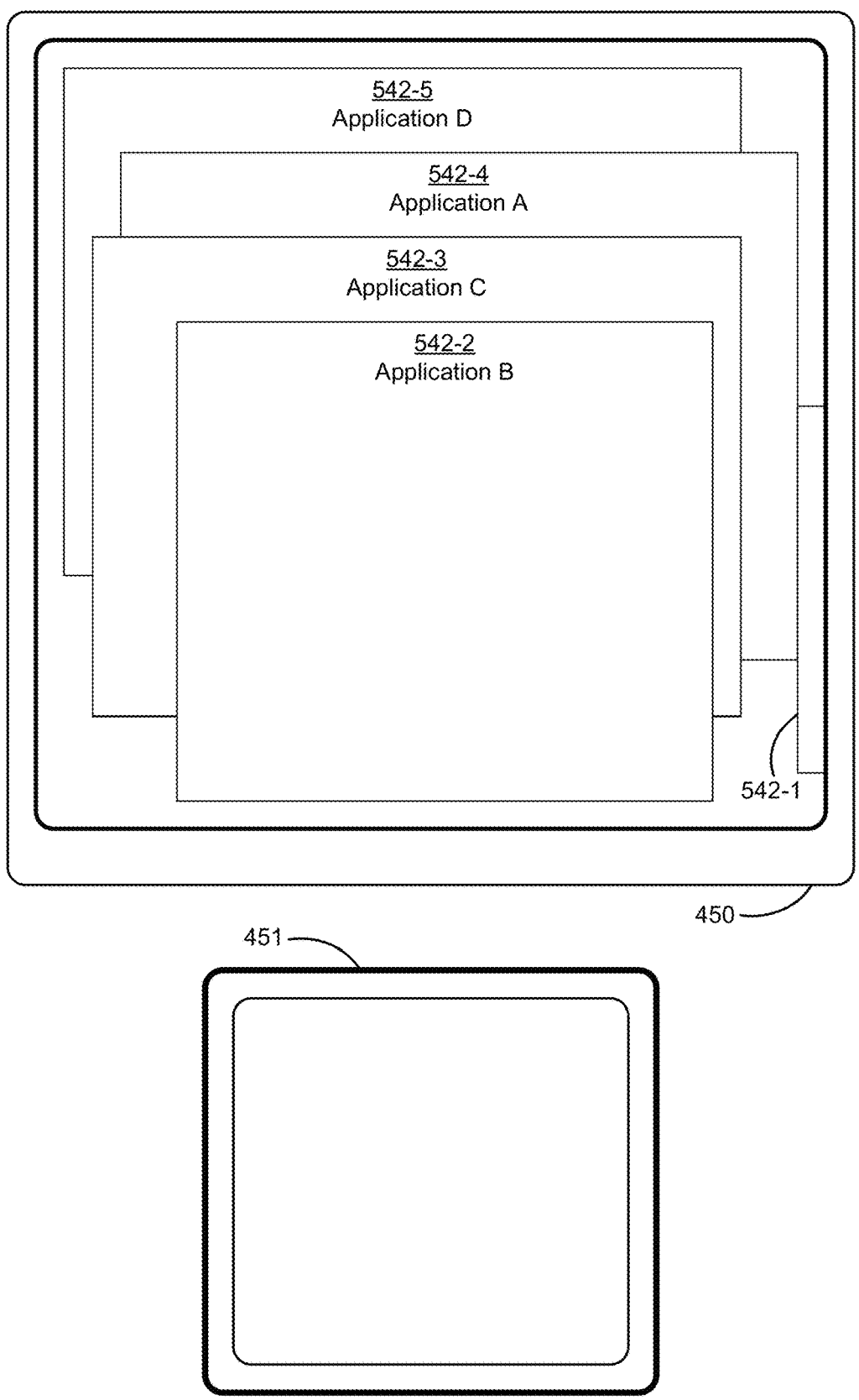

In response to the detection of gesture 536, window 502-1 moves in accordance with direction 538. As window 502-1 moves in direction 538, window 502-1 is moving back onto display 112, as shown in FIG. 5Y. Window 502-1 continues moving in direction 538 until window 502-1 moves back into, and is redisplayed at, the position it had just prior to the detection of gesture 532, as shown in FIG. 5Z. In FIG. 5Z, window 502-1 is the frontmost window among windows 502 that are displayed on display 112; windows 502-1 thru 502-5 are displayed in the original layer order as depicted in FIG. 5A.

While the embodiments illustrated in FIGS. 5A-5Z and described above show gestures being detected on touch-sensitive display 112 and windows 502 displayed on touch-sensitive display 112, the embodiments illustrated in FIGS. 5A-5Z and described above apply in an analogous manner to embodiments where gestures are detected on a touch-sensitive surface that is not a touch-sensitive display. For example, FIGS. 5AA-5CC depict an analogous gesture and response to that as depicted in FIGS. 5A-5C. FIG. 5AA illustrates touch-sensitive surface 451 and display 450 (FIG. 4B). Application windows 542-1 thru 542-5 are displayed on display 450. Windows 542-1 thru 542-5 are analogous to windows 502-1 thru 502-5 (FIG. 5A). Window 542-1 is frontmost in the layer order, followed by windows 542-2, 542-3, 542-4, and 542-5. Windows 542-1 and 542-4 correspond to Application A. Window 542-2 correspond to Application B. Window 542-3 correspond to Application C. Window 542-5 correspond to Application D.

Gesture 544 is detected on touch-sensitive surface 451. Gesture 544 includes contacts 544-A and 544-B moving in direction 546. Direction 546 corresponds to a horizontal rightward direction on touch-sensitive surface 451. Direction 546 corresponds to direction 550 on display 450. In some embodiments, gesture 544 is a swipe, flick, or drag gesture.

In response to the detection of gesture 544, window 542-1 moves in accordance with direction 546; window 542-1 moves in direction 550. As window 542-1 moves in direction 550, window 542-1 is moving off of display 450, as shown in FIG. 5BB. Window 542-1 continues moving in direction 550 until window 542-1 has moved partially off of display 450, as shown in FIG. 5CC (or fully off of display 450, not shown). In FIG. 5CC, with window 542-1 partially off of display 450, window 542-2 becomes the frontmost window among the remaining windows 542-2 thru 542-5.

Figure 6B:
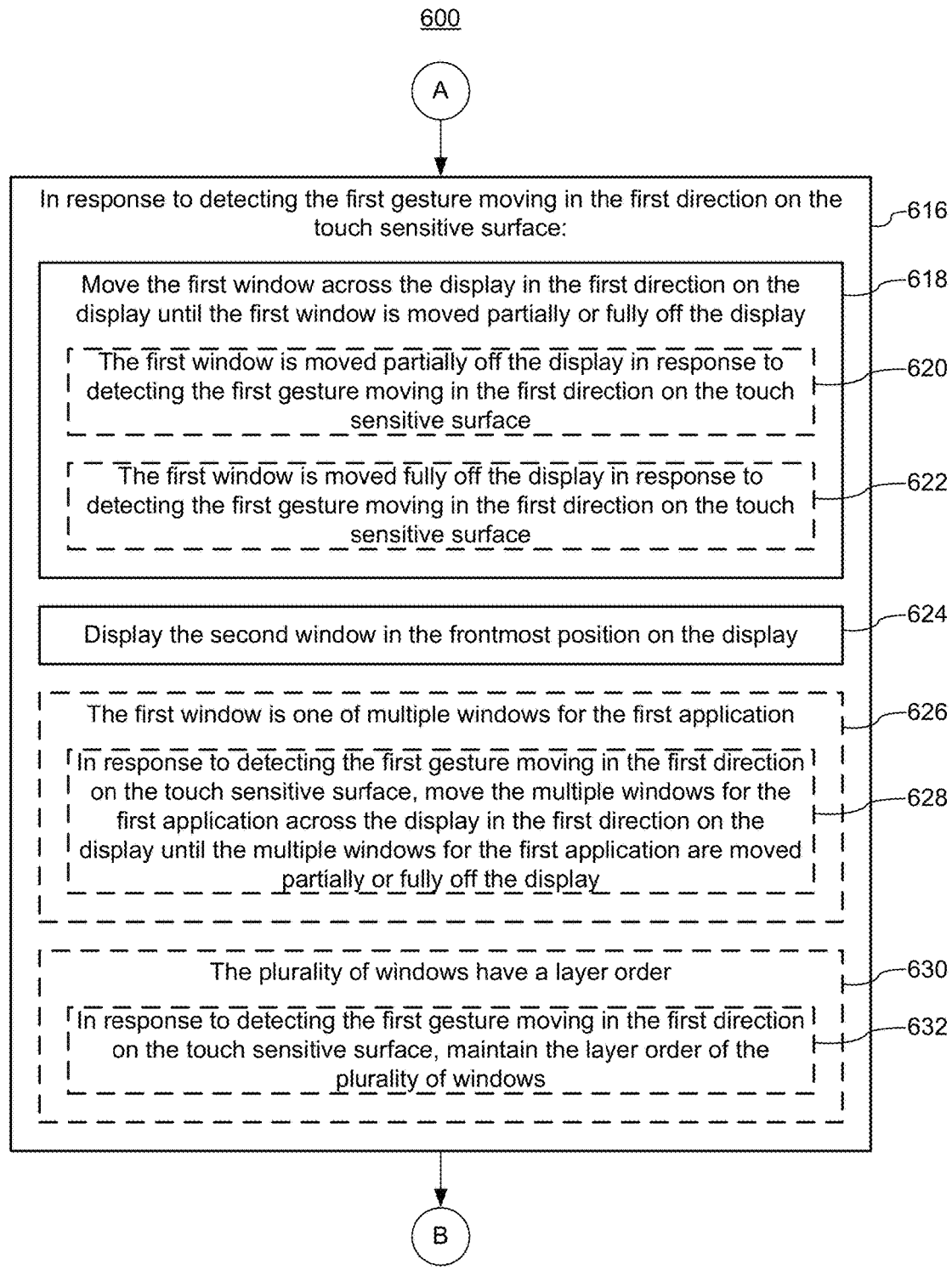
Figure 6C:
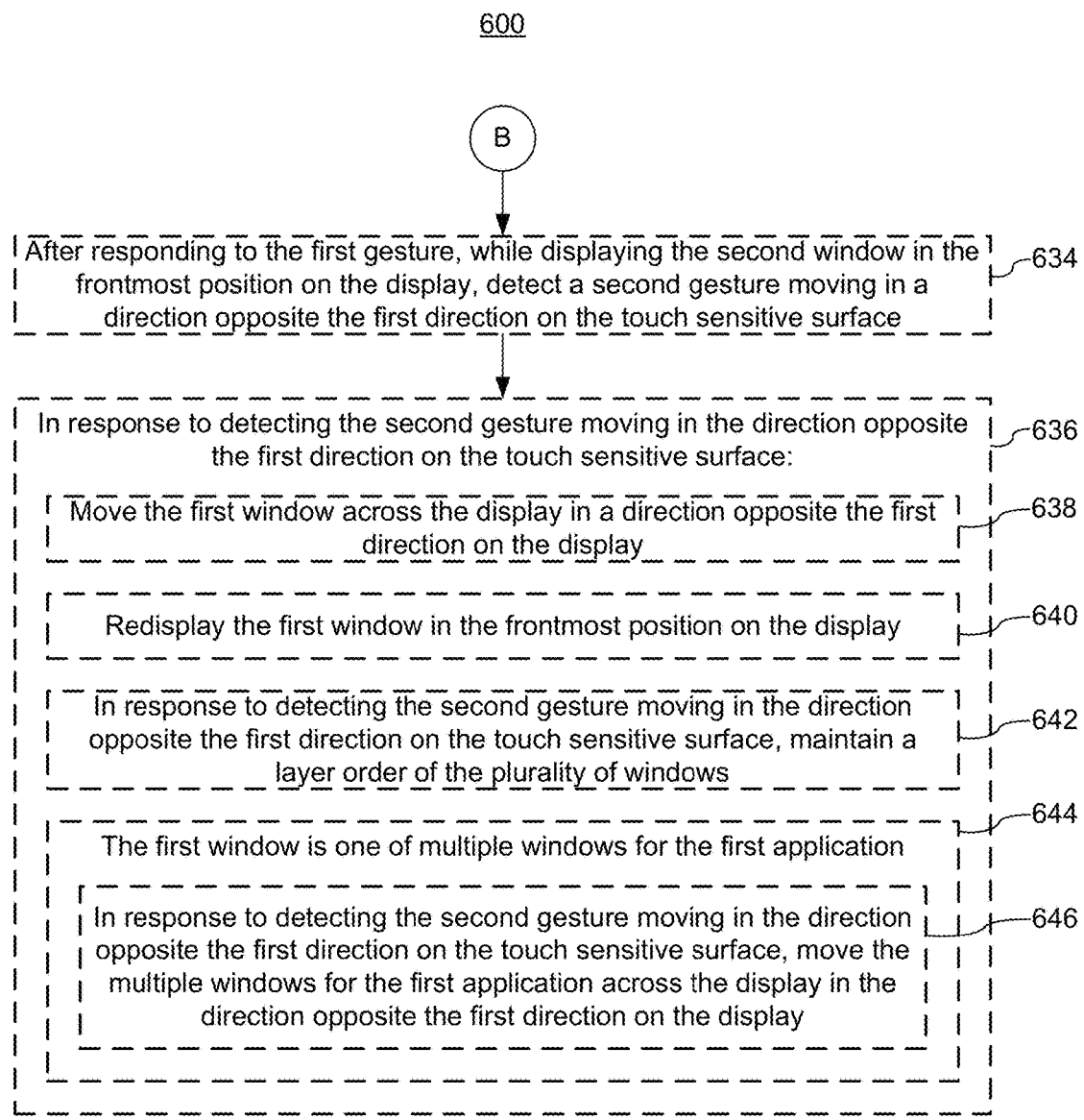
Figure 7B:
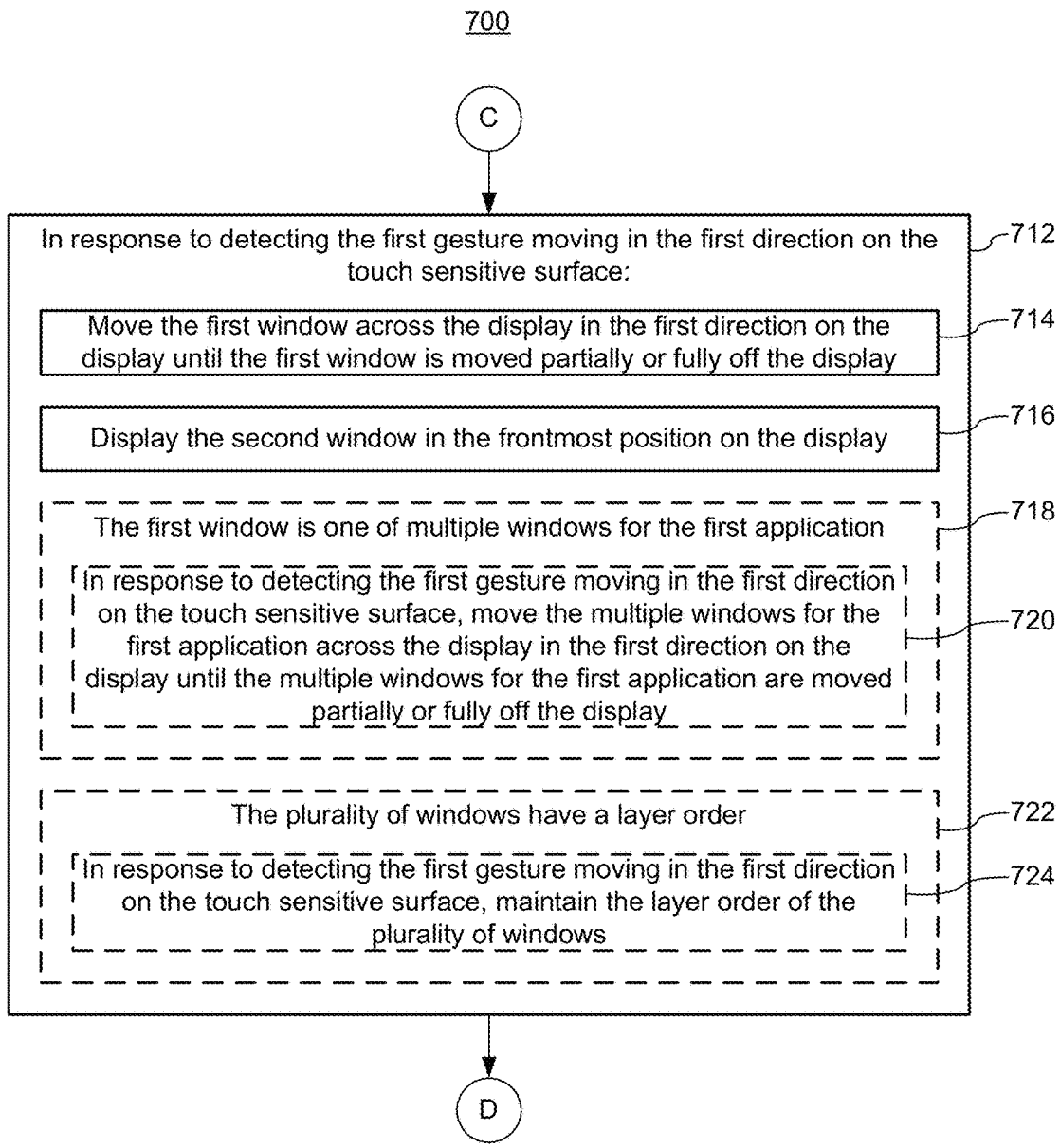
Figure 7C:
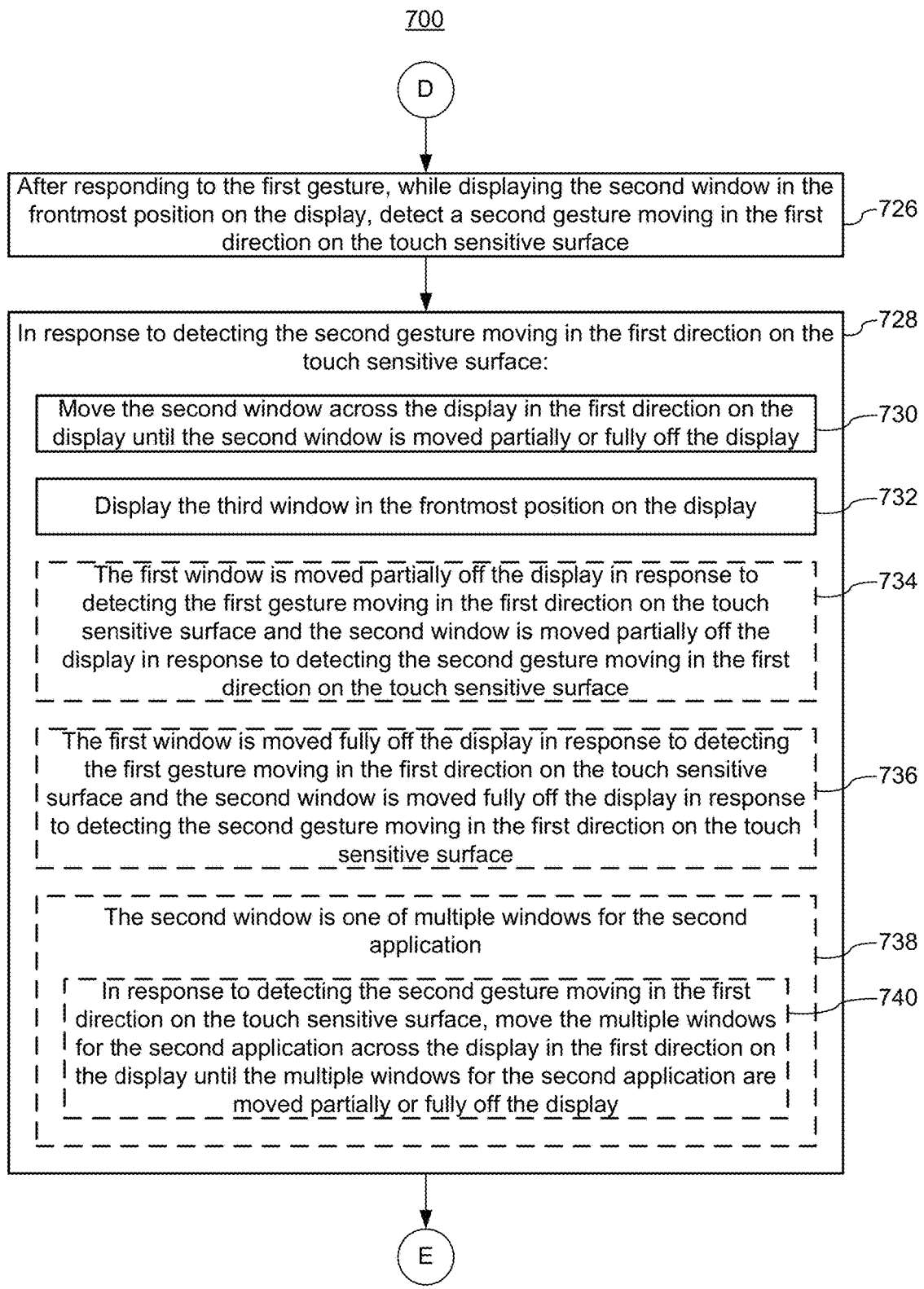
Figure 7D:
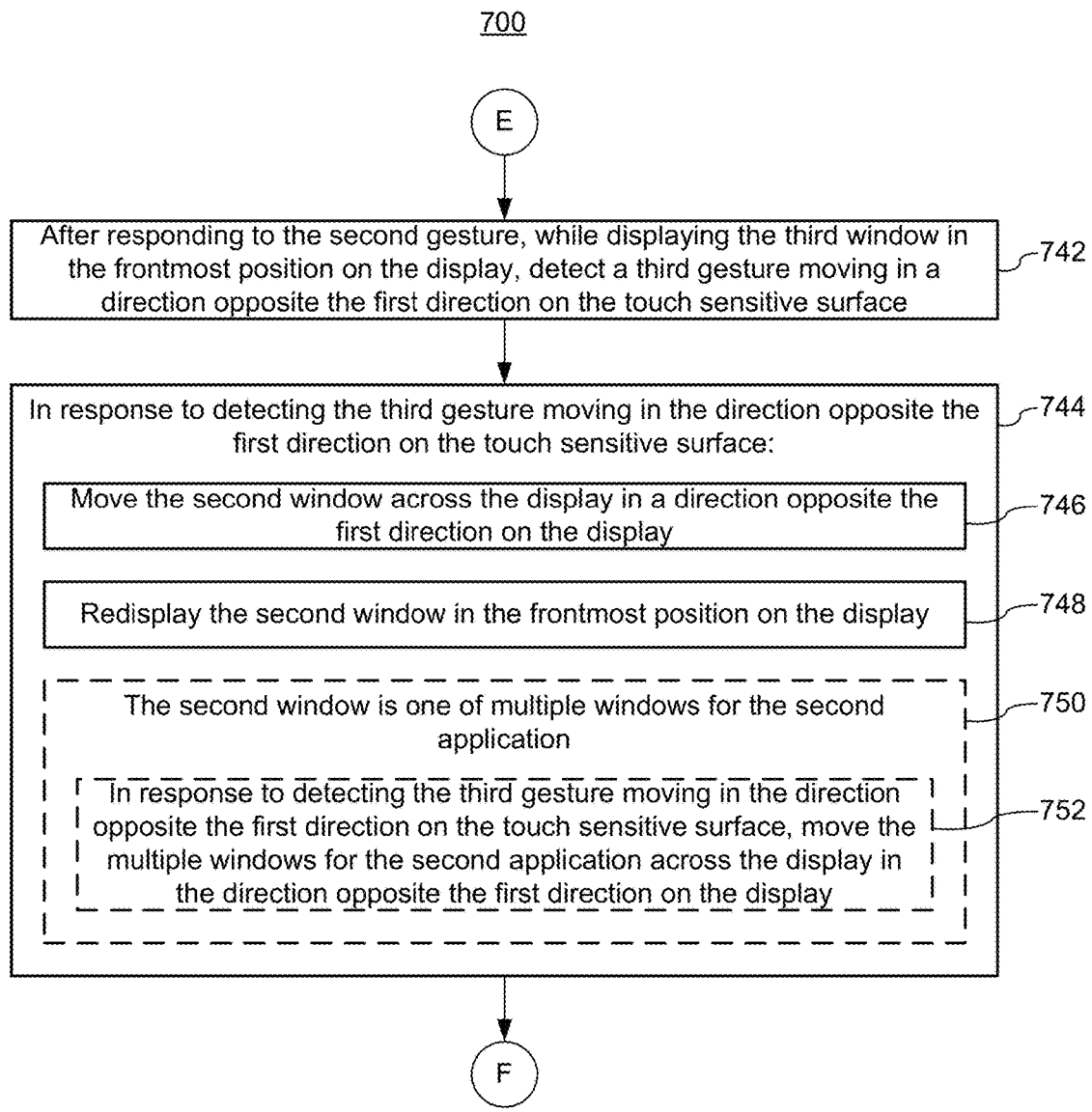
Figure 7E:
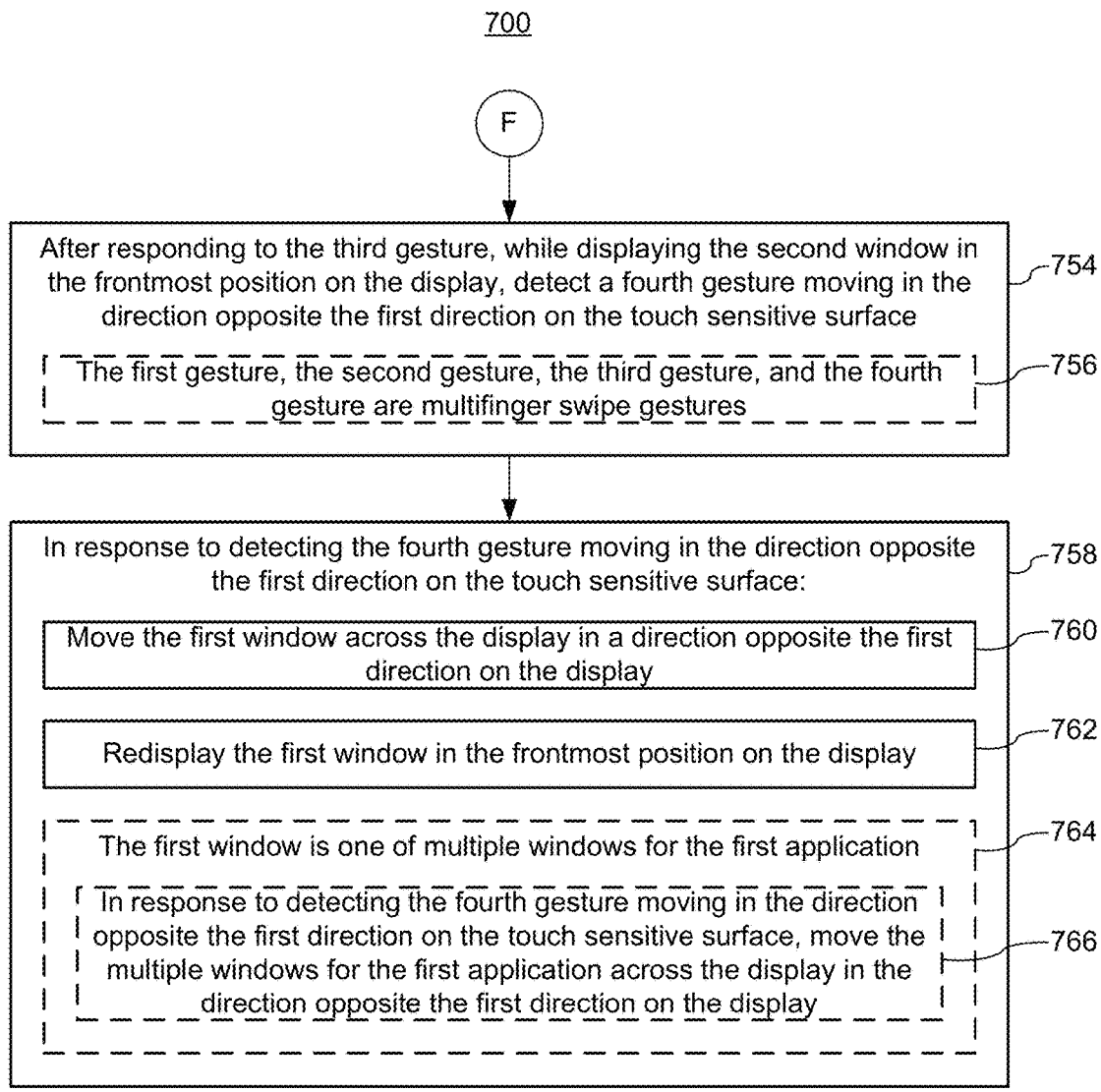

FIGS. 6A-6C are flow diagrams illustrating a method 600 of controlling display of application windows in accordance with some embodiments. The method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to control display of application windows. The method reduces the cognitive burden on a user when controlling display of application windows, thereby creating a more efficient human-machine interface. For battery-operated electronic devices, enabling a user to control display of application windows faster and more efficiently conserves power and increases the time between battery charges.

The device displays a plurality of windows on the display (e.g., application windows) (602). The plurality of windows includes a first window for a first application displayed in a frontmost position on the display and a second window displayed in a lower position than the frontmost position. For example, in FIG. 5A, windows 502-1 thru 502-5 are displayed on display 112. Window 502-1 corresponds to Application A and is displayed in the frontmost position. Window 502-2 is displayed in the next lower position. As another example, in FIG. 5AA, windows 542-1 thru 542-5 are displayed on display 450. Window 542-1 corresponds to Application A and is displayed in the frontmost position. Window 542-2 is displayed in the next lower position.

In some embodiments, the second window is for a second application, distinct from the first application (604). For example, in FIG. 5A, window 502-1 corresponds to Application A, and window 502-2 corresponds to Application B.

The device detects a first gesture moving in a first direction on the touch sensitive surface, the first direction on the touch sensitive surface corresponding to a first direction on the display (606). In FIG. 5A, for example, gesture 504 is detected on touch-sensitive display 112. Gesture 504 includes movement in direction 506, which corresponds to direction 506 on display 112. As another example, in FIG. 5AA, gesture 544 is detected on touch-sensitive surface 451. Gesture 544 includes movement in direction 546, which corresponds to direction 550 on display 450.

In some embodiments, the first gesture is a multifinger swipe gesture (e.g., a two-, three-, or four-finger drag (swipe) gesture) (608). For example, gestures 504 (FIG. 5A) and 544 (5AA) are multi-finger (each of these gestures have two concurrent contacts) swipe gestures.

In some embodiments, the first direction on the touch sensitive surface corresponds to a horizontal direction on the display (610). For example, a rightward (or substantially rightward) gesture on the touch sensitive surface moves the first window in a rightward direction across the display. For example, gesture 504 (FIG. 5A) moves in direction 506, which is horizontal and rightward. In response to the detection of gesture 504, window 502-1 moves in horizontal direction 506. As another example, gesture 544 (FIG. 5AA) moves in direction 546, which is horizontal and rightward. In response to the detection of gesture 544, window 542-1 moves in direction 550, which matches direction 546.

In some embodiments, the first direction on the touch sensitive surface corresponds to a vertical direction on the display (612). For example, a downward (or substantially downward) gesture on the touch sensitive surface moves the first window in a downward direction across the display. For example, gesture 526 (FIG. 5Q) moves in direction 527, which is vertical and downward. In response to the detection of gesture 526, window 502-1 moves in vertical direction 527 (FIG. 5R).

In some embodiments, the first direction on the touch sensitive surface corresponds to a diagonal direction on the display (614). For example, an upward and rightward gesture on the touch sensitive surface moves the first window in an upward and rightward direction across the display. For example, gesture 532 (FIG. 5V) moves in direction 534, which is upward and rightward on a diagonal. In response to the detection of gesture 532, window 502-1 moves in diagonal direction 534 (FIG. 5W).

In response to detecting the first gesture moving in the first direction on the touch sensitive surface (616), the device moves the first window (e.g., displaying an animated movement of the first window) across the display in the first direction on the display until the first window is moved partially or fully off the display (618), and displays the second window in the frontmost position on the display (624). For example, in FIGS. 5A-5C, in response to the detection of gesture 504, window 502-1 moves across display 112 in direction 506 until window 501-1 is partially off of the display. Window 502-2 is displayed in the frontmost position, as shown in FIG. 5C. In FIGS. 5AA-5CC, in response to the detection of gesture 544 on touch-sensitive surface 451, window 542-1 moves across display 450 in direction 550 until window 542-1 is partially off of display 450. Window 542-2 is displayed in the frontmost position, as shown in FIG. 5CC.

In some embodiments, the first window is moved partially off the display in response to detecting the first gesture moving in the first direction on the touch sensitive surface (620). For example, in FIG. 5C, window 502-1 is moved partially off of display 112 in response to the detection of gesture 504.

In some embodiments, the first window is moved fully off the display in response to detecting the first gesture moving in the first direction on the touch sensitive surface (624). For example, in FIG. 5J, window 502-1 (along with window 502-4) is moved fully off of display 112 in response to the detection of gesture 518.

In some embodiments, the first window is one of multiple windows for the first application (626). In response to detecting the first gesture moving in the first direction on the touch sensitive surface, the device moves the multiple windows (e.g., displaying an animated movement of the multiple windows) for the first application across the display in the first direction on the display until the multiple windows for the first application are moved partially or fully off the display (628). In some embodiments, in response to detecting the first gesture, all of the windows in the first application are moved partially off the display. In some embodiments, in response to detecting the first gesture, all of the windows in the first application are moved fully off the display. For example, in FIG. 5H, windows 502-1 and 502-4 correspond to Application A. In response to the detection of gesture 518, windows 502-1 and 502-4 are moved together in direction 517 until both are moved off of display 112, as shown in FIG. 5J.

In some embodiments, the plurality of windows has a layer order (i.e., a z-order or front-to-back order of the plurality of windows) (630). In response to detecting the first gesture moving in the first direction on the touch sensitive surface, the device maintains the layer order of the plurality of windows (632). For example, the first window is at the first (frontmost) position in the layer order and the second window is in the second (next-to-frontmost) position in the layer order just prior to detecting the first gesture. In response to detecting the first gesture (e.g., gesture 504, the display in the first direction. The first window maintains its first position in the layer order even though the first window is no longer displayed (or is displayed only slightly at the edge of the display). Also in response to detecting the first gesture, the second window is displayed in the frontmost position on the display because the second window, with its second (next-to-frontmost) position in the layer order, has the top (frontmost) position in the layer order of the windows then being displayed. Subsequently, in response to the second gesture (e.g., gesture 516, FIG. 5F), the first window is moved back onto the display and is redisplayed in the frontmost position on the display because the first window maintains its first (frontmost) position in the layer order.

In some embodiments, after responding to the first gesture, while displaying the second window in the frontmost position on the display, the device detects a second gesture moving in a direction opposite the first direction on the touch sensitive surface (634). In response to detecting the second gesture moving in the direction opposite the first direction on the touch sensitive surface (636), the device moves (638) the first window (e.g., displaying an animated movement of the first window) across the display in a direction opposite the first direction on the display, and redisplays the first window in the frontmost position on the display (640). For example, after responding to gesture 504 (FIG. 5A), and while displaying window 502-2 in the frontmost position, gesture 516 is detected on touch-sensitive display 112, as shown in FIG. 5F. Gesture 516 moves in direction 515, which is opposite of direction 506. In response to the detection of gesture 516, window 502-1 is moved in direction 515 and is redisplayed in the frontmost position, as shown in FIG. 5G.

In some embodiments, in response to detecting the second gesture moving in the direction opposite the first direction on the touch sensitive surface, the device maintains the layer order of the plurality of windows (642). As noted above, in some embodiments, in response to the second gesture (e.g., gesture 516, FIG. 5F), the first window is moved back onto the display and is redisplayed in the frontmost position on the display because the first window maintains its first (frontmost) position in the layer order.

In some embodiments, the first window is one of multiple windows for the first application (644). In response to detecting the second gesture moving in the direction opposite the first direction on the touch sensitive surface, the device moves the multiple windows (e.g., displaying an animated movement of the multiple windows) for the first application across the display in the direction opposite the first direction on the display (646). In some embodiments, in response to detecting the second gesture, all of the windows in the first application are moved back onto the display, with the first window in the frontmost position. For example, in response to the detection of gesture 524 (FIG. 5M), windows 502-1 and 502-4 move in direction 525, which is opposite of direction 517 (FIG. 5H).

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to method 700 (e.g., FIGS. 7A-7E) is also applicable in an analogous manner to method 600 described above with respect to FIGS. 6A-6C. For example, the windows 502 described above with reference to method 600 may have one or more of the characteristics of the windows 502 described herein with reference to method 700. For brevity, these details are not repeated here.

FIGS. 7A-7E are flow diagrams illustrating a method 700 of controlling display of application windows in accordance with some embodiments. The method 700 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to control display of application windows. The method reduces the cognitive burden on a user when controlling display of application windows, thereby creating a more efficient human-machine interface. For battery-operated electronic devices, enabling a user to control display of application windows faster and more efficiently conserves power and increases the time between battery charges.

The device displays a plurality of windows on the display (e.g., application windows) (702). The plurality of windows includes a first window for a first application displayed in a frontmost position on the display; a second window for a second application, distinct from the first application, displayed in a second position lower than the frontmost position; and a third window for a third application, distinct from the first application and the second application, displayed in a third position lower than the second position. For example, in FIG. 5A, windows 502-1, 502-2, and 502-3 are displayed on display 112. Window 502-1 is displayed in the frontmost position and corresponds to Application A. Window 502-2 is displayed in a position lower than window 502-1 and corresponds to Application B. Window 502-3 is displayed in a position lower than window 502-2 and corresponds to Application C.

The device detects a first gesture moving in a first direction on the touch sensitive surface, the first direction on the touch sensitive surface corresponding to a first direction on the display (704). In FIG. 5A, for example, gesture 504 is detected on touch-sensitive display 112. Gesture 504 includes movement in direction 506, which corresponds to direction 506 on display 112.

In some embodiments, the first direction on the touch sensitive surface corresponds to a horizontal direction on the display (706). For example, a rightward (or substantially rightward) gesture on the touch sensitive surface moves the first window in a rightward direction across the display. For example, gesture 504 (FIG. 5A) moves in direction 506, which is horizontal and rightward. In response to the detection of gesture 504, window 502-1 moves in horizontal direction 506.

In some embodiments, the first direction on the touch sensitive surface corresponds to a vertical direction on the display (708). For example, a downward (or substantially downward) gesture on the touch sensitive surface moves the first window in a downward direction across the display. For example, gesture 526 (FIG. 5Q) moves in direction 527, which is vertical and downward. In response to the detection of gesture 526, window 502-1 moves in vertical direction 527 (FIG. 5R).

In some embodiments, the first direction on the touch sensitive surface corresponds to a diagonal direction on the display (710). For example, an upward and rightward gesture on the touch sensitive surface moves the first window in an upward and rightward direction across the display. For example, gesture 532 (FIG. 5V) moves in direction 534, which is upward and rightward on a diagonal. In response to the detection of gesture 532, window 502-1 moves in diagonal direction 534 (FIG. 5W).

In some embodiments, in response to detecting the first gesture moving in the first direction on the touch sensitive surface (712), the device moves the first window (e.g., displaying an animated movement of the first window) across the display in the first direction on the display until the first window is moved partially or fully off the display (714), and displays the second window in the frontmost position on the display (716). For example, in FIGS. 5A-5C, in response to the detection of gesture 504, window 502-1 moves across display 112 in direction 506 until window 502-1 is partially off of the display. Window 502-2 is displayed in the frontmost position, as shown in FIG. 5C.

In some embodiments, the first window is one of multiple windows for the first application (718). In response to detecting the first gesture moving in the first direction on the touch sensitive surface, the device moves the multiple windows (e.g., displaying an animated movement of the multiple windows) for the first application across the display in the first direction on the display until the multiple windows for the first application are moved partially or fully off the display (720). In some embodiments, in response to detecting the first gesture, all of the windows in the first application are moved partially off the display (e.g., almost fully off, such as having a predefined pixel width or percentage of the window still displayed proximate to an edge of display 112). In some embodiments, in response to detecting the first gesture, all of the windows in the first application are moved fully off the display. For example, windows 502-1 and 502-4 correspond to Application A, as shown in FIG. 5H. In response to the detection of gesture 518, windows 502-1 and 502-4 are moved together in direction 517 until both are moved off of display 112, as shown in FIG. 5J.

In some embodiments, the plurality of windows has a layer order (i.e., a z-order or front-to-back order of the plurality of windows) (722). In response to detecting the first gesture moving in the first direction on the touch sensitive surface, the device maintains the layer order of the plurality of windows (724). For example, the first window is at the first (frontmost) position in the layer order, the second window is in the second (next-to-frontmost) position in the layer order, and the third window is in the third (next-to-second) position in the layer order just prior to detecting the first gesture. In response to detecting the first gesture (e.g., gesture 504, FIG. 5A), the first window is moved off the display in the first direction. The first window maintains its first position in the layer order even though the first window is no longer displayed (or is displayed only slightly at the edge of the display). Also in response to detecting the first gesture, the second window is displayed in the frontmost position on the display because the second window, with its second (next-to-frontmost) position in the layer order, has the top (frontmost) position in the layer order of the windows then being displayed. In response to detecting the second gesture (e.g., gesture 508, FIG. 5C), the second window is moved off the display in the first direction. The first and second windows maintain their respective positions in the layer order even though the first window and the second window are no longer displayed (or are displayed only slightly at the edge of the display). Also in response to detecting the second gesture, the third window is displayed in the frontmost position on the display because the third window, with its third (next-to-second) position in the layer order, has the top (frontmost) position in the layer order of the windows then being displayed. Subsequently, in response to the third gesture (e.g., gesture 512, FIG. 5D), the second window is moved back onto the display and is redisplayed in the frontmost position on the display because the second window, with its second (next-to-frontmost) position in the layer order, has the top (frontmost) position in the layer order of the windows then being displayed. Subsequently, in response to the fourth gesture (e.g., gesture 516, FIG. 5F), the first window is moved back onto the display and is redisplayed in the frontmost position on the display because the first window, with its first (frontmost) position in the layer order, has the top (frontmost) position in the layer order of the windows then being displayed.

In some embodiments, each gesture moving in a first direction on the touch sensitive surface results in the currently displayed window with the frontmost position in the layer order being moved off the display in the first direction. In some embodiments, each gesture moving in the first direction on the touch sensitive surface results in the currently displayed window with the frontmost position in the layer order, as well other windows in the same application as the currently displayed window with the frontmost position in the layer order, being moved off the display in the first direction (e.g., as shown in FIGS. 5H-5J).

Conversely, in some embodiments, each gesture moving in a direction opposite the first direction on the touch sensitive surface results in redisplay of the window that was most recently moved off the display in the first direction in response to the most recent gesture in the first direction, with the redisplayed window appearing at a frontmost position on the display. In some embodiments, each gesture moving in the direction opposite the first direction on the touch sensitive surface also results in redisplay of other windows in the same application. In some embodiments, these other windows in the same application are redisplayed according to their original locations in the layer order, thereby maintaining the layer order (e.g., as shown in FIGS. 5M-5N). In some other embodiments, these other windows are redisplayed immediately below the redisplayed window at the frontmost position on the display, which may move these other windows in the same application frontward in the layer order (e.g., as shown in FIGS. 5M, 5O-5P).

After responding to the first gesture, while displaying the second window in the frontmost position on the display, the device detects a second gesture moving in the first direction on the touch sensitive surface (726). For example, after responding to gesture 504 (FIG. 5A), and while displaying window 502-2 in the frontmost position, gesture 508 is detected on touch-sensitive display 112, as shown in FIG. 5C. Gesture 508 moves in direction 510, which is the same as direction 506.

In response to detecting the second gesture moving in the first direction on the touch sensitive surface (728), the device moves the second window (e.g., displaying an animated movement of the first window) across the display in the first direction on the display until the second window is moved partially or fully off the display (730), and displays the third window in the frontmost position on the display (732). For example, in FIGS. 5C-5D, in response to the detection of gesture 508, window 502-2 moves across display 112 in direction 510 until window 502-2 is partially off of the display. Window 502-3 is displayed in the frontmost position, as shown in FIG. 5D.

In some embodiments, the first window is moved partially off the display in response to detecting the first gesture moving in the first direction on the touch sensitive surface, and the second window is moved partially off the display in response to detecting the second gesture moving in the first direction on the touch sensitive surface (734). For example, in FIG. 5C, window 502-1 is moved partially off of display 112 in response to the detection of gesture 504. In FIG. 5D, window 502-2 is moved partially off of display 112 in response to the detection of gesture 508.

In some embodiments, the first window is moved fully off the display in response to detecting the first gesture moving in the first direction on the touch sensitive surface, and the second window is moved fully off the display in response to detecting the second gesture moving in the first direction on the touch sensitive surface (736). For example, in FIG. 5J, window 502-1 (along with window 502-4) is moved fully off of display 112 in response to the detection of gesture 518. In FIG. 5K, window 502-2 is moved fully off of display 112 in response to the detection of gesture 520.

In some embodiments, the second window is one of multiple windows for the second application (738). In response to detecting the second gesture moving in the first direction on the touch sensitive surface, the device moves the multiple windows (e.g., displaying an animated movement of the multiple windows) for the second application across the display in the first direction on the display until the multiple windows for the second application are moved partially or fully off the display (740). In some embodiments, in response to detecting the second gesture, all of the windows in the second application are moved partially off the display (e.g., almost fully off, such as having a predefined pixel width or percentage of the window still displayed proximate to an edge of display 112). In some embodiments, in response to detecting the second gesture, all of the windows in the second application are moved fully off the display. For example, in FIG. 5J-5K, if there were additional windows 502 corresponding to Application B displayed on display 112 (not shown), in response to the detection of gesture 520, the additional windows corresponding to Application B would be moved together with window 502-2 in direction 519 until the additional windows corresponding to Application B and window 502-2 were moved fully or partially off display 112.

After responding to the second gesture, while displaying the third window in the frontmost position on the display, the device detects a third gesture moving in a direction opposite the first direction on the touch sensitive surface (742). For example, after responding to gesture 508 (FIG. 5C), and while displaying window 502-3 in the frontmost position, gesture 512 is detected on touch-sensitive display 112, as shown in FIG. 5D. Gesture 512 moves in direction 514, which is opposite of direction 510.

In response to detecting the third gesture moving in the direction opposite the first direction on the touch sensitive surface (744), the device moves the second window (e.g., displaying an animated movement of the second window) across the display in a direction opposite the first direction on the display (746), and redisplays the second window in the frontmost position on the display (748). For example, in FIGS. 5D-5F, in response to the detection of gesture 512, window 502-2 moves across display 112 in direction 514 and is redisplayed in the frontmost position, as shown in FIG. 5F.

In some embodiments, the second window is one of multiple windows for the second application (750). In response to detecting the third gesture moving in the direction opposite the first direction on the touch sensitive surface, the device moves the multiple windows (e.g., displaying an animated movement of the multiple windows) for the second application across the display in the direction opposite the first direction on the display (752). In some embodiments, in response to detecting the third gesture, all of the windows in the second application are moved back onto the display, with the second window in the frontmost position. For example, in FIG. 5K-5M, if there were additional windows 502 corresponding to Application B (not shown) that were moved partially or fully off of display 112 in response to detection of gesture 520, in response to the detection of gesture 522, the additional windows corresponding to Application B would be moved together with window 502-2 in direction 523 (which is opposite of direction 519) until the additional windows corresponding to Application B and window 502-2 are moved back onto display 112 and redisplayed on display 112.

After responding to the third gesture, while displaying the second window in the frontmost position on the display, the device detects a fourth gesture moving in the direction opposite the first direction on the touch sensitive surface (754). For example, after responding to gesture 512 (FIG. 5D), and while displaying window 502-2 in the frontmost position, gesture 516 is detected on touch-sensitive display 112, as shown in FIG. 5F. Gesture 516 moves in direction 515, which is opposite of direction 506.

In some embodiments, the first gesture, the second gesture, the third gesture, and the fourth gesture are multifinger swipe gestures (e.g., a two-, three-, or four-finger drag (swipe) gestures) (756). For example, gestures 504, 508, 512, 516 are multi-finger swipe gestures.

In response to detecting the fourth gesture moving in the direction opposite the first direction on the touch sensitive surface (758), the device moves the first window (e.g., displaying an animated movement of the first window) across the display in a direction opposite the first direction on the display (760), and redisplays the first window in the frontmost position on the display (762). For example, in FIGS. 5F-5G, in response to the detection of gesture 516, window 502-1 moves across display 112 in direction 515 and is redisplayed in the frontmost position, as shown in FIG. 5G.

In some embodiments, the first window is one of multiple windows for the first application (764). In response to detecting the fourth gesture moving in the direction opposite the first direction on the touch sensitive surface, the device moves the multiple windows (e.g., displaying an animated movement of the multiple windows) for the first application across the display in the direction opposite the first direction on the display (766). In some embodiments, in response to detecting the fourth gesture, all of the windows in the first application are moved back onto the display, with the first window in the frontmost position. For example, in response to the detection of gesture 524, windows 502-1 and 502-4 are moved together in direction 525 (which is opposite of direction 517) until both are moved back onto display 112 and redisplayed on display 112, as shown in FIGS. 5M-5N.

It should be understood that the particular order in which the operations in FIGS. 7A-7E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to method 600 (e.g., FIGS. 6A-6C) is also applicable in an analogous manner to method 700 described above with respect to FIGS. 7A-7E. For example, the windows 502 described above with reference to method 700 may have one or more of the characteristics of the windows 502 described herein with reference to method 600. For brevity, these details are not repeated here.

Figure 8:
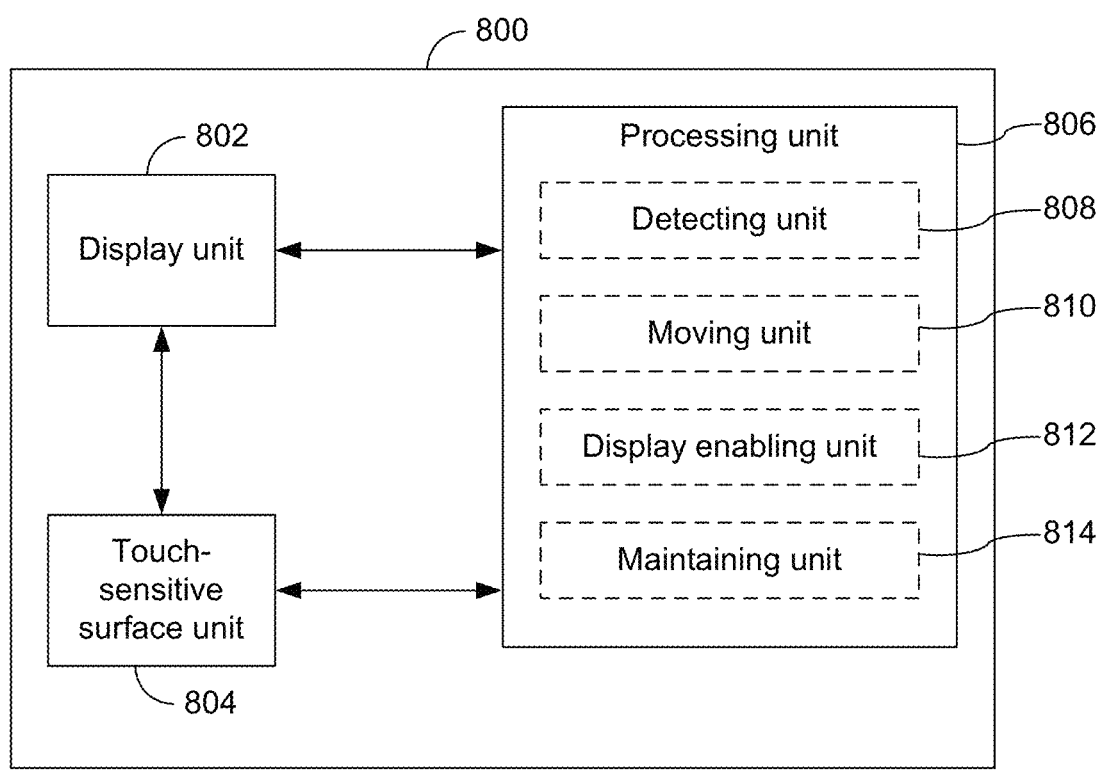
FIG. 8 is a functional block diagram of an electronic device in accordance with some embodiments.

In accordance with some embodiments, FIG. 8 shows a functional block diagram of an electronic device 800 configured in accordance with the principles of the invention as described above. The functional blocks of the device may be implemented by hardware, software, or a combination of hardware and software to carry out the principles of the invention. It is understood by persons of skill in the art that the functional blocks described in FIG. 8 may be combined or separated into sub-blocks to implement the principles of the invention as described above. Therefore, the description herein may support any possible combination or separation or further definition of the functional blocks described herein.

As shown in FIG. 8, in some embodiments, an electronic device 800 includes a display unit 802 configured to display a plurality of windows on the display unit 802, the plurality of windows including a first window for a first application displayed in a frontmost position on the display unit 802 and a second window displayed in a lower position than the frontmost position; a touch-sensitive surface unit 804 configured to receive gestures; and a processing unit 806 coupled to the display unit 802 and the touch-sensitive surface unit 804. In some embodiments, the processing unit 806 includes a detecting unit 808, a moving unit 810, a display enabling unit 812, and a maintaining unit 814.

The processing unit 806 is configured to: detect a first gesture moving in a first direction on the touch sensitive surface unit 804, the first direction on the touch sensitive surface unit 804 corresponding to a first direction on the display unit 802 (e.g., with the detecting unit 808); and, in response to detecting the first gesture moving in the first direction on the touch sensitive surface unit 804: move the first window across the display unit 802 in the first direction on the display unit 802 until the first window is moved partially or fully off the display unit 802 (e.g., with the moving unit 810); and enable display of the second window in the frontmost position on the display unit 802 (e.g., with the display enabling unit 812).

In some embodiments, the first gesture is a multifinger swipe gesture.

In some embodiments, the first direction on the touch sensitive surface unit 804 corresponds to a horizontal direction on the display unit 802.

In some embodiments, the first direction on the touch sensitive surface unit 804 corresponds to a vertical direction on the display unit 802.

In some embodiments, the first direction on the touch sensitive surface unit 804 corresponds to a diagonal direction on the display unit 802.

In some embodiments, the first window is moved partially off the display unit 802 in response to detecting the first gesture moving in the first direction on the touch sensitive surface unit 804.

In some embodiments, the first window is moved fully off the display unit 802 in response to detecting the first gesture moving in the first direction on the touch sensitive surface unit 804.

In some embodiments, the second window is for a second application, distinct from the first application.

In some embodiments, the first window is one of multiple windows for the first application, and the processing unit 806 is configured to: in response to detecting the first gesture moving in the first direction on the touch sensitive surface unit 804: move the multiple windows for the first application across the display unit 802 in the first direction on the display unit 802 until the multiple windows for the first application are moved partially or fully off the display unit 802 (e.g., with the moving unit 810).

In some embodiments, the plurality of windows has a layer order, and the processing unit 806 is configured to: in response to detecting the first gesture moving in the first direction on the touch sensitive surface unit 804: maintain the layer order of the plurality of windows (e.g., with the maintaining unit 814).

In some embodiments, the processing unit 806 is configured to: after responding to the first gesture, while displaying the second window in the frontmost position on the display unit 802, detect a second gesture moving in a direction opposite the first direction on the touch sensitive surface unit 804 (e.g., with the detecting unit 808); and, in response to detecting the second gesture moving in the direction opposite the first direction on the touch sensitive surface unit 804: move the first window across the display unit 802 in a direction opposite the first direction on the display unit 802 (e.g., with the moving unit 810); and reenable display of the first window in the frontmost position on the display unit 802 (e.g., with the display enabling unit 812).

In some embodiments, the processing unit 806 is configured to: in response to detecting the second gesture moving in the direction opposite the first direction on the touch sensitive surface unit 804: maintain the layer order of the plurality of windows (e.g., with the maintaining unit 814).

In some embodiments, the first window is one of multiple windows for the first application, and the processing unit 806 is configured to: in response to detecting the second gesture moving in the direction opposite the first direction on the touch sensitive surface unit 804: move the multiple windows for the first application across the display unit 802 in the direction opposite the first direction on the display unit 802 (e.g., with the moving unit 810).

As shown in FIG. 8, in some embodiments, an electronic device 800 includes a display unit 802 configured to display a plurality of windows on the display unit 802, the plurality of windows including: a first window for a first application displayed in a frontmost position on the display unit 802; a second window for a second application, distinct from the first application, displayed in a second position lower than the frontmost position; and a third window for a third application, distinct from the first application and the second application, displayed in a third position lower than the second position; a touch-sensitive surface unit 804 configured to receive gestures; and a processing unit 806 coupled to the display unit 802 and the touch-sensitive surface unit 804. In some embodiments, the processing unit 806 includes a detecting unit 808, a moving unit 810, a display enabling unit 812, and a maintaining unit 814.

The processing unit 806 is configured to: detect a first gesture moving in a first direction on the touch sensitive surface unit 804, the first direction on the touch sensitive surface unit 804 corresponding to a first direction on the display unit 802 (e.g., with the detecting unit 808); in response to detecting the first gesture moving in the first direction on the touch sensitive surface unit 804: move the first window across the display unit 802 in the first direction on the display unit 802 until the first window is moved partially or fully off the display unit 802 (e.g., with the moving unit 810); and enable display of the second window in the frontmost position on the display unit 802 (e.g., with the display enabling unit 812); after responding to the first gesture, while displaying the second window in the frontmost position on the display unit 802, detect a second gesture moving in the first direction on the touch sensitive surface unit 804 (e.g., with the detecting unit 808); in response to detecting the second gesture moving in the first direction on the touch sensitive surface unit 804: move the second window across the display unit 802 in the first direction on the display unit 802 until the second window is moved partially or fully off the display unit 802 (e.g., with the moving unit 810); and enable display of the third window in the frontmost position on the display unit 802 (e.g., with the display enabling unit 812); after responding to the second gesture, while displaying the third window in the frontmost position on the display unit 802, detect a third gesture moving in a direction opposite the first direction on the touch sensitive surface unit 804 (e.g., with the detecting unit 808); in response to detecting the third gesture moving in the direction opposite the first direction on the touch sensitive surface unit 804: move the second window across the display unit 802 in a direction opposite the first direction on the display unit 802 (e.g., with the moving unit 810); and reenable display of the second window in the frontmost position on the display unit 802 (e.g., with the display enabling unit 812); after responding to the third gesture, while displaying the second window in the frontmost position on the display unit 802, detect a fourth gesture moving in the direction opposite the first direction on the touch sensitive surface unit 804 (e.g., with the detecting unit 808); and, in response to detecting the fourth gesture moving in the direction opposite the first direction on the touch sensitive surface unit 804: move the first window across the display unit 802 in a direction opposite the first direction on the display unit 802 (e.g., with the moving unit 810); and reenable display of the first window in the frontmost position on the display unit 802 (e.g., with the display enabling unit 812).

In some embodiments, the first gesture, the second gesture, the third gesture, and the fourth gesture are multifinger swipe gestures.

In some embodiments, the first direction on the touch sensitive surface unit 804 corresponds to a horizontal direction on the display unit 802.

In some embodiments, the first direction on the touch sensitive surface unit 804 corresponds to a vertical direction on the display unit 802.

In some embodiments, the first direction on the touch sensitive surface unit 804 corresponds to a diagonal direction on the display unit 802.

In some embodiments, the first window is moved partially off the display unit 802 in response to detecting the first gesture moving in the first direction on the touch sensitive surface unit 804 and the second window is moved partially off the display unit 802 in response to detecting the second gesture moving in the first direction on the touch sensitive surface unit 804.

In some embodiments, the first window is moved fully off the display unit 802 in response to detecting the first gesture moving in the first direction on the touch sensitive surface unit 804 and the second window is moved fully off the display unit 802 in response to detecting the second gesture moving in the first direction on the touch sensitive surface unit 804.

In some embodiments, the first window is one of multiple windows for the first application, and the processing unit 806 is configured to: in response to detecting the first gesture moving in the first direction on the touch sensitive surface unit 804: move the multiple windows for the first application across the display unit 802 in the first direction on the display unit 802 until the multiple windows for the first application are moved partially or fully off the display unit 802 (e.g., with the moving unit 810).

In some embodiments, the second window is one of multiple windows for the second application, and the processing unit 806 is configured to: in response to detecting the second gesture moving in the first direction on the touch sensitive surface unit 804: move the multiple windows for the second application across the display unit 802 in the first direction on the display unit 802 until the multiple windows for the second application are moved partially or fully off the display unit 802 (e.g., with the moving unit 810).

In some embodiments, the plurality of windows has a layer order, and the processing unit 806 is configured to: in response to detecting the first gesture moving in the first direction on the touch sensitive surface unit 804: maintain the layer order of the plurality of windows (e.g., with the maintaining unit 814).

In some embodiments, the second window is one of multiple windows for the second application, and the processing unit 806 is configured to: in response to detecting the third gesture moving in the direction opposite the first direction on the touch sensitive surface unit 804: move the multiple windows for the second application across the display unit 802 in the direction opposite the first direction on the display unit 802 (e.g., with the moving unit 810).

In some embodiments, the first window is one of multiple windows for the first application, and the processing unit 806 is configured to: in response to detecting the fourth gesture moving in the direction opposite the first direction on the touch sensitive surface unit 804: move the multiple windows for the first application across the display unit 802 in the direction opposite the first direction on the display unit 802 (e.g., with the moving unit 810).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6C, 7A-7E may be implemented by components depicted in FIGS. 1A-1B. For example, detection operation 606, moving operation 618, and displaying operation 622 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
displaying a plurality of windows on the display, the plurality of windows including a first window for a first application displayed in a frontmost position on the display and a second window displayed in a lower position than the frontmost position, and the plurality of windows having a layer order;
detecting a first gesture moving in a first direction on the touch sensitive surface, the first direction on the touch sensitive surface corresponding to a first direction on the display; and,
in response to detecting the first gesture moving in the first direction on the touch sensitive surface:
moving the first window across the display in the first direction on the display until the first window is moved partially or fully off the display;
displaying the second window in the frontmost position on the display; and
maintaining the layer order of the plurality of windows.

2. The device of claim 1, wherein the first direction on the touch sensitive surface corresponds to a horizontal direction on the display.

3. The device of claim 1, wherein the first direction on the touch sensitive surface corresponds to a vertical direction on the display.

4. The device of claim 1, wherein the first direction on the touch sensitive surface corresponds to a diagonal direction on the display.

5. The device of claim 1, wherein the first window is moved partially off the display in response to detecting the first gesture moving in the first direction on the touch sensitive surface.

6. The device of claim 1, wherein the first window is moved fully off the display in response to detecting the first gesture moving in the first direction on the touch sensitive surface.

7. The device of claim 1, wherein the second window is for a second application, distinct from the first application.

8. The device of claim 1, including instructions for:
after responding to the first gesture, while displaying the second window in the frontmost position on the display, detecting a second gesture moving in a direction opposite the first direction on the touch sensitive surface; and,
in response to detecting the second gesture moving in the direction opposite the first direction on the touch sensitive surface:
moving the first window across the display in a direction opposite the first direction on the display; and
redisplaying the first window in the frontmost position on the display.

9. The device of claim 8, including instructions for:
in response to detecting the second gesture moving in the direction opposite the first direction on the touch sensitive surface:
maintaining a layer order of the plurality of windows.

10. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
displaying a plurality of windows on the display, the plurality of windows including a first window for a first application displayed in a frontmost position on the display and a second window displayed in a lower position than the frontmost position, and the plurality of windows having a layer order;
detecting a first gesture moving in a first direction on the touch sensitive surface, wherein the first gesture is a multifinger swipe gesture, the first direction on the touch sensitive surface corresponding to a first direction on the display; and,
in response to detecting the first gesture moving in the first direction on the touch sensitive surface:
moving the first window across the display in the first direction on the display until the first window is moved partially or fully off the display;
displaying the second window in the frontmost position on the display; and
maintaining the layer order of the plurality of windows.

11. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
displaying a plurality of windows on the display, the plurality of windows including a first window for a first application displayed in a frontmost position on the display and a second window displayed in a lower position than the frontmost position, wherein the first window is one of multiple windows for the first application and the plurality of windows have a layer order;
detecting a first gesture moving in a first direction on the touch sensitive surface, the first direction on the touch sensitive surface corresponding to a first direction on the display; and,
in response to detecting the first gesture moving in the first direction on the touch sensitive surface:
moving the multiple windows for the first application across the display in the first direction on the display until the multiple windows for the first application are moved partially or fully off the display;
displaying the second window in the frontmost position on the display; and
maintaining the layer order of the plurality of windows.

12. The device of claim 11, the device including instructions for:
after responding to the first gesture, while displaying the second window in the frontmost position on the display, detecting a second gesture moving in a direction opposite the first direction on the touch sensitive surface; and, in response to detecting the second gesture moving in the direction opposite the first direction on the touch sensitive surface:
   moving the multiple windows for the first application across the display in the direction opposite the first direction on the display.

13. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
   displaying a plurality of windows on the display, the plurality of windows having a layer order, the plurality of windows including:
      a first window for a first application displayed in a frontmost position on the display;
      a second window for a second application, distinct from the first application, displayed in a second position lower than the frontmost position; and
      a third window for a third application, distinct from the first application and the second application, displayed in a third position lower than the second position;
   detecting a first gesture moving in a first direction on the touch sensitive surface, the first direction on the touch sensitive surface corresponding to a first direction on the display;
   in response to detecting the first gesture moving in the first direction on the touch sensitive surface:
      moving the first window across the display in the first direction on the display until the first window is moved partially or fully off the display;
      displaying the second window in the frontmost position on the display; and
      maintaining the layer order of the plurality of windows;
   after responding to the first gesture, while displaying the second window in the frontmost position on the display, detecting a second gesture moving in the first direction on the touch sensitive surface;
   in response to detecting the second gesture moving in the first direction on the touch sensitive surface:
      moving the second window across the display in the first direction on the display until the second window is moved partially or fully off the display; and
      displaying the third window in the frontmost position on the display;
   after responding to the second gesture, while displaying the third window in the frontmost position on the display, detecting a third gesture moving in a direction opposite the first direction on the touch sensitive surface;
   in response to detecting the third gesture moving in the direction opposite the first direction on the touch sensitive surface:
      moving the second window across the display in a direction opposite the first direction on the display; and
      redisplaying the second window in the frontmost position on the display;
   after responding to the third gesture, while displaying the second window in the frontmost position on the display, detecting a fourth gesture moving in the direction opposite the first direction on the touch sensitive surface; and,
   in response to detecting the fourth gesture moving in the direction opposite the first direction on the touch sensitive surface:
      moving the first window across the display in a direction opposite the first direction on the display; and
      redisplaying the first window in the frontmost position on the display.

14. The device of claim 13, wherein the first direction on the touch sensitive surface corresponds to a horizontal direction on the display.

15. The device of claim 13, wherein the first direction on the touch sensitive surface corresponds to a vertical direction on the display.

16. The device of claim 13, wherein the first direction on the touch sensitive surface corresponds to a diagonal direction on the display.

17. The device of claim 13, wherein the first window is moved partially off the display in response to detecting the first gesture moving in the first direction on the touch sensitive surface and the second window is moved partially off the display in response to detecting the second gesture moving in the first direction on the touch sensitive surface.

18. The device of claim 13, wherein the first window is moved fully off the display in response to detecting the first gesture moving in the first direction on the touch sensitive surface and the second window is moved fully off the display in response to detecting the second gesture moving in the first direction on the touch sensitive surface.

19. The device of claim 13, wherein the second window is one of multiple windows for the second application, the device including instructions for:
   in response to detecting the second gesture moving in the first direction on the touch sensitive surface:
      moving the multiple windows for the second application across the display in the first direction on the display until the multiple windows for the second application are moved partially or fully off the display.

20. The device of claim 13, wherein the second window is one of multiple windows for the second application, the device including instructions for:
   in response to detecting the second gesture moving in the first direction on the touch sensitive surface:
      moving the multiple windows for the second application across the display in the first direction on the display until the multiple windows for the second application are moved partially or fully off the display;
   in response to detecting the third gesture moving in the direction opposite the first direction on the touch sensitive surface:
      moving the multiple windows for the second application across the display in the direction opposite the first direction on the display.

21. The device of claim 13, wherein the first window is one of multiple windows for the first application, the device including instructions for:
   in response to detecting the first gesture moving in the first direction on the touch sensitive surface:
      moving the multiple windows for the first application across the display in the first direction on the display until the multiple windows for the first application are moved partially or fully off the display;

in response to detecting the fourth gesture moving in the direction opposite the first direction on the touch sensitive surface:
  moving the multiple windows for the first application across the display in the direction opposite the first direction on the display.

22. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
  displaying a plurality of windows on the display, the plurality of windows having a layer order, the plurality of windows including:
    a first window for a first application displayed in a frontmost position on the display;
    a second window for a second application, distinct from the first application, displayed in a second position lower than the frontmost position; and
    a third window for a third application, distinct from the first application and the second application, displayed in a third position lower than the second position;
  detecting a first gesture moving in a first direction on the touch sensitive surface, the first direction on the touch sensitive surface corresponding to a first direction on the display;
  in response to detecting the first gesture moving in the first direction on the touch sensitive surface:
    moving the first window across the display in the first direction on the display until the first window is moved partially or fully off the display;
    displaying the second window in the frontmost position on the display; and
    maintaining the layer order of the plurality of windows;
  after responding to the first gesture, while displaying the second window in the frontmost position on the display, detecting a second gesture moving in the first direction on the touch sensitive surface;
  in response to detecting the second gesture moving in the first direction on the touch sensitive surface:
    moving the second window across the display in the first direction on the display until the second window is moved partially or fully off the display; and
    displaying the third window in the frontmost position on the display;
  after responding to the second gesture, while displaying the third window in the frontmost position on the display, detecting a third gesture moving in a direction opposite the first direction on the touch sensitive surface;
  in response to detecting the third gesture moving in the direction opposite the first direction on the touch sensitive surface:
    moving the second window across the display in a direction opposite the first direction on the display; and
    redisplaying the second window in the frontmost position on the display;
  after responding to the third gesture, while displaying the second window in the frontmost position on the display, detecting a fourth gesture moving in the direction opposite the first direction on the touch sensitive surface; and,
  in response to detecting the fourth gesture moving in the direction opposite the first direction on the touch sensitive surface:
    moving the first window across the display in a direction opposite the first direction on the display; and
    redisplaying the first window in the frontmost position on the display,
  wherein the first gesture, the second gesture, the third gesture, and the fourth gesture are multifinger swipe gestures.

23. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
  displaying a plurality of windows on the display, the plurality of windows having a layer order, the plurality of windows including:
    a first window for a first application displayed in a frontmost position on the display, wherein the first window is one of multiple windows for the first application;
    a second window for a second application, distinct from the first application, displayed in a second position lower than the frontmost position; and
    a third window for a third application, distinct from the first application and the second application, displayed in a third position lower than the second position;
  detecting a first gesture moving in a first direction on the touch sensitive surface, the first direction on the touch sensitive surface corresponding to a first direction on the display;
  in response to detecting the first gesture moving in the first direction on the touch sensitive surface:
    moving the multiple windows for the first application across the display in the first direction on the display until the multiple windows for the first application are moved partially or fully off the display;
    displaying the second window in the frontmost position on the display; and
    maintaining the layer order of the plurality of windows;
  after responding to the first gesture, while displaying the second window in the frontmost position on the display, detecting a second gesture moving in the first direction on the touch sensitive surface;
  in response to detecting the second gesture moving in the first direction on the touch sensitive surface:
    moving the second window across the display in the first direction on the display until the second window is moved partially or fully off the display; and
    displaying the third window in the frontmost position on the display;
  after responding to the second gesture, while displaying the third window in the frontmost position on the display, detecting a third gesture moving in a direction opposite the first direction on the touch sensitive surface;

in response to detecting the third gesture moving in the direction opposite the first direction on the touch sensitive surface:
- moving the second window across the display in a direction opposite the first direction on the display; and
- redisplaying the second window in the frontmost position on the display;

after responding to the third gesture, while displaying the second window in the frontmost position on the display, detecting a fourth gesture moving in the direction opposite the first direction on the touch sensitive surface; and, in response to detecting the fourth gesture moving in the direction opposite the first direction on the touch sensitive surface:
- moving the first window across the display in a direction opposite the first direction on the display; and
- redisplaying the first window in the frontmost position on the display.

* * * * *